US010827491B2

(12) United States Patent
Gaal et al.

(10) Patent No.: US 10,827,491 B2
(45) Date of Patent: Nov. 3, 2020

(54) TECHNIQUES FOR TRANSMITTING A SOUNDING REFERENCE SIGNAL OR SCHEDULING REQUEST OVER AN UNLICENSED RADIO FREQUENCY SPECTRUM BAND

(71) Applicant: QUALCOMM Incorporated, San Diego, CA (US)

(72) Inventors: Peter Gaal, San Diego, CA (US); Srinivas Yerramalli, San Diego, CA (US); Tao Luo, San Diego, CA (US); Durga Prasad Malladi, San Diego, CA (US); Naga Bhushan, San Diego, CA (US); Yongbin Wei, La Jolla, CA (US); Aleksandar Damnjanovic, Del Mar, CA (US); Hao Xu, San Diego, CA (US); Wanshi Chen, San Diego, CA (US); Shimman Arvind Patel, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 14/870,543

(22) Filed: Sep. 30, 2015

(65) Prior Publication Data
US 2016/0100407 A1 Apr. 7, 2016

Related U.S. Application Data

(60) Provisional application No. 62/060,894, filed on Oct. 7, 2014.

(51) Int. Cl.
*H04W 72/04* (2009.01)
*H04L 5/00* (2006.01)
(Continued)

(52) U.S. Cl.
CPC ......... *H04W 72/0453* (2013.01); *H04L 5/001* (2013.01); *H04L 5/0041* (2013.01);
(Continued)

(58) Field of Classification Search
CPC .................. H04W 72/0453; H04L 5/0053
See application file for complete search history.

(56) References Cited

U.S. PATENT DOCUMENTS 7,400,903 B2  7/2008  Shoemake et al.
2010/0002804 A1  1/2010  Ogawa et al.
(Continued)

FOREIGN PATENT DOCUMENTS

GB          2490110 A       10/2012
JP       2012521173 A        9/2012
(Continued)

OTHER PUBLICATIONS

ISA/EPO, International Search Report and Written Opinion of the International Searching Authority, Int'l App. No. PCT/US2015/053420, dated Feb. 22, 2016, European Patent Office, Rijswijk, NL, 17 pgs.

(Continued)

*Primary Examiner* — Kodzovi Acolatse
*Assistant Examiner* — Farhad Ali
(74) *Attorney, Agent, or Firm* — Holland & Hart LLP

(57) ABSTRACT

Techniques are described for wireless communication. A first method includes receiving from a base station an indication of a set of one or more uplink interlaces of an unlicensed radio frequency spectrum band allocated for a sounding reference signal, and transmitting the sounding reference signal for a user equipment (UE) over the indicated set of one or more uplink interlaces of the unlicensed radio frequency spectrum band. A second method includes receiving an indication of an interlace of an unlicensed radio (Continued)

frequency spectrum band allocated for a physical uplink control channel (PUCCH) transmission, and transmitting a scheduling request and a buffer status report over the indicated interlace.

30 Claims, 28 Drawing Sheets

(51) Int. Cl.
    *H04L 27/00*         (2006.01)
    *H04W 88/02*       (2009.01)

(52) U.S. Cl.
    CPC .......... *H04L 5/0048* (2013.01); *H04L 5/0051* (2013.01); *H04L 5/0055* (2013.01); *H04L 5/0057* (2013.01); *H04L 27/0006* (2013.01); *H04W 72/0413* (2013.01); *H04L 5/0069* (2013.01); *H04W 88/02* (2013.01)

(56) References Cited

U.S. PATENT DOCUMENTS

| | | |
|---|---|---|
| 2011/0098054 A1 | 4/2011 | Gorokhov et al. |
| 2013/0272187 A1 | 10/2013 | Malladi et al. |
| 2014/0036881 A1 | 2/2014 | Kim et al. |
| 2014/0036889 A1 | 2/2014 | Kim et al. |
| 2014/0050182 A1 | 2/2014 | Iwai et al. |
| 2014/0112277 A1 | 4/2014 | Yang et al. |
| 2016/0050667 A1* | 2/2016 | Papasakellariou ........................ H04W 74/0808 370/329 |
| 2016/0205687 A1 | 7/2016 | Ouchi et al. |

FOREIGN PATENT DOCUMENTS

| | | |
|---|---|---|
| JP | 2013527728 A | 6/2013 |
| JP | 2014158292 A | 8/2014 |
| WO | WO-2008093716 A1 | 8/2008 |
| WO | WO-2013008406 A1 | 1/2013 |
| WO | WO-2013175419 A1 | 11/2013 |
| WO | WO-2014112595 A1 | 7/2014 |
| WO | WO-2016028060 A1 | 2/2016 |

OTHER PUBLICATIONS

ISA/EPO, Partial International Search Report of the International Searching Authority, Int'l App. No. PCT/US2015/053420, dated Dec. 8, 2015, European Patent Office, Rijswijk, NL, 6 pgs.

Mahmoud et al., "OFDM for Cognitive Radio: Merits and Challenges," IEEE Wireless Communications, Apr. 2009, pp. 6-15, vol. 16, Issue 2, ISSN 1536-1284, Institute of Electrical and Electronics Engineers.

Panasonic, "Comparison Between Clustered DFT-s-OFDM and OFDM for Supporting Non-contiguous RB Allocation Within a Component Carrier," 3GPP TSG RAN WG1 Meeting #55, R1-084583, Prague, Czech Republic, Nov. 10-14, 2008, 7pgs., 3rd Generation Partnership Project.

Alcatel-Lucent, "M2M Communication", 3GPP Draft, R1-082813 M2M, 3RD Generation Partnership Project (3GPP), Mobile Competence Centre, 650, Route Des Lucioles, F-06921 Sophia-Antipolis Cedex, France, No. Jeju, 20080812, Aug. 12, 2008 (Aug. 12, 2008), XP050316306.

Qualcomm Incorporated: "Comparison of LTE Discovery with other Discovery Technologies," R1-140471, 3GPP TSG-RAN WG1 #76, Feb. 10-14, 2014, 4 Pages.

Qualcomm Incorporated: "Solutions for Required Functionalities and Design Targets", 3GPP Draft; 3GPP TSG-RAN WG1#78bis, R1-144000, Solutions for Required Functionalities and Design Targets, 3rd Generation Partnership Project (3GPP), Mobile Competence Centre; 650, Route Des Lucioles; F-06921 Sophia-Antipolis, vol. Ran WG1, No. Ljubljana, Slovenia; 20141006-20141010, Sep. 27, 2014 (Sep. 27, 2014), XP050869665, 5 Pages, Retrieved from the Internet: URL: http://www.3gpp.org/ftp/tsg_ran/WG1_RL1/TSGR1_78b/Docs/R1-144000.zip [retrieved on Sep. 27, 2014].

* cited by examiner

… (1)

TECHNIQUES FOR TRANSMITTING A SOUNDING REFERENCE SIGNAL OR SCHEDULING REQUEST OVER AN UNLICENSED RADIO FREQUENCY SPECTRUM BAND

CROSS REFERENCES

The present Application for Patent claims priority to U.S. Provisional Patent Application No. 62/060,894 by Gaal et al., entitled "Techniques for Transmitting a Sounding Reference Signal or Scheduling Request over an Unlicensed Radio Frequency Spectrum Band," filed Oct. 7, 2014, assigned to the assignee hereof, and expressly incorporated by reference herein in its entirety.

BACKGROUND

Field of the Disclosure

The present disclosure, for example, relates to wireless communication systems, and more particularly to techniques for transmitting a sounding reference signal or scheduling request over an unlicensed radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Some modes of communication may enable communications with a UE over an unlicensed radio frequency spectrum band, or over different radio frequency spectrum bands (e.g., a licensed radio frequency spectrum band or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. An unlicensed radio frequency spectrum band can also provide wireless access for a venue, such as a stadium or hotel, that may not have access to a licensed radio frequency spectrum band.

Some of the transmissions that a UE may make to a base station include a sounding reference signal (SRS) and a scheduling request (SR).

SUMMARY

The present disclosure, for example, relates to one or more techniques for transmitting a sounding reference signal or scheduling request over an unlicensed radio frequency spectrum band. Prior to gaining access to, and communicating over, an unlicensed radio frequency spectrum band, a base station or UE may perform a listen before talk (LBT) procedure to contend for access to the unlicensed radio frequency spectrum band. An LBT procedure may include performing a clear channel assessment (CCA) procedure to determine whether a channel of the unlicensed radio frequency spectrum band is available. When it is determined that the channel of the unlicensed radio frequency spectrum band is available, a channel usage beacon signal (CUBS) may be transmitted to reserve the channel until another transmission may be made (e.g., an SRS or SR). If a base station or UE stops transmitting over the channel of the unlicensed radio frequency spectrum band or leaves gaps in a transmission over the channel of the unlicensed radio frequency spectrum band, it is possible that another transmitting apparatus may begin transmitting on the channel of the unlicensed radio frequency spectrum band. If this happens, the base station or UE that had previously reserved or transmitted over the channel of the unlicensed radio frequency spectrum band may lose access to the channel of the unlicensed radio frequency spectrum band until it performs another CCA procedure that indicates the channel of the unlicensed radio frequency spectrum band is once again available.

Interactions between physical uplink shared channel (PUSCH) transmissions and SRS transmissions transmitted in accordance with current Long Term Evolution (LTE) communications or LTE-Advanced (LTE-A) communication standards can create gaps in the transmissions of some UEs. Thus, new techniques for transmitting an SRS may be useful for SRS transmissions over a channel of an unlicensed radio frequency spectrum band. Current LTE/LTE-A standards may also fail to transmit an SRS such that it occupies an adequate percentage of a channel's bandwidth, which may be necessary to maintain a reservation of a channel of the unlicensed radio frequency spectrum band.

Current LTE/LTE-A standards transmit an SR as a single on/off bit using PUCCH format 1, or by choosing the resources for PUCCH format 3. Thus, when allocating a greater number of resources of an unlicensed radio frequency spectrum band to a UE, the transmission of an SR in accordance with current LTE/LTE-A standards can result in resource underutilization or a failure to occupy an adequate percentage of the allocated resources. Techniques for transmitting an SRS or SR over an unlicensed radio frequency spectrum band are described in this disclosure.

In an example, a method for wireless communication is described. The method may include receiving from a base station an indication of a set of one or more uplink interlaces of an unlicensed radio frequency spectrum band allocated for a sounding reference signal, and transmitting the sounding reference signal for a UE over the indicated set of one or more uplink interlaces of the unlicensed radio frequency spectrum band.

In an example, an apparatus for wireless communication is described. The apparatus may include means for receiving from a base station an indication of a set of one or more uplink interlaces of an unlicensed radio frequency spectrum band allocated for a sounding reference signal, and means for transmitting the sounding reference signal for a UE over the indicated set of one or more uplink interlaces of the unlicensed radio frequency spectrum band.

In an example, an apparatus for wireless communication is described. The apparatus may include a processor and memory in electronic communication with the processor.

The processor may be configured to receive from a base station an indication of a set of one or more uplink interlaces of an unlicensed radio frequency spectrum band allocated for a sounding reference signal, and to transmit the sounding reference signal for a UE over the indicated set of one or more uplink interlaces of the unlicensed radio frequency spectrum band.

In an example, a non-transitory computer-readable medium for storing instructions executable by a processor is described. The instructions may include instructions to receive from a base station an indication of a set of one or more uplink interlaces of an unlicensed radio frequency spectrum band allocated for a sounding reference signal, and instructions to transmit the sounding reference signal for a UE over the indicated set of one or more uplink interlaces of the unlicensed radio frequency spectrum band.

Some examples of the method, apparatuses, or non-transitory computer readable medium may include processes, features, means, or instructions for receiving from the base station an indication of an uplink subframe in which the sounding reference signal is to be transmitted. Some examples may include processes, features, means, or instructions for receiving from the base station an indication of a symbol of an uplink subframe in which the sounding reference signal is to be transmitted. In some examples of the method, apparatuses, or non-transitory computer readable medium, the indication of the symbol may include one or more of: an indication of a first symbol of the uplink subframe or an indication of a last symbol of the uplink subframe.

In some examples of the method, apparatuses, or non-transitory computer readable medium, the set of one or more uplink interlaces may include a plurality of resource blocks, and the method, apparatuses, or non-transitory computer readable medium may include processes, features, means, or instructions for determining a sounding reference signal sequence for a resource block of the set of one or more uplink interlaces based at least in part on a location of the resource block within the set of one or more uplink interlaces. In some examples, the sounding reference signal sequence for the resource block may be based at least in part on an uplink interlace associated with the resource block. Some examples of the method, apparatuses, or non-transitory computer readable medium may include processes, features, means, or instructions for determining at least one of a UE identifier or a cell identifier, where the sounding reference signal sequence for the resource block may be based at least in part on the UE identifier or the cell identifier.

In some examples of the method, apparatuses, or non-transitory computer readable medium, each uplink interlace of the set of one or more uplink interlaces may include a plurality of subcarriers, and transmitting the sounding reference signal may include processes, features, means, or instructions for transmitting the sounding reference signal for the UE over each of the subcarriers associated with the set of one or more uplink interlaces. In some examples of the method, apparatuses, or non-transitory computer readable medium, each uplink interlace of the set of one or more uplink interlaces may include a plurality of subcarriers, and transmitting the sounding reference signal may include processes, features, means, or instructions for transmitting the sounding reference signal for the UE over a subset of the subcarriers, where the subset of the subcarriers is associated with the UE.

Some examples of the method, apparatuses, or non-transitory computer readable medium may include processes, features, means, or instructions for receiving an indication from the base station that the set of one or more uplink interlaces is designated for sounding reference signal transmissions by UEs that are not scheduled to transmit the sounding reference signal during a frame, determining that the UE is not scheduled to transmit the sounding reference signal to the base station during the frame, and determining that the UE has an allocated physical uplink shared channel (PUSCH) during the frame. In these examples, the sounding reference signal may be transmitted over the set of one or more uplink interlaces in response to the determinations.

In some examples of the method, apparatuses, or non-transitory computer readable medium, the sounding reference signal may include at least one of: a periodic sounding reference signal or an aperiodic reference signal. In some examples of the method, apparatuses, or non-transitory computer readable medium, the set of one or more uplink interlaces allocated for the sounding reference signal may be based at least in part on a distance between the base station and the UE. In some examples of the method, apparatuses, or non-transitory computer readable medium, the set of one or more uplink interlaces allocated for the sounding reference signal may be based at least in part on a transmit power of the UE.

In an example, a method for wireless communication is described. The method may include transmitting to a UE an indication of a set of one or more uplink interlaces of an unlicensed radio frequency spectrum band allocated for a sounding reference signal, and receiving the sounding reference signal for the UE at a base station over the indicated set of one or more uplink interlaces of the unlicensed radio frequency spectrum band.

In an example, an apparatus for wireless communication is described. The apparatus may include means for transmitting to a UE an indication of a set of one or more uplink interlaces of an unlicensed radio frequency spectrum band allocated for a sounding reference signal, and means for receiving the sounding reference signal for the UE at a base station over the indicated set of one or more uplink interlaces of the unlicensed radio frequency spectrum band.

In an example, an apparatus for wireless communication is described. The apparatus may include a processor and memory in electronic communication with the processor. The processor may be configured to transmit to a UE an indication of a set of one or more uplink interlaces of an unlicensed radio frequency spectrum band allocated for a sounding reference signal, and to receive the sounding reference signal for the UE at a base station over the indicated set of one or more uplink interlaces of the unlicensed radio frequency spectrum band.

In an example, a non-transitory computer-readable medium for storing instructions executable by a processor is described. The instructions may include instructions to transmit to a UE an indication of a set of one or more uplink interlaces of an unlicensed radio frequency spectrum band allocated for a sounding reference signal, and instructions to receive the sounding reference signal for the UE at a base station over the indicated set of one or more uplink interlaces of the unlicensed radio frequency spectrum band.

Some examples of the method, apparatuses, or non-transitory computer readable medium may include processes, features, means, or instructions for transmitting to the UE an indication of an uplink subframe in which the sounding reference signal is to be received. Some examples of the method, apparatuses, or non-transitory computer readable medium may include processes, features, means, or instructions for transmitting to the UE an indication of a symbol of an uplink subframe in which the sounding reference signal is to be received. In some examples of the method, apparatuses, or non-transitory computer readable medium, the indication of the symbol may include one or more of: a first symbol of the uplink subframe or a last symbol of the uplink subframe.

In some examples of the method, apparatuses, or non-transitory computer readable medium, the set of one or more uplink interlaces may include a plurality of resource blocks, and a sounding reference signal sequence for a resource block of the set of one or more uplink interlaces may be based at least in part on a location of the resource block within the set of one or more uplink interlaces. In some examples of the method, apparatuses, or non-transitory computer readable medium, the sounding reference signal sequence for the resource block may be based at least in part on an uplink interlace associated with the resource block. In some examples of the method, apparatuses, or non-transitory computer readable medium, the sounding reference signal sequence for the resource block may be based at least in part on at least one of a UE identifier or a cell identifier.

In some examples of the method, apparatuses, or non-transitory computer readable medium, each uplink interlace of the set of one or more uplink interlaces may include a plurality of subcarriers, and receiving the sounding reference signal may include processes, features, means, or instructions for receiving the sounding reference signal for the UE over each of the subcarriers associated with the set of one or more uplink interlaces. In some examples of the method, apparatuses, or non-transitory computer readable medium, each uplink interlace of the set of one or more uplink interlaces may include a plurality of subcarriers, and receiving the sounding reference signal may include processes, features, means, or instructions for receiving the sounding reference signal for the UE over a subset of the subcarriers, where the subset of the subcarriers may be associated with the UE.

Some examples of the method, apparatuses, or non-transitory computer readable medium may include processes, features, means, or instructions for transmitting to the UE an indication that the set of one or more uplink interlaces is designated for sounding reference signal transmissions by UEs that are not scheduled to transmit the sounding reference signal during a frame. In some examples of the method, apparatuses, or non-transitory computer readable medium, the sounding reference signal may include at least one of: a periodic sounding reference sequence or an aperiodic sounding reference signal. In some examples of the method, apparatuses, or non-transitory computer readable medium, the set of one or more uplink interlaces allocated for the sounding reference signal may be based at least in part on a distance between the base station and the UE. In some examples of the method, apparatuses, or non-transitory computer readable medium, the set of one or more uplink interlaces allocated for the sounding reference signal may be based at least in part on a transmit power of the UE.

In an example, an method for wireless communication is described. The method may include receiving an indication of an interlace of an unlicensed radio frequency spectrum band allocated for a physical uplink control channel (PUCCH) transmission, and transmitting a scheduling request and a buffer status report over the indicated interlace.

In an example, an apparatus for wireless communication is described. The apparatus may include means for receiving an indication of an interlace of an unlicensed radio frequency spectrum band allocated for a PUCCH transmission, and means for transmitting a scheduling request and a buffer status report over the indicated interlace.

In an example, an apparatus for wireless communication is described. The apparatus may include a processor and memory in electronic communication with the processor. The processor may be configured to receive an indication of an interlace of an unlicensed radio frequency spectrum band allocated for a PUCCH transmission, and to transmit a scheduling request and a buffer status report over the indicated interlace.

In an example, a non-transitory computer-readable medium for storing instructions executable by a processor is described. The instructions may include instructions to receive an indication of an interlace of an unlicensed radio frequency spectrum band allocated for a PUCCH transmission, and instructions to transmit a scheduling request and a buffer status report over the indicated interlace.

Some examples of the method, apparatuses, or non-transitory computer readable medium may include processes, features, means, or instructions for transmitting at least one of a power headroom report or a logical group identifier with the scheduling request and the buffer status report over the indicated interlace. Some examples of the method, apparatuses, or non-transitory computer readable medium may include processes, features, means, or instructions for transmitting a logical channel group identifier with the scheduling request and the buffer status report over the indicated interlace. Some examples of the method, apparatuses, or non-transitory computer readable medium may include processes, features, means, or instructions for transmitting a cyclic redundancy check for at least the scheduling request and the buffer status report over the indicated interlace. Some examples of the method, apparatuses, or non-transitory computer readable medium may include processes, features, means, or instructions for adjusting a size of the cyclic redundancy check based at least in part on a remaining number of bits in the indicated interlace.

In some examples of the method, apparatuses, or non-transitory computer-readable medium, the scheduling request and the buffer status report may be transmitted using one of a plurality of predefined PUCCH formats. Some examples of the method, apparatuses, or non-transitory computer readable medium may include processes, features, means, or instructions for selecting a PUCCH format based at least in part on a size of the buffer status report. Some examples of the method, apparatuses, or non-transitory computer readable medium may include processes, features, means, or instructions for selecting a PUCCH format based at least in part on a size of a payload to be transmitted over the indicated interlace. Some examples of the method, apparatuses, or non-transitory computer readable medium may include processes, features, means, or instructions for multiplexing transmission of the scheduling request and the buffer status request over the indicated interlace with a transmission of uplink control information (UCI). In some examples of the method, the apparatuses, or the non-transitory computer-readable medium, the UCI may include at least one of: an acknowledgement (ACK), a non-acknowledgement (NAK), or a number of channel quality indicator (CQI) reports.

In an example, a method for wireless communication is described. The method may include transmitting an indication of an interlace of an unlicensed radio frequency spectrum band to a UE for a PUCCH transmission, and receiving a scheduling request and a buffer status report for the UE over the interlace.

In an example, an apparatus for wireless communication is described. The apparatus may include means for transmitting an indication of an interlace of an unlicensed radio frequency spectrum band to a UE for a PUCCH transmission, and means for receiving a scheduling request and a buffer status report for the UE over the interlace.

In an example, an apparatus for wireless communication is described. The apparatus may include a processor and memory in electronic communication with the processor. The processor may be configured to transmit an indication of an interlace of an unlicensed radio frequency spectrum band to a UE for a PUCCH transmission, and to receive a scheduling request and a buffer status report for the UE over the interlace.

In an example, a non-transitory computer-readable medium for storing instructions executable by a processor is described. The instructions may include instructions to transmit an indication of an interlace of an unlicensed radio frequency spectrum band to a UE for a PUCCH transmission, and instructions to receive a scheduling request and a buffer status report for the UE over the interlace.

Some examples of the method, apparatuses, or non-transitory computer readable medium may include processes, features, means, or instructions for receiving at least one of a power headroom report or a logical group identifier with the scheduling request and the buffer status report over the indicated interlace. Some examples of the method, apparatuses, or non-transitory computer readable medium may include processes, features, means, or instructions for receiving a logical channel group identifier with the scheduling request and the buffer status report over the indicated interlace. Some examples of the method, apparatuses, or non-transitory computer readable medium may include processes, features, means, or instructions for receiving a cyclic redundancy check for at least the scheduling request and the buffer status report over the indicated interlace. In some examples of the method, apparatuses, or non-transitory computer readable medium, a size of the cyclic redundancy check may be based at least in part on a remaining number of bits in the indicated interlace.

In some examples of the method, apparatuses, or non-transitory computer readable medium, the scheduling request and the buffer status report may be received using one of a plurality of predefined PUCCH formats. In some examples of the method, apparatuses, or non-transitory computer readable medium, the one of the plurality of predefined PUCCH formats may be based at least in part on a size of the buffer status report. In some examples of the method, apparatuses, or non-transitory computer readable medium, the one of the plurality of predefined PUCCH formats may be based at least in part on a size of a payload to be transmitted over the indicated interlace. Some examples of the method, apparatuses, or non-transitory computer readable medium may include processes, features, means, or instructions for receiving the scheduling request and the buffer status request, over the indicated interlace, multiplexed with a transmission of UCI. In some examples of the method, apparatuses, or non-transitory computer readable medium, the UCI may include at least one of: an ACK, a NAK, or a number of CQI reports.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
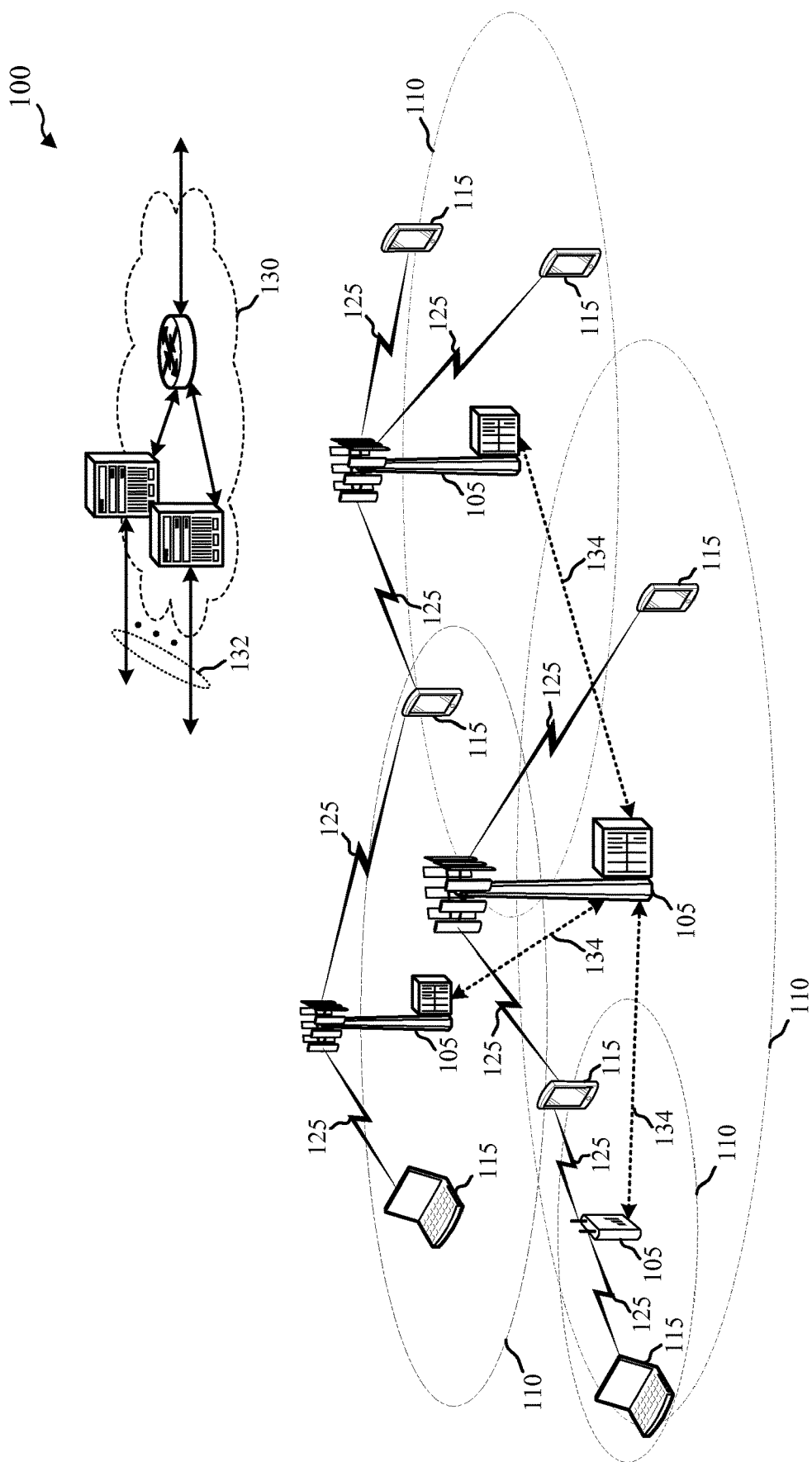
FIG. 1 illustrates an example of a wireless communication system, in accordance with aspects of the disclosure.

Techniques are described in which an unlicensed radio frequency spectrum band is used for at least a portion of communications over a wireless communication system. In some examples, the unlicensed radio frequency spectrum band may be used for LTE/LTE-A communications. The unlicensed radio frequency spectrum band may be used in combination with, or independent from, a licensed radio frequency spectrum band. In some examples, the unlicensed radio frequency spectrum band may include a radio frequency spectrum band for which a transmitting apparatus may need to contend for access because the radio frequency spectrum band is available, at least in part, for unlicensed use, such as Wi-Fi use.

With increasing data traffic in cellular networks that use a licensed radio frequency spectrum band, offloading of at least some data traffic to an unlicensed radio frequency spectrum band may provide a cellular operator (e.g., an operator of a public land mobile network (PLMN) or a coordinated set of base stations defining a cellular network, such as an LTE/LTE-A network) with opportunities for enhanced data transmission capacity. An unlicensed radio frequency spectrum band can also provide wireless access for a venue, such as a stadium or hotel, that may not have access to a licensed radio frequency spectrum band. As noted above, before communicating over the unlicensed radio frequency spectrum band, devices may perform a listen-before-talk (LBT) procedure to gain access to the radio frequency spectrum band. Such an LBT procedure may include performing a CCA procedure (or extended CCA (eCCA) procedure) to determine whether a channel of the unlicensed radio frequency spectrum band is available. When it is determined that the channel of the unlicensed radio frequency spectrum band is available, a CUBS may be transmitted to reserve the channel. When it is determined that a channel is not available, a CCA procedure (or eCCA procedure) may be performed for the channel again at a later time.

As described in the present disclosure, a UE communicating over an unlicensed radio frequency spectrum band may transmit an SRS or SR differently than is currently contemplated by LTE/LTE-A standards. A UE's transmission of an SRS or SR in an unlicensed radio frequency spectrum band may be made, in some examples, to maintain a reservation of a channel of the unlicensed radio frequency spectrum band or to provide better resource utilization.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the techniques described may be performed in an order different from that described, and various steps may be added, omitted, or combined. Also, features described with respect to some examples may be combined in other examples.

FIG. 1 illustrates an example of a wireless communication system 100, in accordance with aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). The base stations 105 may be configured to communicate with one or more communication technologies, where each communication technology may have an associated geographic coverage area 110. The geographic coverage area 110 for a first communication technology may overlap with the geographic coverage area 110 for a second communication technology, and the first and second communication technology may be associated with the same base station 105, or different base stations 105.

In some examples, the wireless communication system 100 may include an LTE/LTE-A network. In LTE/LTE-A networks, the term enhanced or evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid Automatic Repeat Request (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions from a UE 115 to a base station 105. The downlink transmissions may also be called forward link transmissions, while the uplink transmissions may also be called reverse link transmissions. In some examples, UL transmissions may include transmissions of uplink control information, which uplink control information may be transmitted over an uplink control channel (e.g., a physical uplink control channel (PUCCH) or enhanced/evolved PUCCH (ePUCCH)). The uplink control information may include, for example, acknowledgements or non-acknowledgements of downlink transmissions, or channel state information. UL transmissions may also include transmissions of data, which data may be transmitted over a physical uplink shared channel (PUSCH) or enhanced/evolved PUSCH (ePUSCH). UL transmissions may also include the transmission of a sounding reference signal (SRS) or enhanced/evolved SRS (eSRS), a physical random access channel (PRACH) or enhanced/evolved PRACH (ePRACH) (e.g., in a dual connectivity mode or the standalone mode described with reference to FIG. 2), or a scheduling request (SR) or enhanced/evolved SR (eSR) (e.g., in the standalone mode described with reference to FIG. 2). References in this disclosure to a PUCCH, a PUSCH, a PRACH, an SRS, or an SR are presumed to inherently include references to a respective ePUCCH, ePUSCH, ePRACH, eSRS, or eSR.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

The wireless communication system 100 may also or alternatively support operation over a licensed radio frequency spectrum band (e.g., a radio frequency spectrum band for which transmitting apparatuses may not be required to contend for access because the radio frequency spectrum band is licensed to some users, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). Upon winning a contention for access to the unlicensed radio frequency spectrum band, a transmitting apparatus (e.g., a base station 105 or UE 115) may transmit one or more CUBS over the unlicensed radio frequency spectrum band. The CUBS may serve to reserve the unlicensed radio frequency spectrum by providing a detectable energy on the unlicensed radio frequency spectrum band. The CUBS may also serve to identify the transmitting apparatus or serve to synchronize the transmitting apparatus and a receiving apparatus.

The UEs 115 and base stations 105 shown in FIG. 1 may implement various techniques for transmitting sounding reference signals (SRSs) or scheduling requests (SRs) over an unlicensed radio frequency spectrum band. These techniques may allow the UE to maintain control of the unlicensed radio frequency spectrum band between SRS and PUSCH transmissions, while conforming to a regulatory framework governing access to the unlicensed radio frequency spectrum band. In one example of such techniques, a UE 115 may receive from a base station 105 an indication of a set of one or more uplink interlaces of the unlicensed radio frequency spectrum band allocated for an SRS by the UE, and then transmit the SRS over the indicated set of one or more uplink interlaces. In an example, a UE 115 may receive an indication of an interlace of the unlicensed radio frequency spectrum band allocated for a PUCCH transmission, and transmit a SRS and a buffer status report (BSR) over the indicated interlace.

Figure 2:
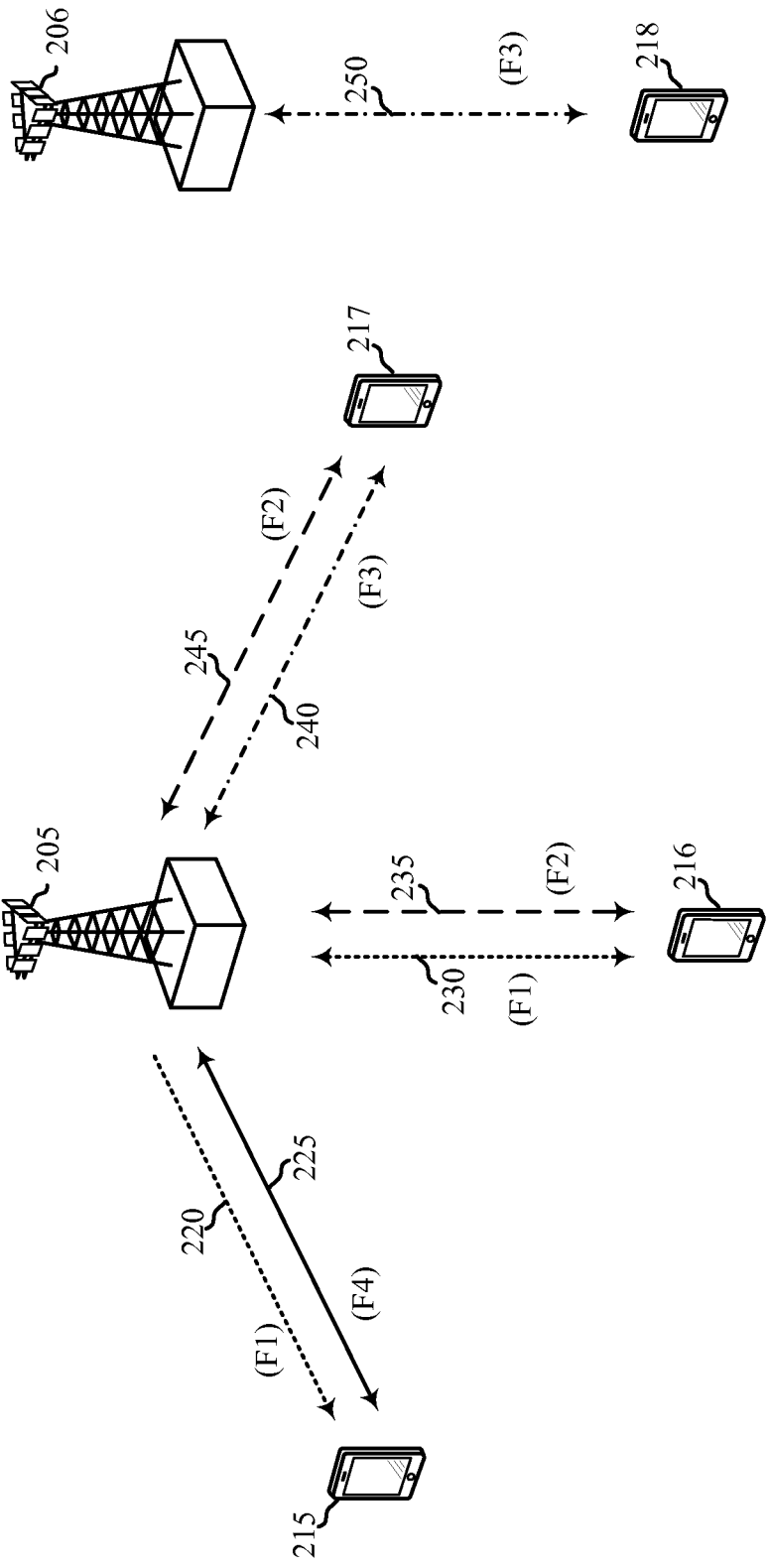
FIG. 2 shows a wireless communication system in which LTE/LTE-A may be deployed under different scenarios using an unlicensed radio frequency spectrum band, in accordance with aspects of the present disclosure.

FIG. 2 shows a wireless communication system 200 in which LTE/LTE-A may be deployed under different scenarios using an unlicensed radio frequency spectrum band, in accordance with aspects of the present disclosure. More specifically, FIG. 2 illustrates examples of a supplemental downlink mode, a carrier aggregation mode, and a stand-alone mode in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 206 may be examples of aspects of one or more of the base stations 105 described with reference to FIG. 1, while a first UE 215, a second UE 216, a third UE 217, and a fourth UE 218 may be examples of aspects of one or more of the UEs 115 described with reference to FIG. 1.

In the example of a supplemental downlink mode in the wireless communication system 200, the first base station 205 may transmit orthogonal frequency-division multiple access (OFDMA) waveforms to the first UE 215 using a downlink channel 220. The downlink channel 220 may be associated with a frequency F1 in an unlicensed radio frequency spectrum band. The first base station 205 may transmit OFDMA waveforms to the first UE 215 using a first bidirectional link 225 and may receive single-carrier frequency-division multiple access (SC-FDMA) waveforms from the first UE 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a licensed radio frequency spectrum and needs to relieve some of the traffic or signaling congestion.

In one example of a carrier aggregation mode in the wireless communication system 200, the first base station 205 may transmit OFDMA waveforms to the second UE 216 using a second bidirectional link 230 and may receive OFDMA waveforms, SC-FDMA waveforms, or resource block interleaved FDMA waveforms from the second UE 216 using the second bidirectional link 230. The second bidirectional link 230 may be associated with the frequency F1 in the unlicensed radio frequency spectrum band. The first base station 205 may also transmit OFDMA waveforms to the second UE 216 using a third bidirectional link 235 and may receive SC-FDMA waveforms from the second UE 216 using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum and needs to relieve some of the traffic or signaling congestion.

In an example of a carrier aggregation mode in the wireless communication system 200, the first base station 205 may transmit OFDMA waveforms to the third UE 217 using a fourth bidirectional link 240 and may receive OFDMA waveforms, SC-FDMA waveforms, or resource block interleaved waveforms from the third UE 217 using the fourth bidirectional link 240. The fourth bidirectional link 240 may be associated with a frequency F3 in the unlicensed radio frequency spectrum band. The first base station 205 may also transmit OFDMA waveforms to the third UE 217 using a fifth bidirectional link 245 and may receive SC-FDMA waveforms from the third UE 217 using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a licensed radio frequency spectrum band and use an unlicensed radio frequency spectrum band for capacity offload.

As described above, one type of service provider that may benefit from the capacity offload offered by using LTE/LTE-A in an unlicensed radio frequency spectrum band is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum band (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). The carrier aggregation mechanisms supported when using an unlicensed radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 206 may transmit OFDMA waveforms to the fourth UE 218 using a bidirectional link 250 and may receive OFDMA waveforms, SC-FDMA waveforms, or resource block interleaved FDMA waveforms from the fourth UE 218 using the bidirectional link 250. The bidirectional link 250 may be associated with the frequency F3 in the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105, 205, or 206 described with reference to FIG. 1 or 2, or one of the UEs 115, 215, 216, 217, or 218 described with reference to FIG. 1 or 2, may use a gating interval to gain access to a channel of an unlicensed radio frequency spectrum band (e.g., to a physical channel of the unlicensed radio frequency spectrum band). In some examples, the gating interval may be periodic. For example, the periodic gating interval may be synchronized with at least one boundary of an LTE/LTE-A radio interval. The gating interval may define the application of a contention-based protocol, such as a listen-before-talk (LBT) protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of an unlicensed radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the unlicensed radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
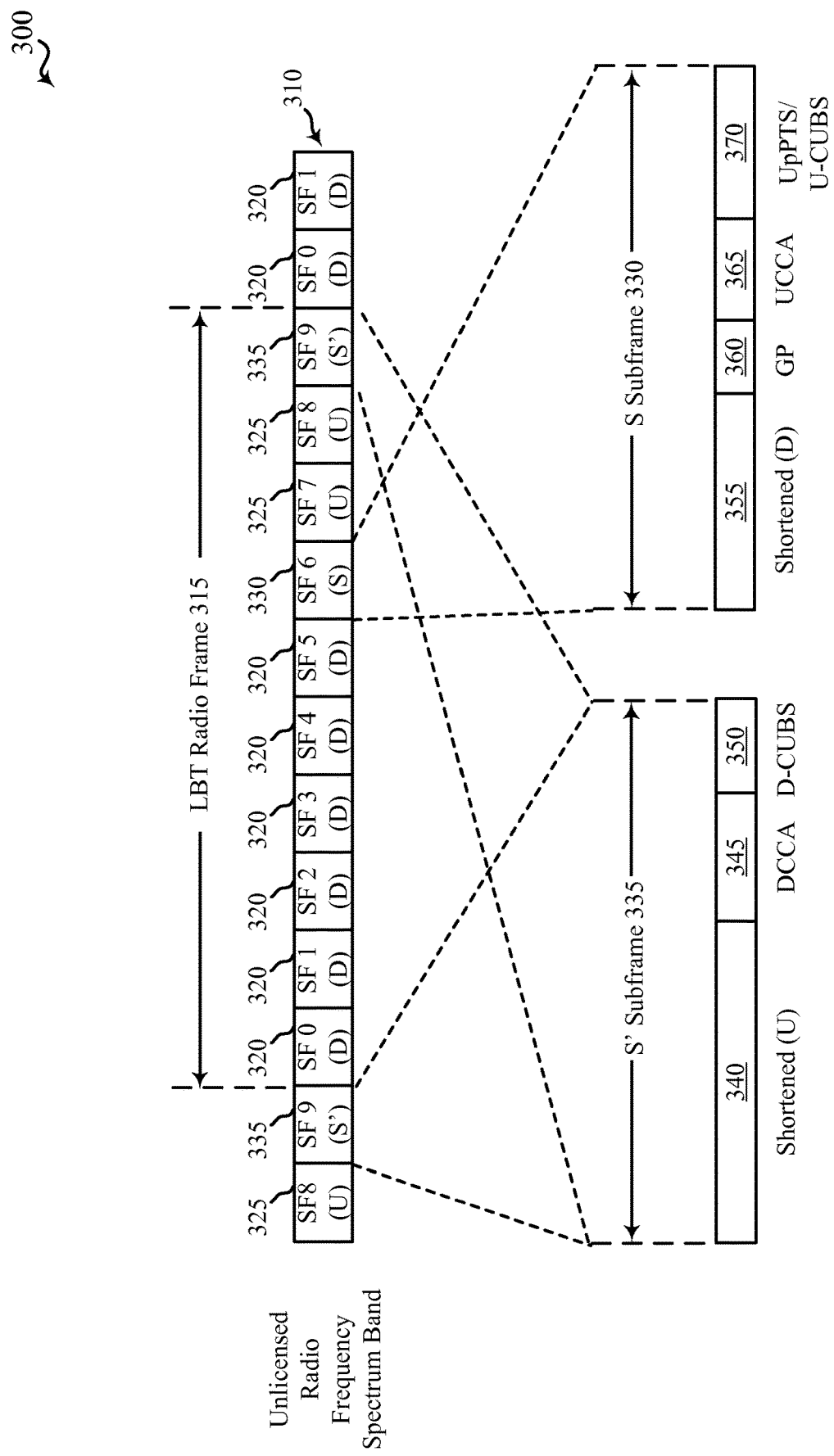
FIG. 3 shows an example of a wireless communication over an unlicensed radio frequency spectrum band, in accordance with aspects of the present disclosure.

FIG. 3 shows an example 300 of a wireless communication 310 over an unlicensed radio frequency spectrum band, in accordance with aspects of the present disclosure. In some examples, an LBT radio frame 315 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320.

During a second portion 345 of the S' subframe 335, a downlink clear channel assessment (DCCA) procedure may be performed by one or more base stations, such as one or more of the base stations 105, 205, or 206 described with reference to FIG. 1 or 2, to reserve, for a period of time, a channel of the unlicensed radio frequency spectrum band over which the wireless communication 310 occurs. Following a successful DCCA procedure by a base station, the base station may transmit a channel usage beacon signal (CUBS) (e.g., a downlink CUBS (D-CUBS)) during a third portion 350 of the S' subframe 335 to provide an indication to other base stations or apparatuses (e.g., UEs, Wi-Fi access points, etc.) that the base station has reserved the channel. In some examples, a D-CUBS may be transmitted using a plurality of interleaved resource blocks. Transmitting a D-CUBS in this manner may enable the D-CUBS to occupy at least a certain percentage of the available frequency bandwidth of the unlicensed radio frequency spectrum band and satisfy one or more regulatory requirements (e.g., a requirement that transmissions over the unlicensed radio frequency spectrum band occupy at least 80% of the available frequency bandwidth). The D-CUBS may in some examples take a form similar to that of an LTE/LTE-A CRS or a channel state information reference signal (CSI-RS). When the DCCA procedure fails, a D-CUBS may not be transmitted.

The S' subframe 335 may include a plurality of orthogonal frequency division multiplexed (OFDM) symbol periods (e.g., 14 OFDM symbol periods). A first portion 340 of the S' subframe 335 may be used by a number of UEs as a shortened uplink (U) period. A second portion 345 of the S' subframe 335 may be used for the DCCA procedure. A third portion 350 of the S' subframe 335 may be used by one or more base stations that successfully contend for access to the channel of the unlicensed radio frequency spectrum band to transmit the D-CUBS.

During a third portion 365 of the S subframe 330, an uplink CCA (UCCA) procedure may be performed by one or more UEs, such as one or more of the UEs 115, 215, 216, 217, or 218 described above with reference to FIG. 1 or 2, to reserve, for a period of time, the channel over which the wireless communication 310 occurs. Following a successful UCCA procedure by a UE, the UE may transmit an uplink CUBS (U-CUBS) in a fourth portion 370 of the S subframe 330 to provide an indication to other UEs or apparatuses (e.g., base stations, Wi-Fi access points, etc.) that the UE has reserved the channel. In some examples, a U-CUBS may be transmitted using a plurality of interleaved resource blocks. Transmitting a U-CUBS in this manner may enable the U-CUBS to occupy at least a certain percentage of the available frequency bandwidth of the unlicensed radio frequency spectrum band and satisfy one or more regulatory requirements (e.g., the requirement that transmissions over the unlicensed radio frequency spectrum band occupy at least 80% of the available frequency bandwidth). The U-CUBS may in some examples take a form similar to that of an LTE/LTE-A CRS or CSI-RS. When the UCCA procedure fails, the U-CUBS may not be transmitted.

The S subframe 330 may include a plurality of OFDM symbol periods (e.g., 14 OFDM symbol periods). A first portion 355 of the S subframe 330 may be used by a number of base stations as a shortened downlink (D) period. A second portion 360 of the S subframe 330 may be used as a guard period (GP). A third portion 365 of the S subframe 330 may be used for the UCCA procedure. A fourth portion 370 of the S subframe 330 may be used by one or more UEs that successfully contend for access to the channel of the unlicensed radio frequency spectrum band as an uplink pilot time slot (UpPTS) or to transmit the U-CUBS.

In some examples, the DCCA procedure or the UCCA procedure may include the performance of a single CCA procedure. In other examples, the DCCA procedure or the UCCA procedure may include the performance of an eCCA procedure. The eCCA procedure may include a random number of CCA procedures, and in some examples may include a plurality of CCA procedures.

Figure 4:
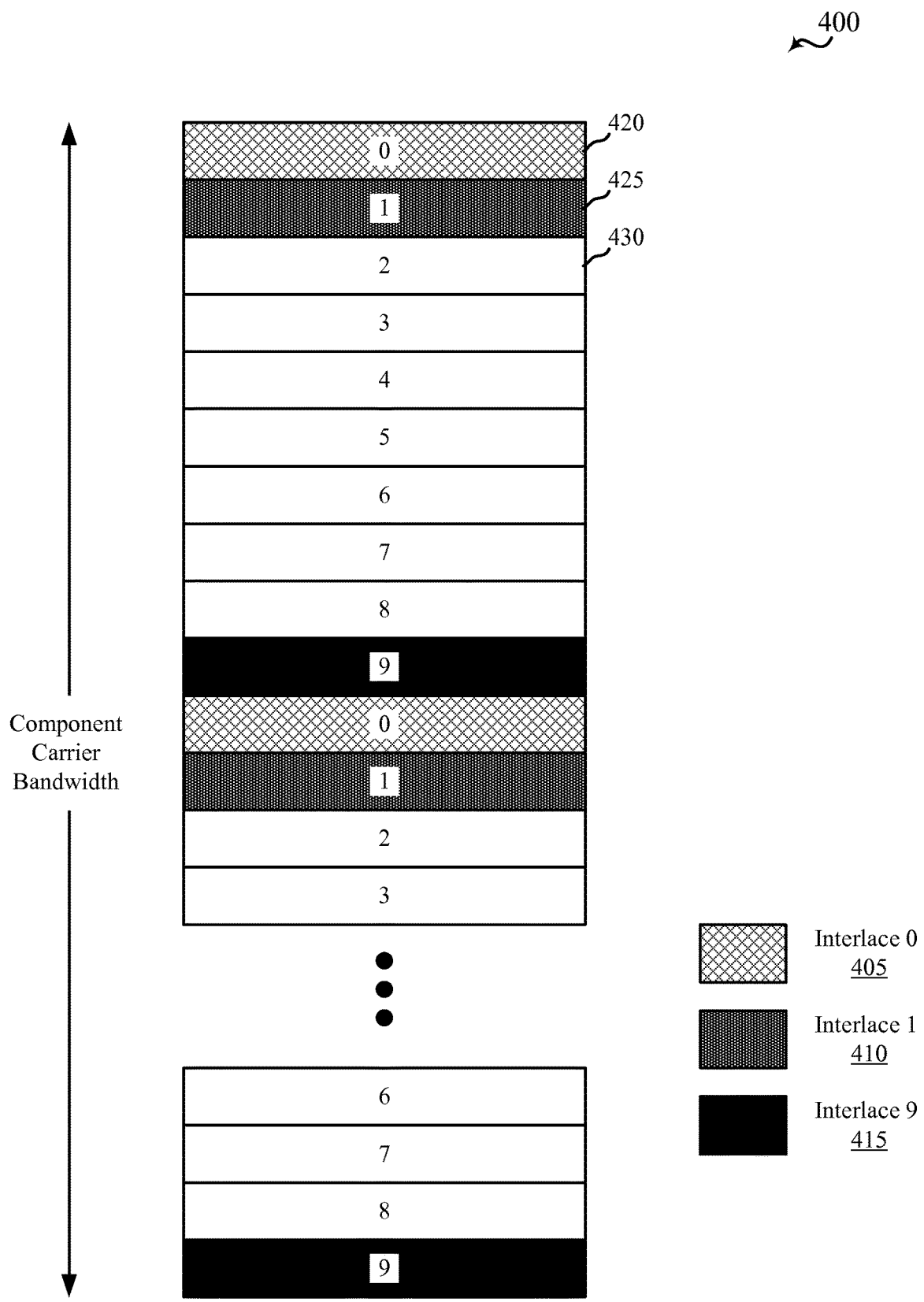
FIG. 4 shows a diagram of a component carrier (CC) bandwidth (BW) in an unlicensed radio frequency spectrum band, in accordance with aspects of the present disclosure.

FIG. 4 shows a diagram 400 of a component carrier (CC) bandwidth (BW) in an unlicensed radio frequency spectrum band, in accordance with aspects of the present disclosure. In some examples, the CC BW may be divided into a plurality of interlaces 405, 410, or 415 of resource blocks 420, 425, or 430. Each of the interlaces 405, 410, or 415 may include a plurality of non-contiguous concurrent resource blocks, which resource blocks may be spaced in frequency according to a uniform spreading pattern or a non-uniform spreading pattern. By way of example, FIG. 4 shows a plurality of interlaces (e.g., ten interlaces), with each interlace having resource blocks (e.g., ten resource blocks) spaced in frequency according to a uniform spreading pattern. In some examples, each of the interlaces 405, 410, or 415 may span a majority of the CC BW. In some examples, each of the interlaces 405, 410, or 415 may span at least 80% of the CC BW.

In some examples, each of a number of transmitting apparatuses or wireless devices (e.g., one or more wireless devices) may use one or more of the interlaces 405, 410, or 415 of resource blocks to transmit a PUCCH, an SRS, an SR, a buffer status report (BSR), a logical group identifier, or a power headroom report (PHR) over the unlicensed radio frequency spectrum band. In some examples, a PUCCH, SRS, SR, BSR, or PHR may be transmitted over one or more of the interlaces 405, 410, or 415 in an SC-FDMA format. In other examples, a PUCCH, SRS, SR, BSR, or PHR may be transmitted over one or more of the interlaces 405, 410, or 415 in an OFDMA format. In some examples, the wireless devices may be examples of the UEs 115, 215, 216, 217, or 218 described with reference to FIG. 1 or 2.

Figure 5:
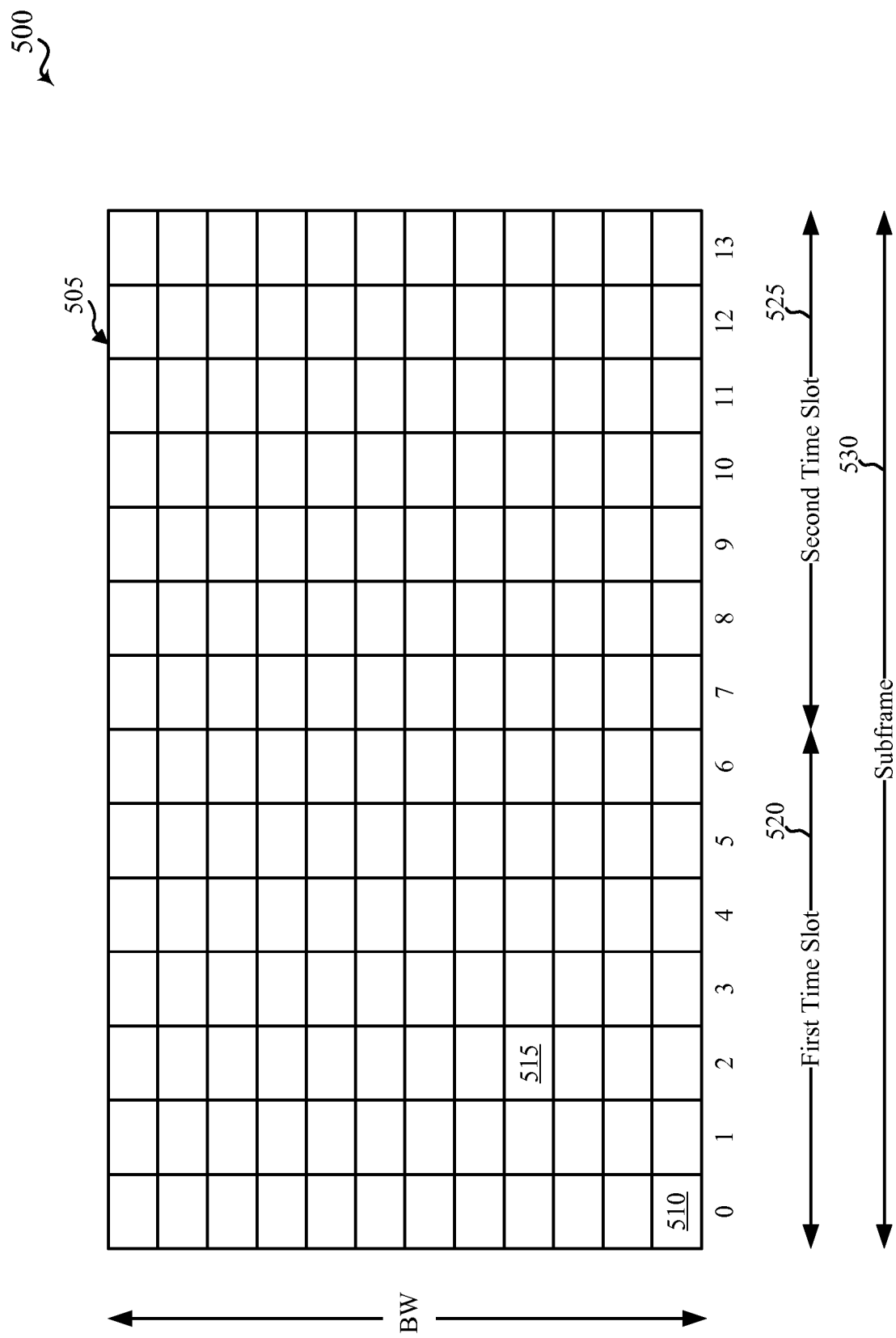
FIG. 5 shows a diagram of a resource block, in accordance with aspects of the present disclosure.

FIG. 5 shows a diagram 500 of a resource block 505, in accordance with aspects of the present disclosure. In some examples, the resource block 505 may be an example of one or more of the resource blocks described with reference to FIG. 4 (e.g., one or more of the resource blocks 420, 425, or 430).

By way of example, the resource block 505 may include a plurality of resource elements (including, for example, resource element 510 or resource element 515) extending in time or frequency dimensions. In some examples, the resource block 505 may include resource elements spanning fourteen OFDM symbols (numbered 0 through 13), two slots such as first time slot 520 and second time slot 525, a subframe 530, and twelve frequency subcarriers (subcarriers) spanning a bandwidth (BW). In some examples, the duration of the subframe 530 may be one millisecond.

Figure 6:
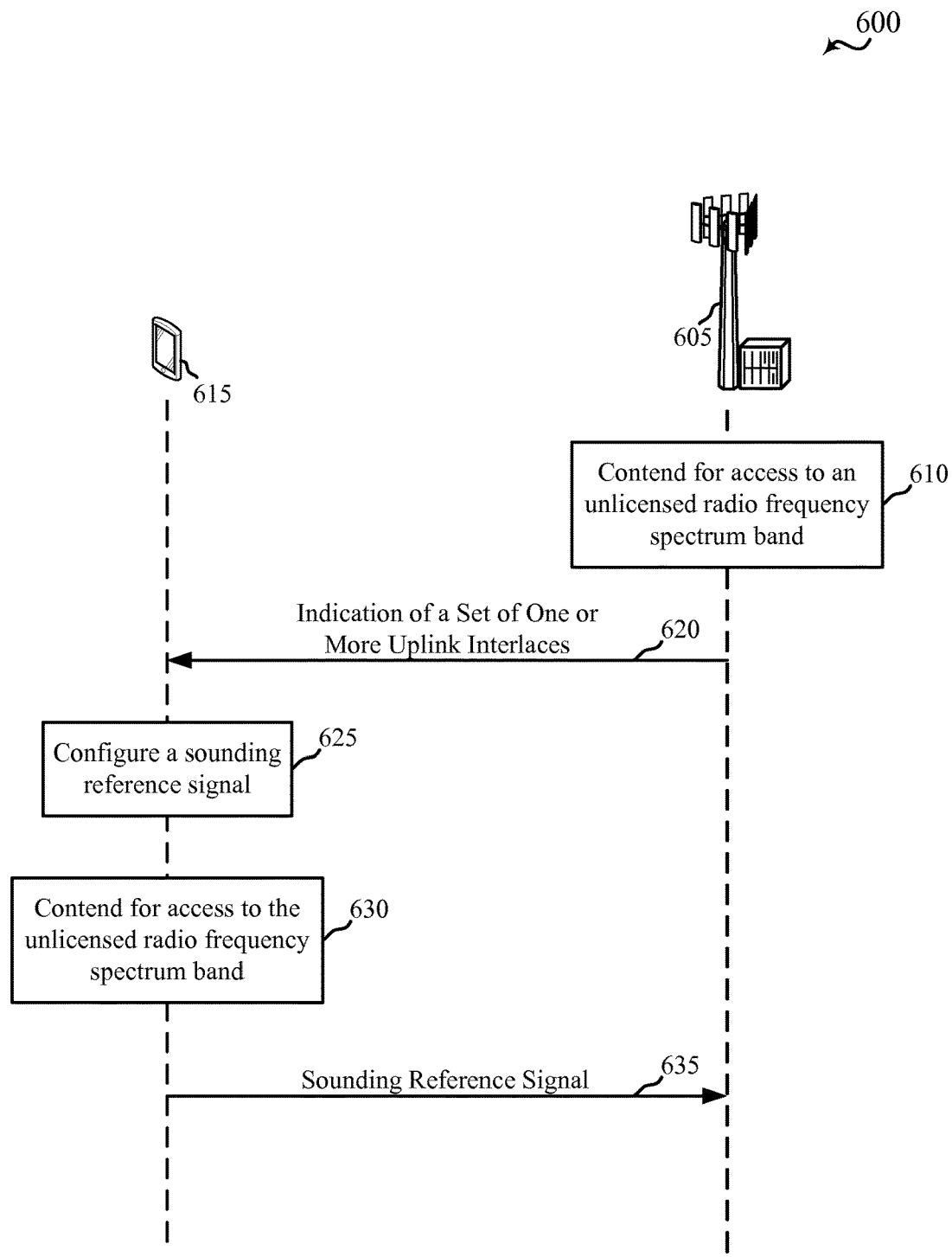
FIG. 6 shows a message flow between a UE and a base station, in accordance with aspects of the present disclosure.

FIG. 6 shows a message flow 600 between a UE 615 and a base station 605, in accordance with aspects of the present disclosure. In some examples, the UE 615 may be an example of aspects of one or more of the UEs 115, 215, 216, 217, or 218 described with reference to FIG. 1 or 2. In some examples, the base station 605 may be an example of aspects of one or more of the base stations 105, 205, or 206 described with reference to FIG. 1 or 2. The base station 605 may be part of an eNB or a cell that operates in an unlicensed radio frequency spectrum band, and messages may be transmitted between the UE 615 and the base station 605 over the unlicensed radio frequency spectrum band (and optionally, over a licensed radio frequency spectrum band). The unlicensed radio frequency spectrum band may include a radio frequency spectrum band for which transmitting apparatuses may need to contend for access because the radio frequency spectrum band is available for unlicensed use, such as Wi-Fi use.

As shown in FIG. 6, the base station 605 may contend for access to the unlicensed radio frequency spectrum band at block 610. Upon winning contention for access to the unlicensed radio frequency spectrum band, the base station 605 may reserve the unlicensed radio frequency spectrum band for an LBT radio frame (e.g., for an LBT radio frame such as the LBT radio frame 315 described with reference to FIG. 3).

In some examples, the base station 605 may transmit to the UE 615 an indication of a set of one or more uplink interlaces 620 of a set of one or more uplink interlaces of the unlicensed radio frequency spectrum band, which uplink interlaces are allocated for a sounding reference signal. The interlaces of the unlicensed radio frequency spectrum band may in some examples be configured as described with reference to FIG. 4.

Based at least in part on the received indication of a set of one or more uplink interlaces 620, and at block 625, the UE 615 may configure a sounding reference signal for transmission over the indicated set of one or more uplink interlaces of the unlicensed radio frequency spectrum band.

At block 630, the UE 615 may contend for access to the unlicensed radio frequency spectrum band. Upon winning contention for access to the unlicensed radio frequency spectrum band, the UE 615 may transmit the sounding reference signal 635 to the base station 605, over the indicated set of one or more uplink interlaces of the unlicensed radio frequency spectrum band.

Figure 7:
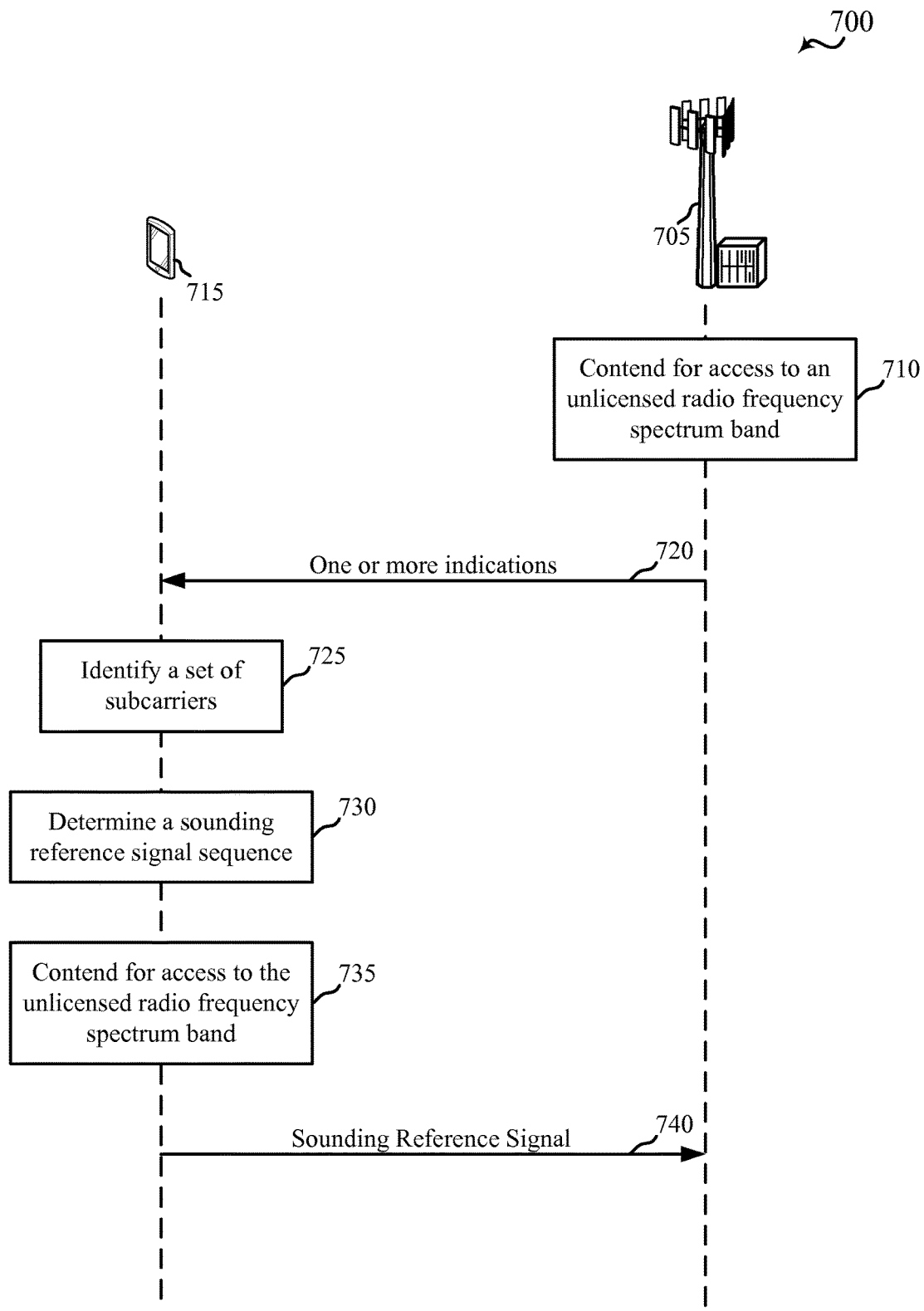
FIG. 7 shows a message flow between a UE and a base station, in accordance with aspects of the present disclosure.

FIG. 7 shows a message flow 700 between a UE 715 and a base station 705, in accordance with aspects of the present disclosure. In some examples, the UE 715 may be an example of aspects of one or more of the UEs 115, 215, 216, 217, 218, or 615 described with reference to FIG. 1, 2, or 6. In some examples, the base station 705 may be an example of aspects of one or more of the base stations 105, 205, 206, or 605 described with reference to FIG. 1, 2, or 6. The base station 705 may be part of an eNB or other cell that operates in an unlicensed radio frequency spectrum band, and messages may be transmitted between the UE 715 and the base station 705 over the unlicensed radio frequency spectrum band (and optionally, over a licensed radio frequency spectrum band). The unlicensed radio frequency spectrum band may include a radio frequency spectrum band for which transmitting apparatuses may need to contend for access because the radio frequency spectrum band is available for unlicensed use, such as Wi-Fi use.

As shown in FIG. 7, the base station 705 may contend for access to the unlicensed radio frequency spectrum band at block 710. Upon winning contention for access to the unlicensed radio frequency spectrum band, the base station 705 may reserve the unlicensed radio frequency spectrum band for an LBT radio frame (e.g., for an LBT radio frame such as the LBT radio frame 315 described with reference to FIG. 3).

In some examples, the base station 705 may transmit to the UE 715 one or more indications 720. The one or more indications 720 may include, for example, an indication of a set of one or more uplink interlaces of the unlicensed radio frequency spectrum band, which uplink interlaces are allocated for a sounding reference signal. Additionally or alternatively, the one or more indications 720 may include an indication of an uplink subframe in which the sounding reference signal is to be transmitted/received. Additionally or alternatively, the one or more indications 720 may include an indication of a symbol of the uplink subframe in which the sounding reference signal is to be transmitted/received. The interlaces of the unlicensed radio frequency spectrum band may in some examples be configured as described with reference to FIG. 4. Each interlace may include a plurality of resource blocks, and each resource block may include a plurality of subcarriers (or tones), as described with reference to FIG. 5.

In a first example, the set of one or more uplink interlaces allocated for the sounding reference signal may include all of the uplink interlaces in a component carrier bandwidth. In a second example, the set of one or more uplink interlaces allocated for the sounding reference signal may include a single uplink interlace (e.g., a single PUSCH interlace) in a component carrier bandwidth. In a third example, the set of one or more uplink interlaces allocated for the sounding reference signal may include a group of two or more uplink interlaces in a component carrier bandwidth. The first example may decrease frequency domain multiplexing options per symbol, and therefore increase a reliance on time domain multiplexing options. This may improve UE power consumption, but at the expense of fewer transmit opportunities in time. The second example may increase frequency domain multiplexing options per symbol, but may increase a UE's time interval between transmissions of a sounding reference signal on a particular uplink interlace. The third example provides a configurable balance between frequency domain multiplexing options per symbol and a UE's time interval between transmissions of a sounding reference signal on a particular uplink interlace. In some examples, the base station 705 may dynamically or semi-statically select or change the set of one or more uplink interlaces allocated for the sounding reference signal.

In some examples, the number of uplink interlaces included in the set of one or more uplink interlaces allocated for the sounding reference signal may be based at least in part on a distance between the base station 705 and the UE 715, or based at least in part on a transmit power of the UE 715.

In some examples, the uplink subframe indicated in the indications 720 may be a first uplink subframe or a last uplink subframe of an uplink transmission period (e.g., subframe SF7 or SF9 in FIG. 3). In some examples, the base station 705 may dynamically or semi-statically select or change the uplink subframe in which the sounding reference signal is to be transmitted/received.

In a first example, the symbol indicated in the indications 720 may include a first symbol of a first uplink subframe of an uplink transmission period. In a second example, the symbol may include a first symbol of a last uplink subframe of an uplink transmission period. In a third example, the symbol may include a last symbol of a last uplink subframe of an uplink transmission period. The first example may provide the sounding reference signal to the base station 705 at an earlier time, but with a risk that the sounding reference signal may not be transmitted because the UE 715 has not yet won contention for access to the unlicensed radio frequency spectrum band, and with a risk that activities by other nodes contending for access to the unlicensed radio frequency spectrum band (e.g., nodes close to the base station) may interfere with the base station's receipt of the sounding reference signal. The second and third examples may mitigate the risks of the first example, but increase the likelihood of the sounding reference signal being interfered with by transmissions of other UEs of a same operator deployment. In some examples, the indication of the symbol may include an indication of one or more of a first symbol of the uplink subframe or a last symbol of the uplink subframe. In some examples, the base station 705 may dynamically or semi-statically select or change the symbol in which the sounding reference signal is to be transmitted/received.

At block 725, the UE 715 may identify a set of subcarriers, of the set of one or more uplink interlaces, for transmitting the sounding reference signal. In a first example, the set of subcarriers may include each of the subcarriers associated with the set of one or more uplink interlaces. In a second example, the set of subcarriers may include a subset of the subcarriers (e.g., a frequency tone interlace or frequency comb), which subset of the subcarriers is associated with the UE 715. The first example may be more tolerant to a power ramp, since measuring the power in half of a symbol may be sufficient. However, depending on the choice of discrete Fourier transform (DFT) length for a sounding reference signal sequence, a sounding reference signal sequence of a new length may be needed (e.g., a length 6 computer-generated sequence (CGS)). In some examples, an indication of the set of subcarriers may be received from the base station 705 (e.g., with indications 720). In some examples, the base station 705 may dynamically or semi-statically select or change the subcarriers for transmitting the sounding reference signal.

At block 730, the UE 715 may determine a sounding reference signal sequence for the sounding reference signal. In some examples, determining the sounding reference signal sequence may include determining a sounding reference signal sequence for a resource block of the set of one or more uplink interlaces, based at least in part on a location of the resource block within the set of one or more uplink interlaces. In some examples, the sounding reference signal sequence for a resource block may be based at least in part on an uplink interlace associated with the resource block. In some examples, the UE 715 may determine at least one of a UE identifier or a cell identifier, and the sounding reference signal sequence for a resource block may be based at least in part on the UE identifier or the cell identifier. In some examples, the sounding reference signal sequence for the sounding reference signal may include the same sequence used for a single PUSCH interlace (e.g., a length 12 CGS per resource block, and a predetermined set of CGSs across the plurality of RBs included in an interlace).

At block 735, the UE 715 may contend for access to the unlicensed radio frequency spectrum band. Upon winning contention for access to the unlicensed radio frequency spectrum band, the UE 715 may transmit the sounding reference signal 740 to the base station 705, over the indicated set of one or more uplink interlaces and using other configured/selected resources of the unlicensed radio frequency spectrum band (e.g., the indicated uplink subframe and symbol(s), or the identified subcarriers). The sounding reference signal may be based at least in part on the determined sounding reference signal sequence.

In some examples of the message flow 700, each of the indications 720 received from the base station 705 may be received as part of the same transmission or on the same channel. In other examples, the indications 720 may be received as parts of different transmissions or on different channels.

Figure 8:
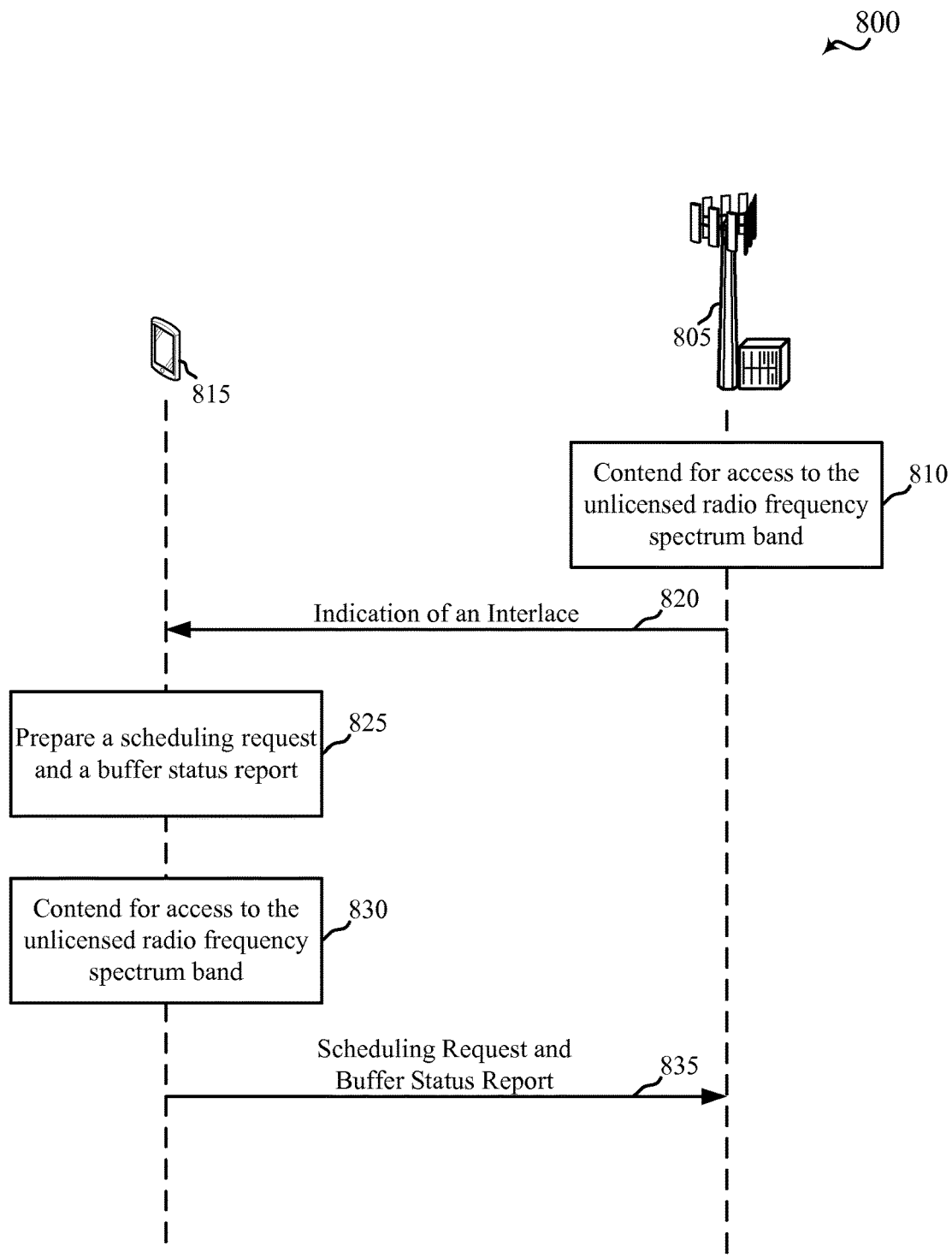
FIG. 8 shows a message flow between a UE and a base station, in accordance with aspects of the present disclosure.

FIG. 8 shows a message flow 800 between a UE 815 and a base station 805, in accordance with aspects of the present disclosure. In some examples, the UE 815 may be an example of aspects of one or more of the UEs 115, 215, 216, 217, 218, 615, or 715 described with reference to FIG. 1, 2, 6, or 7. In some examples, the base station 805 may be an example of aspects of one or more of the base stations 105, 205, 206, 605, or 705 described with reference to FIG. 1, 2, 6, or 7. The base station 805 may be part of an eNB or other cell that operates in an unlicensed radio frequency spectrum band, and messages may be transmitted between the UE 815 and the base station 805 over the unlicensed radio frequency spectrum band (and optionally, over a licensed radio frequency spectrum band). The unlicensed radio frequency spectrum band may include a radio frequency spectrum band for which transmitting apparatuses may need to contend for access because the radio frequency spectrum band is available for unlicensed use, such as Wi-Fi use.

As shown in FIG. 8, the base station 805 may contend for access to the unlicensed radio frequency spectrum band at block 810. Upon winning contention for access to the unlicensed radio frequency spectrum band, the base station 805 may reserve the unlicensed radio frequency spectrum band for an LBT radio frame (e.g., for an LBT radio frame such as the LBT radio frame 315 described with reference to FIG. 3).

In some examples, the base station 805 may transmit an indication 820 of an interlace of the unlicensed radio frequency spectrum band to the UE 815 for a PUCCH transmission. The interlaces of the unlicensed radio frequency spectrum band may in some examples be configured as described with reference to FIG. 4.

Based at least in part on the received indication 820, and at block 825, the UE 815 may prepare a scheduling request and a buffer status report for transmission over the indicated interlace.

At block 830, the UE 815 may contend for access to the unlicensed radio frequency spectrum band. Upon winning contention for access to the unlicensed radio frequency spectrum band, the UE 815 may transmit the scheduling request and buffer status report 835 to the base station 805, over the indicated interlace of the unlicensed radio frequency spectrum band.

Figure 9:
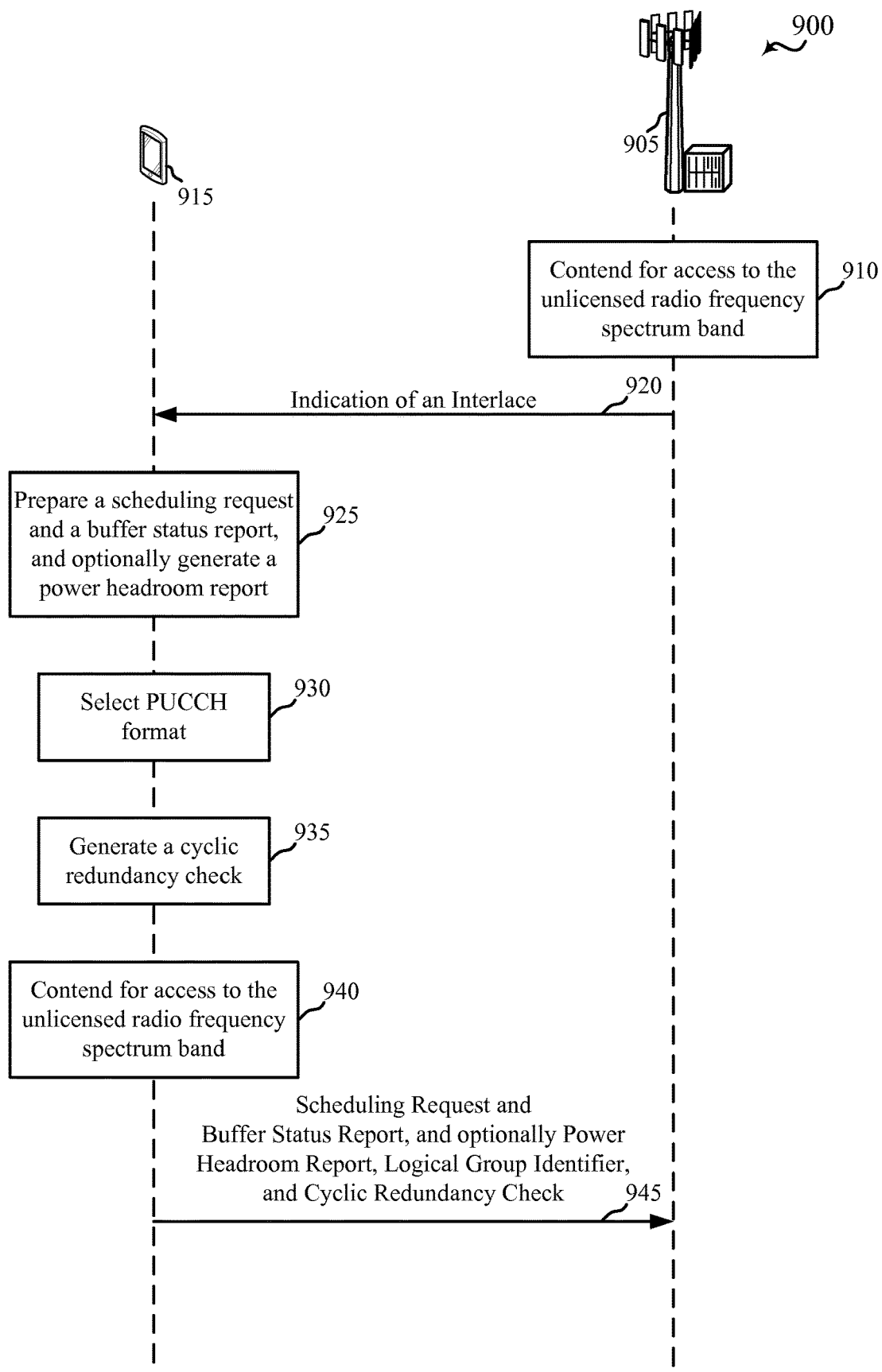
FIG. 9 shows a message flow between a UE and a base station, in accordance with aspects of the present disclosure.

FIG. 9 shows a message flow 900 between a UE 915 and a base station 905, in accordance with aspects of the present disclosure. In some examples, the UE 915 may be an example of aspects of one or more of the UEs 115, 215, 216, 217, 218, 615, 715, or 815 described with reference to FIG. 1, 2, 6, 7, or 8. In some examples, the base station 905 may be an example of aspects of one or more of the base stations 105, 205, 206, 605, 705, or 805 described with reference to FIG. 1, 2, 6, 7, or 8. The base station 905 may be part of an eNB or other cell that operates in an unlicensed radio frequency spectrum band, and messages may be transmitted between the UE 915 and the base station 905 over the unlicensed radio frequency spectrum band (and optionally, over a licensed radio frequency spectrum band). The unlicensed radio frequency spectrum band may include a radio frequency spectrum band for which transmitting apparatuses may need to contend for access because the radio frequency spectrum band is available for unlicensed use, such as Wi-Fi use.

As shown in FIG. 9, the base station 905 may contend for access to the unlicensed radio frequency spectrum band at block 910. Upon winning contention for access to the unlicensed radio frequency spectrum band, the base station 905 may reserve the unlicensed radio frequency spectrum band for an LBT radio frame (e.g., for an LBT radio frame such as the LBT radio frame 315 described with reference to FIG. 3).

In some examples, the base station 905 may transmit an indication 920 of an interlace of the unlicensed radio frequency spectrum band to the UE 915 for a PUCCH transmission. The interlaces of the unlicensed radio frequency spectrum band may in some examples be configured as described with reference to FIG. 4.

Based at least in part on the received indication 920, and at block 925, the UE 915 may prepare a scheduling request and a buffer status report, and optionally prepare a power headroom report for transmission over the indicated interlace. The scheduling request may in some examples be a single bit indicating whether a scheduling request is being made. The buffer status report may in some examples take the form of a short buffer status report (e.g., a 6-bit report) or a long buffer status report (e.g., a 24-bit report). The power headroom report may in some examples be a 6-bit report.

At block 930, the UE 915 may select one of a plurality of predefined PUCCH formats for transmitting the scheduling request and the buffer status report, and optionally at least one of the power headroom report or a logical group identifier. In the case of a short buffer status report, the selected PUCCH format may in some examples be Format 1b. In some examples, the PUCCH format may be selected based at least in part on a size of a payload to be transmitted over the indicated interlace, or on a size of the buffer status report.

At block 935, the UE 915 may generate a cyclic redundancy check for at least the scheduling request and the buffer status report, and optionally for the power headroom report. In some examples, the UE 915 may adjust a size of the cyclic redundancy check based at least in part on a remaining number of bits in the indicated interlace (e.g., after accounting for the scheduling request, buffer status report, and optionally the power headroom report).

At block 940, the UE 915 may contend for access to the unlicensed radio frequency spectrum band. Upon winning contention for access to the unlicensed radio frequency spectrum band, the UE 915 may transmit the scheduling request and buffer status report 945, and optionally transmit the power headroom report, a logical group identifier, or the cyclic redundancy check with the scheduling request and the buffer status report 945, to the base station 905, over the indicated interlace of the unlicensed radio frequency spectrum band. The scheduling report, buffer status report, or power headroom report may be transmitted using the selected one of the plurality of predefined PUCCH formats.

Figure 10:
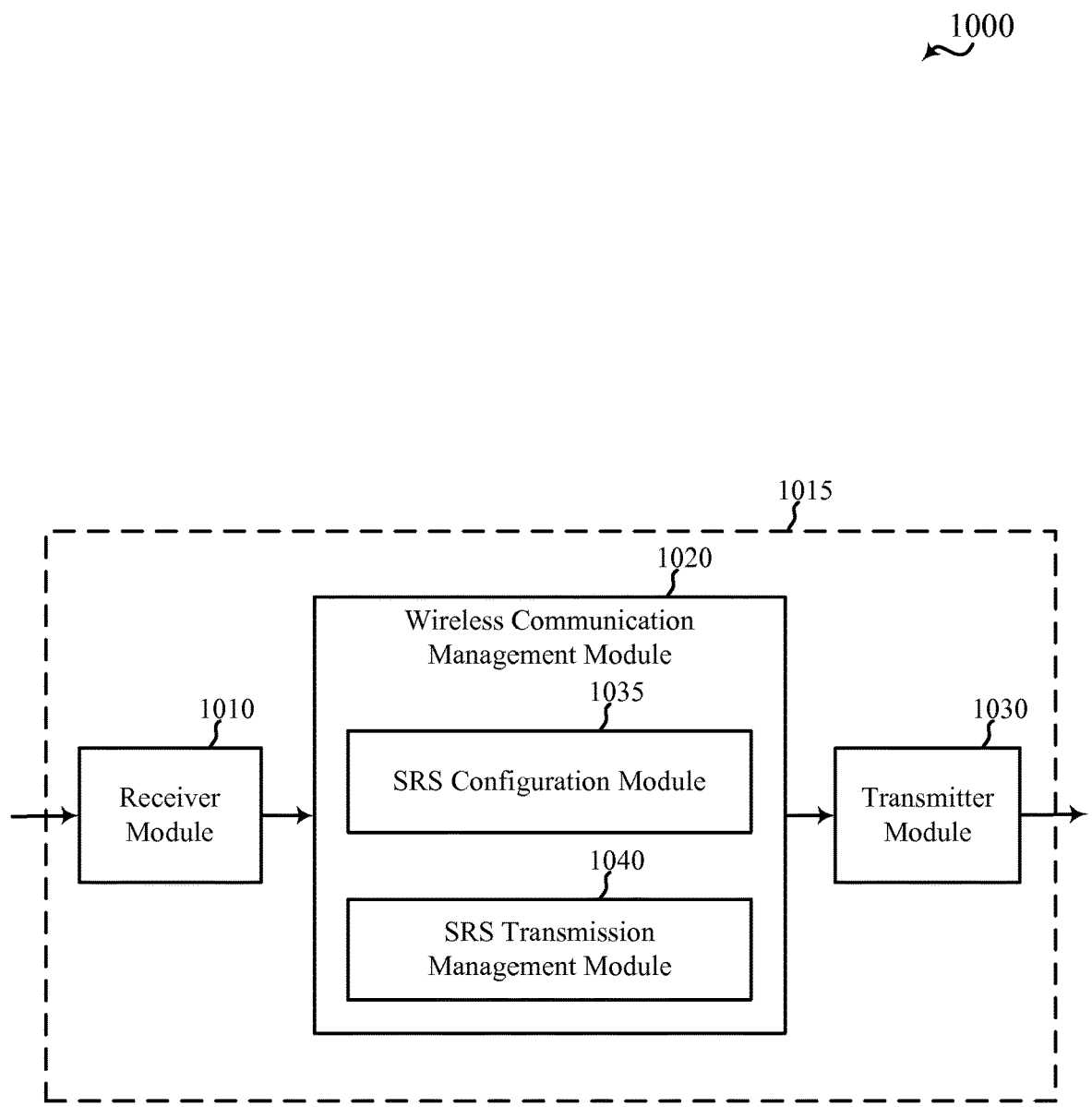
FIG. 10 shows a block diagram of an apparatus for use in wireless communication, in accordance with aspects of the present disclosure.

FIG. 10 shows a block diagram 1000 of an apparatus 1015 for use in wireless communication, in accordance with aspects of the present disclosure. The apparatus 1015 may be an example of aspects of one or more of the UEs 115, 215, 216, 217, 218, 615, 715, 815, or 915 described with reference to FIG. 1, 2, 6, 7, 8, or 9. Additionally or alternatively, the apparatus 1015 may be or include a processor. The apparatus 1015 may include a receiver module 1010, a wireless communication management module 1020, or a transmitter module 1030. Each of these modules may be in communication with each other.

The modules of the apparatus 1015 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1010 may include at least one radio frequency (RF) receiver, such as at least one RF receiver operable to receive transmissions over a licensed radio frequency spectrum band (e.g., a radio frequency spectrum band for which transmitting apparatuses may not be required to contend for access because the radio frequency spectrum band is licensed to some users, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the unlicensed radio frequency spectrum band may be used for LTE/LTE-A communications, as described, for example, with reference to FIG. 1, 2, 3, 4, or 5. The receiver module 1010 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 1030 may include at least one RF transmitter, such as at least one RF transmitter operable to transmit over the licensed radio frequency spectrum band or the unlicensed radio frequency spectrum band. The transmitter module 1030 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management module 1020 may be used to manage one or more aspects of wireless communication for the apparatus 1015. In some examples, the wireless communication management module 1020 may include an SRS configuration module 1035 or an SRS transmission management module 1040.

In some examples, the SRS configuration module 1035 may be used to configure a sounding reference signal transmission. In some examples, the SRS configuration module 1035 may be used to receive, from a base station, an indication of a set of one or more uplink interlaces of the unlicensed radio frequency spectrum band allocated for a sounding reference signal. The interlaces of the unlicensed radio frequency spectrum band may in some examples be configured as described with reference to FIG. 4.

In some examples, the SRS transmission management module 1040 may be used to transmit the sounding reference signal for a UE over the indicated set of one or more uplink interlaces of the unlicensed radio frequency spectrum band.

In some examples, the apparatus 1015 may be configured or used similarly to the UE 615 or 715 described with reference to FIG. 6 or 7.

Figure 11:
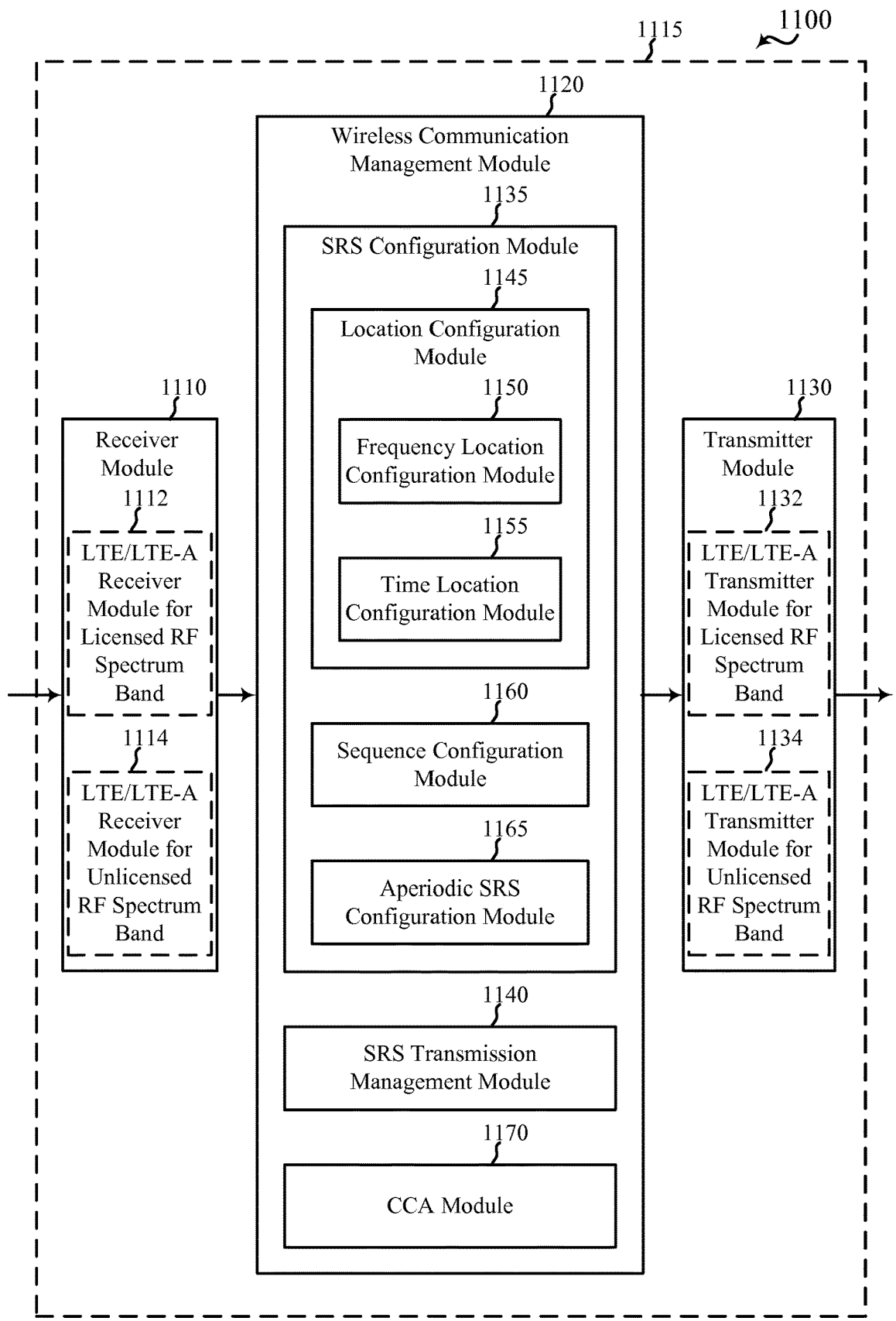
FIG. 11 shows a block diagram of an apparatus for use in wireless communication, in accordance with aspects of the present disclosure.

FIG. 11 shows a block diagram 1100 of an apparatus 1115 for use in wireless communication, in accordance with aspects of the present disclosure. The apparatus 1115 may be an example of aspects of one or more of the UEs 115, 215, 216, 217, 218, 615, 715, 815, or 915 described with reference to FIG. 1, 2, 6, 7, 8, or 9, or apparatus 1015 described with reference to FIG. 10. Additionally or alternatively, the apparatus 1115 may be or include a processor. The apparatus 1115 may include a receiver module 1110, a wireless communication management module 1120, or a transmitter module 1130. Each of these modules may be in communication with each other.

The modules of the apparatus 1115 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1110 may include at least one RF receiver, such as at least one RF receiver operable to receive transmissions over a licensed radio frequency spectrum band (e.g., a radio frequency spectrum band for which transmitting apparatuses may not be required to contend for access because the radio frequency spectrum band is licensed to some users, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the unlicensed radio frequency spectrum band may be used for LTE/LTE-A communications, as described, for example, with reference to FIG. 1, 2, 3, 4, or 5. The receiver module 1110 may in some cases include separate receivers for the licensed radio frequency spectrum band and the unlicensed radio frequency spectrum band. The separate receivers may, in some examples, take the form of an LTE/LTE-A receiver module for communicating over the licensed radio frequency spectrum band (e.g., LTE/LTE-A receiver module for licensed RF spectrum band 1112), and an LTE/LTE-A receiver module for communicating over the unlicensed radio frequency spectrum band (e.g., LTE/LTE-A receiver module for unlicensed RF spectrum band 1114). The receiver module 1110, including the LTE/LTE-A receiver module for licensed RF spectrum band 1112 or the LTE/LTE-A receiver module for unlicensed RF spectrum band 1114, may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 1130 may include at least one RF transmitter, such as at least one RF transmitter operable to transmit over the licensed radio frequency spectrum band or the unlicensed radio frequency spectrum band. The transmitter module 1130 may in some cases include separate transmitters for the licensed radio frequency spectrum band and the unlicensed radio frequency spectrum band. The separate transmitters may, in some examples, take the form of an LTE/LTE-A transmitter module for communicating over the licensed radio frequency spectrum band (e.g., LTE/LTE-A transmitter module for licensed RF spectrum band 1132), and an LTE/LTE-A transmitter module for communicating over the unlicensed radio frequency spectrum band (e.g., LTE/LTE-A transmitter module for unlicensed RF spectrum band 1134). The transmitter module 1130, including the LTE/LTE-A transmitter module for licensed RF spectrum band 1132 or the LTE/LTE-A transmitter module for unlicensed RF spectrum band 1134, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management module 1120 may be used to manage one or more aspects of wireless communication for the apparatus 1115. In some examples, the wireless communication management module 1120 may include an SRS configuration module 1135, an SRS transmission management module 1140, or a CCA module 1170.

In some examples, the SRS configuration module 1135 may be used to configure a sounding reference signal transmission. In some examples, the SRS configuration module 1135 may include a location configuration module 1145, a sequence configuration module 1160, or an aperiodic SRS configuration module 1165. The location configuration module 1145 may include a frequency location configuration module 1150 or a time location configuration module 1155.

In some examples, the frequency location configuration module 1150 may be used to receive, from a base station, an indication of a set of one or more uplink interlaces of the unlicensed radio frequency spectrum band allocated for a sounding reference signal. The interlaces of the unlicensed radio frequency spectrum band may in some examples be configured as described with reference to FIG. 4. Each interlace may include a plurality of resource blocks, and each resource block may include a plurality of subcarriers (or tones), as described with reference to FIG. 5.

In a first example, the set of one or more uplink interlaces allocated for the sounding reference signal may include all of the uplink interlaces in a component carrier bandwidth. In a second example, the set of one or more uplink interlaces allocated for the sounding reference signal may include a single uplink interlace (e.g., a single PUSCH interlace) in a component carrier bandwidth. In a third example, the set of one or more uplink interlaces allocated for the sounding reference signal may include a group of two or more uplink interlaces in a component carrier bandwidth. The first example may decrease frequency domain multiplexing options per symbol, and therefore increase a reliance on time domain multiplexing options. This may improve UE power consumption, but at the expense of fewer transmit opportunities in time. The second example may increase frequency domain multiplexing options per symbol, but may increase a UE's time interval between transmissions of a sounding reference signal on a particular uplink interlace. The third example provides a configurable balance between frequency domain multiplexing options per symbol and a UE's time interval between transmissions of a sounding reference signal on a particular uplink interlace. In some examples, the base station may dynamically or semi-statically select or change the set of one or more uplink interlaces allocated for the sounding reference signal.

In some examples, the number of uplink interlaces included in the set of one or more uplink interlaces allocated for the sounding reference signal may be based at least in part on a distance between the base station and the apparatus 1115, or based at least in part on a transmit power of the apparatus 1115.

In some examples, the frequency location configuration module 1150 may be used to identify a set of subcarriers, of the set of one or more uplink interlaces, for transmitting the sounding reference signal. In a first example, the set of subcarriers may include each of the subcarriers associated with the set of one or more uplink interlaces. In a second example, the set of subcarriers may include a subset of the subcarriers (e.g., a frequency tone interlace or frequency comb), which subset of the subcarriers is associated with the apparatus 1115. The first example may be more tolerant to a power ramp, since measuring the power in half of a symbol may be sufficient. However, depending on the choice of DFT length for a sounding reference signal sequence, a sounding reference signal sequence of a new length may be needed (e.g., a length 6 CGS). In some examples, an indication of the set of subcarriers may be received from the base station. In some examples, the base station may dynamically or semi-statically select or change the subcarriers for transmitting the sounding reference signal.

In some examples, the time location configuration module 1155 may be used to receive, from the base station, an indication of an uplink subframe in which the sounding reference signal is to be transmitted. In some examples, the uplink subframe may be a first uplink subframe or a last uplink subframe of an uplink transmission period (e.g., subframe SF7 or SF9 in FIG. 3). In some examples, the base station may dynamically or semi-statically select or change the uplink subframe in which the sounding reference signal is to be transmitted.

In some examples, the time location configuration module 1155 may be used to receive, from the base station, an indication of a symbol of an uplink subframe in which the sounding reference signal is to be transmitted. In a first example, the symbol may include a first symbol of a first uplink subframe of an uplink transmission period. In a second example, the symbol may include a first symbol of a last uplink subframe of an uplink transmission period. In a third example, the symbol may include a last symbol of a last uplink subframe of an uplink transmission period. The first example may provide the sounding reference signal to the base station at an earlier time, but with a risk that the sounding reference signal may not be transmitted because the apparatus 1115 has not yet won contention for access to the unlicensed radio frequency spectrum band, and with a risk that activities by other nodes contending for access to the unlicensed radio frequency spectrum band (e.g., nodes close to the base station) may interfere with the base station's receipt of the sounding reference signal. The second and third examples may mitigate the risks of the first example, but increase the likelihood of the sounding reference signal being interfered with by transmissions of other apparatuses of a same operator deployment. In some examples, the indication of the symbol may include an indication of one or more of a first symbol of the uplink subframe or a last symbol of the uplink subframe. In some examples, the base station may dynamically or semi-statically select or change the symbol in which the sounding reference signal is to be transmitted.

In some examples, the sequence configuration module 1160 may be used to determine a sounding reference signal sequence for the sounding reference signal. In some examples, determining the sounding reference signal sequence may include determining a sounding reference signal sequence for a resource block of the set of one or more uplink interlaces, based at least in part on a location of the resource block within the set of one or more uplink interlaces. In some examples, the sounding reference signal sequence for a resource block may be based at least in part on an uplink interlace associated with the resource block. In some examples, the sequence configuration module 1160 may be used to determine at least one of a UE identifier or a cell identifier, and the sounding reference signal sequence for a resource block may be based at least in part on the UE identifier or the cell identifier. In some examples, the sounding reference signal sequence for the sounding reference signal may include the same sequence used for a single PUSCH interlace (e.g., a length 12 CGS per resource block, and a predetermined set of CGSs across the plurality of RBs included in an interlace).

In some examples of the apparatus 1115, each of the indications received from the base station may be received by the SRS configuration module 1135 as part of the same transmission or on the same channel. In other examples, the indications may be received as parts of different transmissions, or on different channels.

In some examples, the SRS transmission management module 1140 may be used to transmit the sounding reference signal over the indicated set of one or more uplink interlaces and using other configured/selected resources of the unlicensed radio frequency spectrum band (e.g., the indicated uplink subframe and symbol(s), or the identified subcarriers). The sounding reference signal may be based at least in part on the determined sounding reference signal sequence.

Because different LBT radio frames transmitted over an unlicensed radio frequency spectrum band can have different TDD configurations, the sounding reference signal transmitted by the SRS transmission management module 1140 may be one of a plurality of recurring and periodic sounding reference signal transmissions, or one of a plurality of recurring and non-periodic sounding reference signal transmissions. For purposes of the present disclosure, a sounding reference signal transmitted as part of either of these recurring sounding reference signal transmissions may be referred to as a periodic sounding reference signal. The sounding reference signal transmitted by the SRS transmission management module 1140 may also be an aperiodic sounding reference signal transmission.

In some instances, the apparatus 1115 may be allocated a PUSCH during a frame, but may not need to transmit a sounding reference signal on the PUSCH. To account for these instances, and to avoid discontinuities in transmissions over the unlicensed radio frequency spectrum band, the SRS configuration module 1135 may in some examples receive an indication from the base station that the set of one or more uplink interlaces is designated for sounding reference signal transmissions by apparatuses (e.g., UEs) that are not scheduled to transmit a sounding reference signal during a frame. In this example, the SRS configuration module 1135 may determine that the apparatus 1115 is not scheduled to transmit the sounding reference signal to the base station during the frame, and that the apparatus 1115 has an allocated a PUSCH during the frame. The SRS transmission management module 1140 may then transmit the sounding reference signal over the set of one or more uplink interlaces in response to the determinations that the apparatus 1115 is not scheduled to transmit the sounding reference signal to the base station during the frame, and that the apparatus 1115 has an allocated PUSCH during the frame. When the set of one or more uplink interlaces is designated for sounding reference signal transmissions by apparatuses that are not scheduled to transmit a sounding reference signal during a frame, the set of one or more uplink interlaces may be used for sounding reference signal transmissions of all such apparatuses (i.e., all apparatuses allocated a PUSCH during a frame but not needing to transmit a sounding reference signal during the frame). In some examples, the sounding reference signal transmissions over the designated set of one or more uplink interlaces may not be processed by the base station. In some examples, the apparatus' transmissions over the designated set of one or more uplink interlaces may frequency hop to follow other sounding reference signal transmissions.

In some instances, the apparatus 1115 may not transmit a periodic sounding reference signal over a particular uplink interlace, or may not transmit a periodic sounding reference signal over the particular uplink interlace within a threshold period of time (e.g., due to unavailability of a channel of the unlicensed radio frequency spectrum band). In these instances, the apparatus 1115 may transmit an aperiodic sounding reference signal to fill a gap in channel sounding. In some examples, the base station may indicate to the apparatus 1115 a set of uplink interlaces that are to be sounded using an aperiodic sounding reference signal. In some examples, the set of uplink interlaces to be sounded using the aperiodic sounding reference signal may be indicated in a downlink grant or an uplink grant, or in a group common downlink control information (DCI). The aperiodic sounding reference signal may be configured by the aperiodic SRS configuration module 1165.

In some examples, the CCA module 1170 may be used to contend for access to the unlicensed radio frequency spectrum band. In some examples, the CCA module 1170 may contend for access to the unlicensed radio frequency spectrum band by performing a UCCA, as described, for example, with reference to FIG. 3. Upon winning a contention for access to the unlicensed radio frequency spectrum band, the CCA module 1170 may enable the wireless communication management module 1120 to transmit a CUBS over the unlicensed radio frequency spectrum band or enable the SRS transmission management module 1140 to transmit a sounding reference signal over the unlicensed radio frequency spectrum band.

In some examples, the apparatus 1115 may be configured or used similarly to the UE 615 or 715 described with reference to FIG. 6 or 7.

Figure 12:
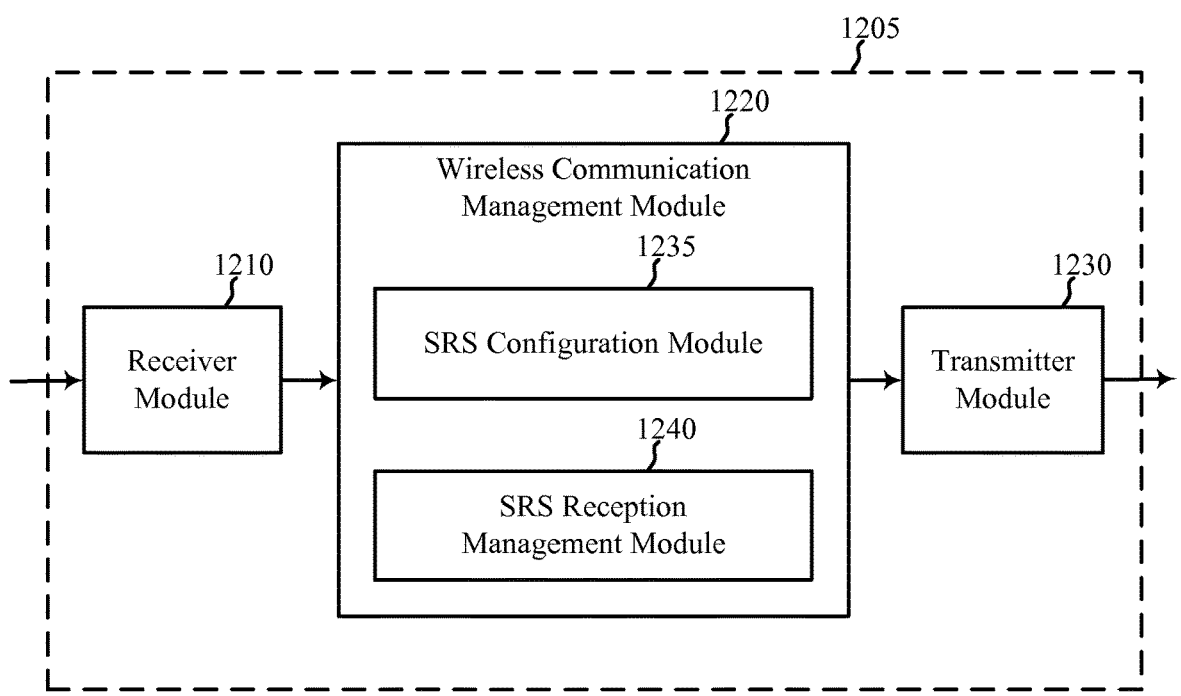
FIG. 12 shows a block diagram of an apparatus for use in wireless communication, in accordance with aspects of the present disclosure.

FIG. 12 shows a block diagram 1200 of an apparatus 1205 for use in wireless communication, in accordance with aspects of the present disclosure. The apparatus 1205 may be an example of aspects of one or more of the base stations 105, 205, 206, 605, 705, 805, or 905 described with reference to FIG. 1, 2, 6, 7, 8, or 9. Additionally or alternatively, the apparatus 1205 may be or include a processor. The apparatus 1205 may include a receiver module 1210, a wireless communication management module 1220, or a transmitter module 1230. Each of these modules may be in communication with each other.

The modules of the apparatus 1205 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1210 may include at least one RF receiver, such as at least one RF receiver operable to receive transmissions over a licensed radio frequency spectrum band (e.g., a radio frequency spectrum band for which transmitting apparatuses may not be required to contend for access because the radio frequency spectrum band is licensed to some users, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the unlicensed radio frequency spectrum band may be used for LTE/LTE-A communications, as described, for example, with reference to FIG. 1, 2, 3, 4, or 5. The receiver module 1210 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 1230 may include at least one RF transmitter, such as at least one RF transmitter operable to transmit over the licensed radio frequency spectrum band or the unlicensed radio frequency spectrum band. The transmitter module 1230 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management module 1220 may be used to manage one or more aspects of wireless communication for the apparatus 1205. In some examples, the wireless communication management module 1220 may include an SRS configuration module 1235 or an SRS reception management module 1240.

In some examples, the SRS configuration module 1235 may be used to configure a sounding reference signal transmission. In some examples, the SRS configuration module 1235 may be used to transmit to a UE an indication of a set of one or more uplink interlaces of an unlicensed radio frequency spectrum band allocated for a sounding reference signal. The interlaces of the unlicensed radio frequency spectrum band may in some examples be configured as described with reference to FIG. 4.

In some examples, the SRS reception management module 1240 may be used to receive the sounding reference signal for the UE over the indicated set of one or more uplink interlaces of the unlicensed radio frequency spectrum band.

In some examples, the apparatus 1205 may be configured or used similarly to the base station 605 or 705 described with reference to FIG. 6 or 7.

Figure 13:
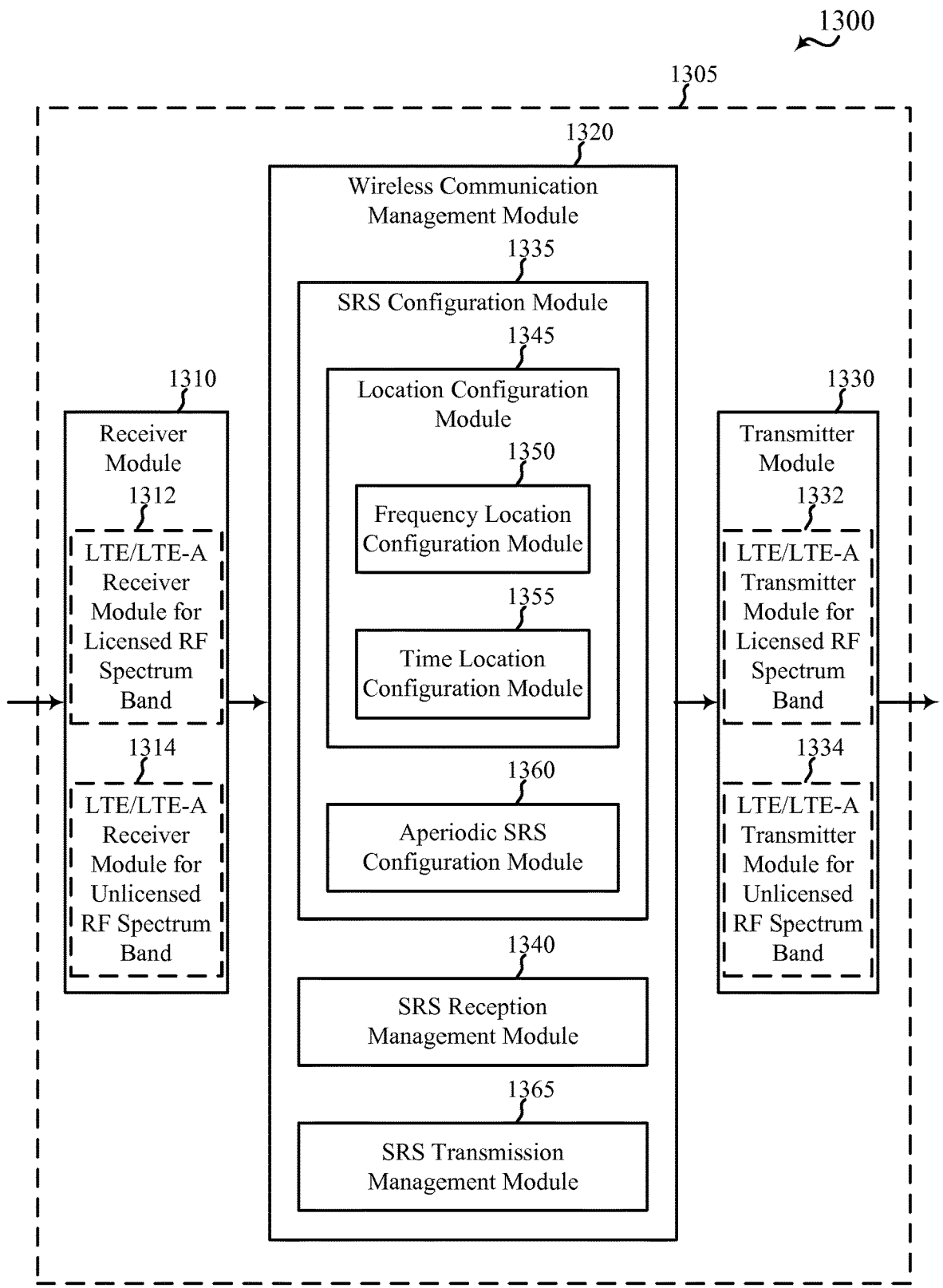
FIG. 13 shows a block diagram of an apparatus for use in wireless communication, in accordance with aspects of the present disclosure.

FIG. 13 shows a block diagram 1300 of an apparatus 1305 for use in wireless communication, in accordance with aspects of the present disclosure. The apparatus 1305 may be an example of aspects of one or more of the base stations 105, 205, 206, 605, 705, 805, or 905 described with reference to FIG. 1, 2, 6, 7, 8 or 9, or apparatus 1205 described with reference to FIG. 12. Additionally or alternatively, the apparatus 1305 may be or include a processor. The apparatus 1305 may include a receiver module 1310, a wireless communication management module 1320, or a transmitter module 1330. Each of these modules may be in communication with each other.

The modules of the apparatus 1305 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1310 may include at least one RF receiver, such as at least one RF receiver operable to receive transmissions over a licensed radio frequency spectrum band (e.g., a radio frequency spectrum band for which transmitting apparatuses may not be required to contend for access because the radio frequency spectrum band is licensed to some users, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the unlicensed radio frequency spectrum band may be used for LTE/LTE-A communications, as described, for example, with reference to FIG. 1, 2, 3, 4, or 5. The receiver module 1310 may in some cases include separate receivers for the licensed radio frequency spectrum band and the unlicensed radio frequency spectrum band. The separate receivers may, in some examples, take the form of an LTE/LTE-A receiver module for communicating over the licensed radio frequency spectrum band (e.g., LTE/LTE-A receiver module for licensed RF spectrum band 1312), and an LTE/LTE-A receiver module for communicating over the unlicensed radio frequency spectrum band (e.g., LTE/LTE-A receiver module for unlicensed RF spectrum band 1314). The receiver module 1310, including the LTE/LTE-A receiver module for licensed RF spectrum band 1312 or the LTE/LTE-A receiver module for unlicensed RF spectrum band 1314, may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 1330 may include at least one RF transmitter, such as at least one RF transmitter operable to transmit over the licensed radio frequency spectrum band or the unlicensed radio frequency spectrum band. The transmitter module 1330 may in some cases include separate transmitters for the licensed radio frequency spectrum band and the unlicensed radio frequency spectrum band. The separate transmitters may, in some examples, take the form of an LTE/LTE-A transmitter module for communicating over the licensed radio frequency spectrum band (e.g., LTE/LTE-A transmitter module for licensed RF spectrum band 1332), and an LTE/LTE-A transmitter module for communicating over the unlicensed radio frequency spectrum band (e.g., LTE/LTE-A transmitter module for unlicensed RF spectrum band 1334). The transmitter module 1330, including the LTE/LTE-A transmitter module for licensed RF spectrum band 1332 or the LTE/LTE-A transmitter module for unlicensed RF spectrum band 1334, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management module 1320 may be used to manage one or more aspects of wireless communication for the apparatus 1305. In some examples, the wireless communication management module 1320 may include an SRS configuration module 1335, an SRS reception management module 1340, or a CCA module 1365.

In some examples, the SRS configuration module 1335 may be used to configure a sounding reference signal transmission. In some examples, the SRS configuration module 1335 may include a location configuration module 1345, or an aperiodic SRS configuration module 1360. The location configuration module 1345 may include a frequency location configuration module 1350 or a time location configuration module 1355.

In some examples, the frequency location configuration module 1350 may be used to transmit, to a UE, an indication of a set of one or more uplink interlaces of the unlicensed radio frequency spectrum band allocated for a sounding reference signal. The interlaces of the unlicensed radio frequency spectrum band may in some examples be configured as described with reference to FIG. 4. Each interlace may include a plurality of resource blocks, and each resource block may include a plurality of subcarriers (or tones), as described with reference to FIG. 5.

In a first example, the set of one or more uplink interlaces allocated for the sounding reference signal may include all of the uplink interlaces in a component carrier bandwidth. In a second example, the set of one or more uplink interlaces allocated for the sounding reference signal may include a single uplink interlace (e.g., a single PUSCH interlace) in a component carrier bandwidth. In a third example, the set of one or more uplink interlaces allocated for the sounding reference signal may include a group of two or more uplink interlaces in a component carrier bandwidth. The first example may decrease frequency domain multiplexing options per symbol, and therefore increase a reliance on time domain multiplexing options. This may improve UE power consumption, but at the expense of fewer transmit opportunities in time. The second example may increase frequency domain multiplexing options per symbol, but may increase a UE's time interval between transmissions of a sounding reference signal on a particular uplink interlace. The third example provides a configurable balance between frequency domain multiplexing options per symbol and a UE's time interval between transmissions of a sounding reference signal on a particular uplink interlace. In some examples, the apparatus 1305 may dynamically or semi-statically select or change the set of one or more uplink interlaces allocated for the sounding reference signal.

In some examples, the number of uplink interlaces included in the set of one or more uplink interlaces allocated for the sounding reference signal may be based at least in part on a distance between the apparatus 1305 and the UE, or based at least in part on a transmit power of the UE.

In some examples, the frequency location configuration module 1350 may be used to identify a set of subcarriers, of the set of one or more uplink interlaces, for receiving the sounding reference signal. In a first example, the set of subcarriers may include each of the subcarriers associated with the set of one or more uplink interlaces. In a second example, the set of subcarriers may include a subset of the subcarriers (e.g., a frequency tone interlace or frequency comb), which subset of the subcarriers is associated with the UE. The first example may be more tolerant to a power ramp, since measuring the power in half of a symbol may be sufficient. However, depending on the choice of DFT length for a sounding reference signal sequence, a sounding reference signal sequence of a new length may be needed (e.g., a length 6 CGS). In some examples, the apparatus 1305 may transmit to the UE an indication of the set of subcarriers. In some examples, the apparatus 1305 may dynamically or semi-statically select or change the subcarriers for receiving the sounding reference signal.

In some examples, the time location configuration module 1355 may be used to transmit, to the UE, an indication of an uplink subframe in which the sounding reference signal is to be received. In some examples, the uplink subframe may be a first uplink subframe or a last uplink subframe of an uplink transmission period (e.g., subframe SF7 or SF9 in FIG. 3). In some examples, the apparatus 1305 may dynamically or semi-statically select or change the uplink subframe in which the sounding reference signal is to be transmitted.

In some examples, the time location configuration module 1355 may be used to transmit, to the UE, an indication of a symbol of an uplink subframe in which the sounding reference signal is to be received. In a first example, the symbol may include a first symbol of a first uplink subframe of an uplink transmission period. In a second example, the symbol may include a first symbol of a last uplink subframe of an uplink transmission period. In a third example, the symbol may include a last symbol of a last uplink subframe of an uplink transmission period. The first example may provide the sounding reference signal to the apparatus 1305 at an earlier time, but with a risk that the sounding reference signal may not be transmitted because the UE has not yet won contention for access to the unlicensed radio frequency spectrum band, and with a risk that activities by other nodes contending for access to the unlicensed radio frequency spectrum band (e.g., nodes close to the apparatus 1305) may interfere with the apparatus' receipt of the sounding reference signal. The second and third examples may mitigate the risks of the first example, but increase the likelihood of the sounding reference signal being interfered with by transmissions of other apparatuses of a same operator deployment. In some examples, the indication of the symbol may include an indication of one or more of a first symbol of the uplink subframe or a last symbol of the uplink subframe. In some examples, the apparatus 1305 may dynamically or semi-statically select or change the symbol in which the sounding reference signal is to be received.

In some examples of the apparatus 1305, each of the indications transmitted to the UE may be transmitted by the SRS configuration module 1335 as part of the same transmission or on the same channel. In other examples, the indications may be transmitted as parts of different transmissions, or on different channels.

In some examples, the SRS reception management module 1340 may be used to receive the sounding reference signal for the UE. The sounding reference signal may be received over the indicated set of one or more uplink interlaces and using other configured/selected resources of the unlicensed radio frequency spectrum band (e.g., the indicated uplink subframe and symbol(s), or the identified subcarriers). The sounding reference signal may be based at least in part a sounding reference signal sequence.

In some examples, the sounding reference signal sequence for a resource block of the set of one or more uplink interlaces may be based at least in part on a location of the resource block within the set of one or more uplink interlaces. In some examples, the sounding reference signal sequence for a resource block may be based at least in part on an uplink interlace associated with the resource block. In some examples, the sounding reference signal sequence for a resource block may be based at least in part on a UE identifier or a cell identifier.

Because different LBT radio frames received over an unlicensed radio frequency spectrum band can have different TDD configurations, the sounding reference signal received by the SRS reception management module 1340 may be one of a plurality of recurring and periodic sounding reference signal transmissions, or one of a plurality of recurring and non-periodic sounding reference signal transmissions. The sounding reference signal received by the SRS reception management module 1340 may also be an aperiodic sounding reference signal transmission.

In some instances, a UE may be allocated a PUSCH during a frame, but may not need to transmit a sounding reference signal on the PUSCH. To account for these instances, and to avoid discontinuities in transmissions over the unlicensed radio frequency spectrum band, the SRS configuration module 1135 may in some examples transmit to the UE an indication that the set of one or more uplink interlaces is designated for sounding reference signal transmissions by UEs that are not scheduled to transmit a sounding reference signal during a frame.

In some instances, a UE may not transmit a periodic sounding reference signal over a particular uplink interlace, or may not transmit a periodic sounding reference signal over the particular uplink interlace within a threshold period of time (e.g., due to unavailability of a channel of the unlicensed radio frequency spectrum band). In these instances, the UE may transmit an aperiodic sounding reference signal to fill a gap in channel sounding. In some examples, the apparatus 1305 may indicate to the UE a set of uplink interlaces that are to be sounded using an aperiodic sounding reference signal. In some examples, the set of uplink interlaces to be sounded using the aperiodic sounding reference signal may be indicated in a downlink grant or an uplink grant, or in a group common DCI, by the aperiodic SRS configuration module 1360.

In some examples, the CCA module 1365 may be used to contend for access to the unlicensed radio frequency spectrum band. In some examples, the CCA module 1365 may contend for access to the unlicensed radio frequency spectrum band by performing a DCCA, as described, for example, with reference to FIG. 3. Upon winning a contention for access to the unlicensed radio frequency spectrum band, the CCA module 1365 may enable the wireless communication management module 1320 to transmit a CUBS over the unlicensed radio frequency spectrum band or enable the SRS configuration module 1335 to transmit the various indications to the UE over the unlicensed radio frequency spectrum band.

In some examples, the apparatus 1305 may be configured or used similarly to the UE 615 or 715 described with reference to FIG. 6 or 7.

Figure 14:
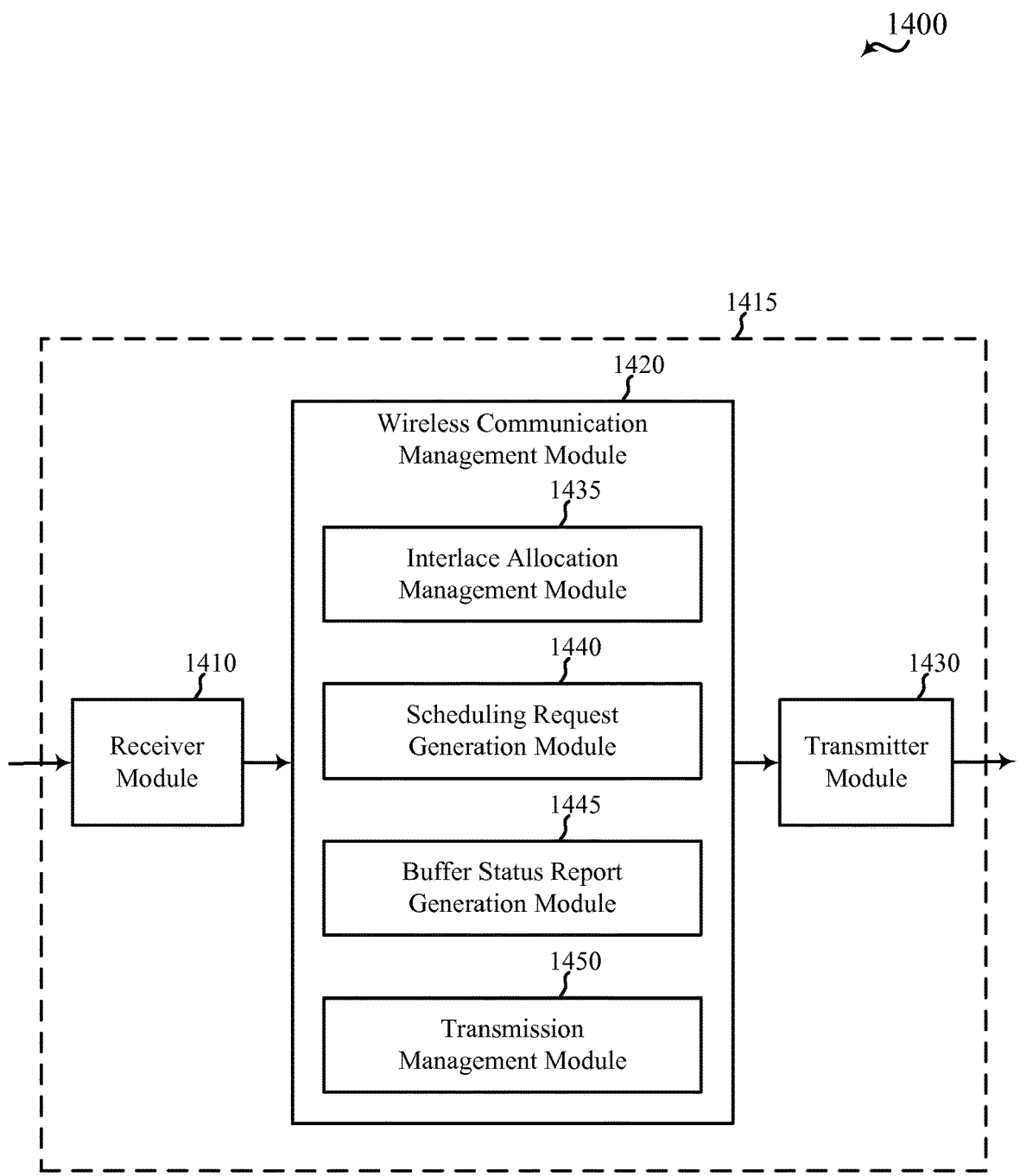
FIG. 14 shows a block diagram of an apparatus for use in wireless communication, in accordance with various aspects of the present disclosure.

FIG. 14 shows a block diagram 1400 of an apparatus 1415 for use in wireless communication, in accordance with aspects of the present disclosure. The apparatus 1415 may be an example of aspects of one or more of the UEs 115, 215, 216, 217, 218, 615, 715, 815, or 915 described with reference to FIG. 1, 2, 6, 7, 8, or 9, or apparatuses 1015 or 1115 described with reference to FIG. 10 or 11. Additionally or alternatively, the apparatus 1415 may be or include a processor. The apparatus 1415 may include a receiver module 1410, a wireless communication management module 1420, or a transmitter module 1430. Each of these modules may be in communication with each other.

The modules of the apparatus 1415 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1410 may include at least one RF receiver, such as at least one RF receiver operable to receive transmissions over a licensed radio frequency spectrum band (e.g., a radio frequency spectrum band for which transmitting apparatuses may not be required to contend for access because the radio frequency spectrum band is licensed to some users, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the unlicensed radio frequency spectrum band may be used for LTE/LTE-A communications, as described, for example, with reference to FIG. 1, 2, 3, 4, or 5. The receiver module 1410 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 1430 may include at least one RF transmitter, such as at least one RF transmitter operable to transmit over the licensed radio frequency spectrum band or the unlicensed radio frequency spectrum band. The transmitter module 1430 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management module 1420 may be used to manage one or more aspects of wireless communication for the apparatus 1415. In some examples, the wireless communication management module 1420 may include an interlace allocation management module 1435, a scheduling request preparation module 1440, a buffer status report preparation module 1445, or a transmission management module 1450.

In some examples, the interlace allocation management module 1435 may be used to receive an indication of an interlace of an unlicensed radio frequency spectrum band allocated for a PUCCH transmission. The interlace of the unlicensed radio frequency spectrum band may in some examples be configured as described with reference to FIG. 4.

In some examples, the scheduling request preparation module 1440 may be used to prepare a scheduling request. The scheduling request may in some examples be a single bit indicating whether a scheduling request is being made.

In some examples, the buffer status report preparation module 1445 may be used to prepare a buffer status report. The buffer status report may in some examples take the form of a short buffer status report (e.g., a 6-bit report) or a long buffer status report (e.g., a 24-bit report).

In some examples, the transmission management module 1450 may be used to transmit the scheduling request and the buffer status report over the indicated interlace.

In some examples, the apparatus 1415 may be configured or used similarly to the UE 815 or 915 described with reference to FIG. 8 or 9.

Figure 15:
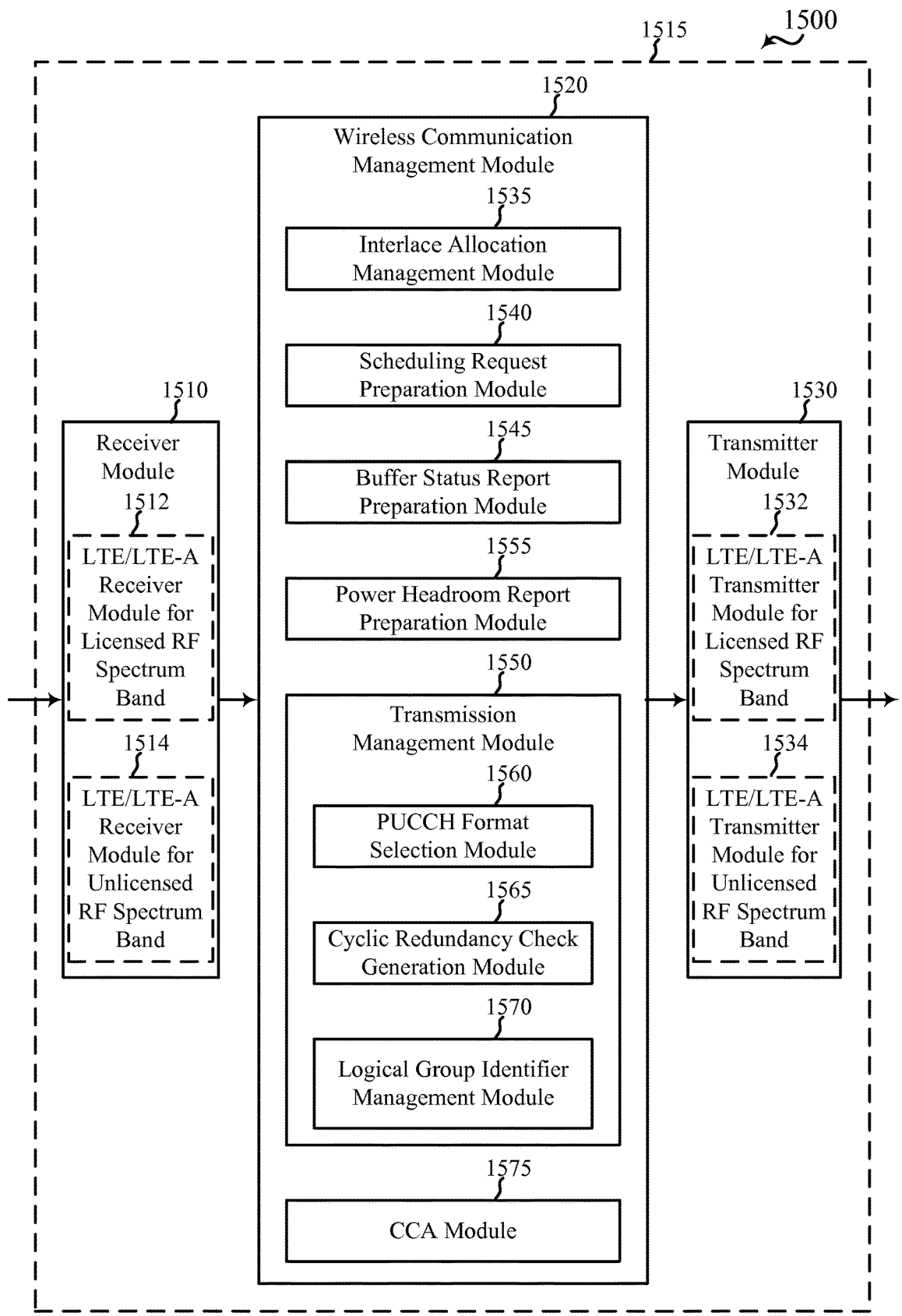
FIG. 15 shows a block diagram of an apparatus for use in wireless communication, in accordance with aspects of the present disclosure.

FIG. 15 shows a block diagram 1500 of an apparatus 1515 for use in wireless communication, in accordance with aspects of the present disclosure. The apparatus 1515 may be an example of aspects of one or more of the UEs 115, 215, 216, 217, 218, 815, or 915 described with reference to FIG. 1, 2, 8, or 9, or apparatuses 1015, 1115, or 1415 described with reference to FIG. 10, 11, or 14. Additionally or alternatively, the apparatus 1515 may be or include a processor. The apparatus 1515 may include a receiver module 1510, a wireless communication management module 1520, or a transmitter module 1530. Each of these modules may be in communication with each other.

The modules of the apparatus 1515 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1510 may include at least one RF receiver, such as at least one RF receiver operable to receive transmissions over a licensed radio frequency spectrum band (e.g., a radio frequency spectrum band for which transmitting apparatuses may not be required to contend for access because the radio frequency spectrum band is licensed to some users, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the unlicensed radio frequency spectrum band may be used for LTE/LTE-A communications, as described, for example, with reference to FIG. 1, 2, 3, 4, or 5. The receiver module 1510 may in some cases include separate receivers for the licensed radio frequency spectrum band and the unlicensed radio frequency spectrum band. The separate receivers may, in some examples, take the form of an LTE/LTE-A receiver module for communicating over the licensed radio frequency spectrum band (e.g., LTE/LTE-A receiver module for licensed RF spectrum band 1512), and an LTE/LTE-A receiver module for communicating over the unlicensed radio frequency spectrum band (e.g., LTE/LTE-A receiver module for unlicensed RF spectrum band 1514). The receiver module 1510, including the LTE/LTE-A receiver module for licensed RF spectrum band 1512 or the LTE/LTE-A receiver module for unlicensed RF spectrum band 1514, may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 1530 may include at least one RF transmitter, such as at least one RF transmitter operable to transmit over the licensed radio frequency spectrum band or the unlicensed radio frequency spectrum band. The transmitter module 1530 may in some cases include separate transmitters for the licensed radio frequency spectrum band and the unlicensed radio frequency spectrum band. The separate transmitters may, in some examples, take the form of an LTE/LTE-A transmitter module for communicating over the licensed radio frequency spectrum band (e.g., LTE/LTE-A transmitter module for licensed RF spectrum band 1532), and an LTE/LTE-A transmitter module for communicating over the unlicensed radio frequency spectrum band (e.g., LTE/LTE-A transmitter module for unlicensed RF spectrum band 1534). The transmitter module 1530, including the LTE/LTE-A transmitter module for licensed RF spectrum band 1532 or the LTE/LTE-A transmitter module for unlicensed RF spectrum band 1534, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management module 1520 may be used to manage one or more aspects of wireless communication for the apparatus 1515. In some examples, the wireless communication management module 1520 may include an interlace allocation management module 1535, a scheduling request preparation module 1540, a buffer status report preparation module 1545, a power headroom report preparation module 1555, a transmission management module 1550, or a CCA module 1575.

In some examples, the interlace allocation management module 1535 may be used to receive an indication of an interlace of an unlicensed radio frequency spectrum band allocated for a PUCCH transmission. The interlace of the unlicensed radio frequency spectrum band may in some examples be configured as described with reference to FIG. 4.

In some examples, the scheduling request preparation module 1540 may be used to prepare a scheduling request. The scheduling request may in some examples be a single bit indicating whether a scheduling request is being made.

In some examples, the buffer status report preparation module 1545 may be used to prepare a buffer status report. The buffer status report may in some examples take the form of a short buffer status report (e.g., a 6-bit report) or a long buffer status report (e.g., a 24-bit report).

In some examples, the power headroom report preparation module 1555 may be used to prepare a power headroom report. The power headroom report may in some examples be a G-bit report.

In some examples, the transmission management module 1550 may be used to transmit the scheduling request and the buffer status report over the indicated interlace, and optionally transmit the power headroom report, a logical group identifier, or a cyclic redundancy check with the scheduling request and the buffer status report over the indicated interlace. In some examples, the transmission management module 1550 may include a PUCCH format selection module 1560, a cyclic redundancy check generation module 1565, or a logical group identifier management module 1570. The PUCCH format selection module 1560 may be used, for example, to select one of a plurality of predefined PUCCH formats for transmitting the scheduling request and the buffer status report, and optionally the power headroom report. In some examples, the PUCCH format may be selected based at least in part on a size of a payload to be transmitted over the indicated interlace, or on a size of the buffer status report. In the case of a short buffer status report, the selected PUCCH format may in some examples be Format 1b. The cyclic redundancy check generation module 1565 may be used, for example, to generate a cyclic redundancy check for at least the scheduling request and the buffer status report, and optionally for the power headroom report. In some examples, generating the cyclic redundancy check may include adjusting a size of the cyclic redundancy check based at least in part on a remaining number of bits in the indicated interlace (e.g., after accounting for the scheduling request, buffer status report, and optionally the power headroom report). The logical group identifier management module 1570 may be use d, in some examples, to determine a logical group identifier (e.g., a 2-bit identifier) for the transmission of the scheduling request, buffer status report, or power headroom report.

In some examples, the CCA module 1575 may be used to contend for access to the unlicensed radio frequency spectrum band. In some examples, the CCA module 1575 may contend for access to the unlicensed radio frequency spectrum band by performing a UCCA, as described, for example, with reference to FIG. 3. Upon winning a contention for access to the unlicensed radio frequency spectrum band, the CCA module 1575 may enable the wireless communication management module 1520 to transmit a CUBS over the unlicensed radio frequency spectrum band or enable the transmission management module 1550 to transmit the scheduling request, buffer status report, or power headroom report over the unlicensed radio frequency spectrum band.

In some examples, the apparatus 1515 may be configured or used similarly to the UE 815 or 915 described with reference to FIG. 8 or 9.

Figure 16:
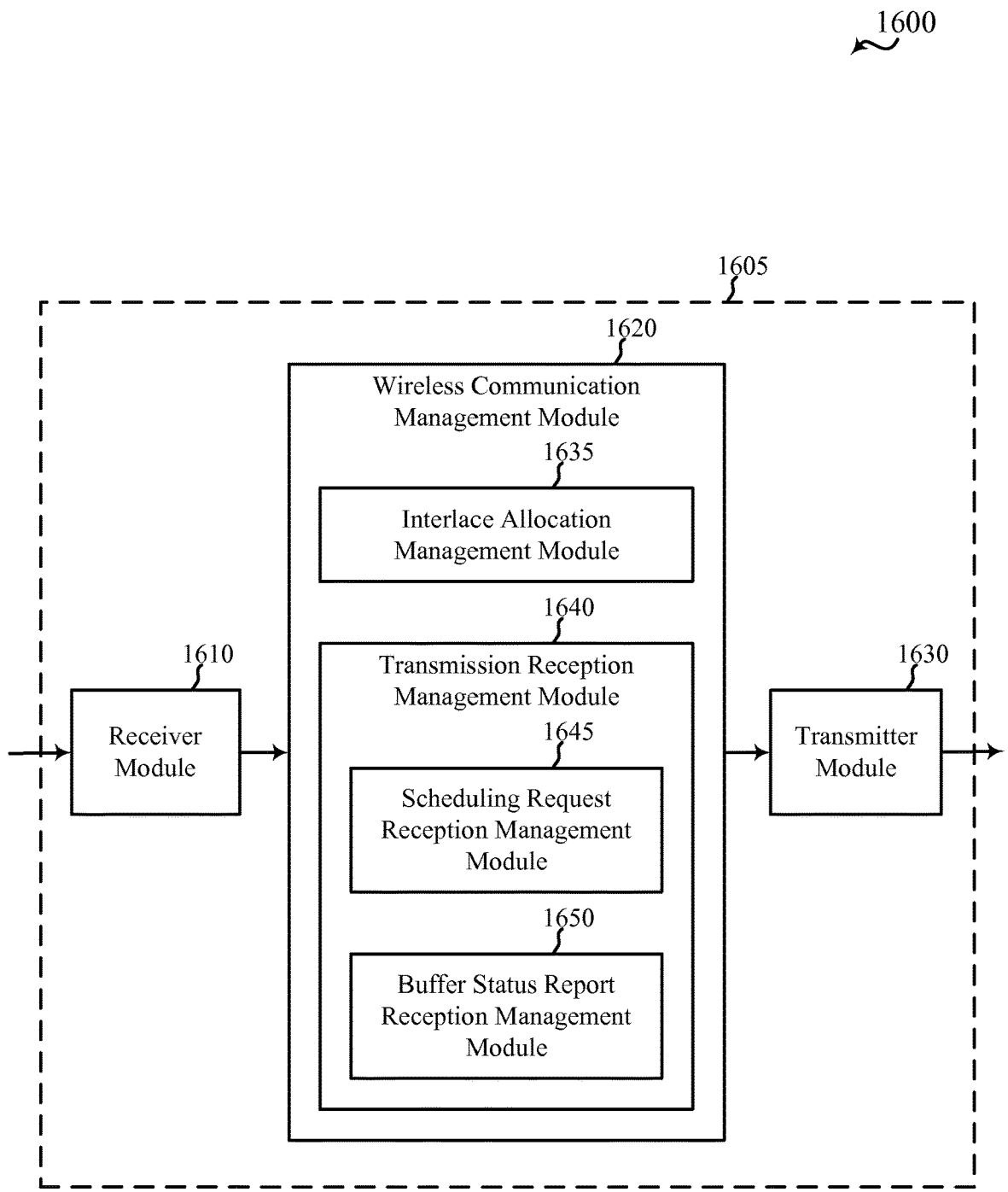
FIG. 16 shows a block diagram of an apparatus for use in wireless communication, in accordance with aspects of the present disclosure.

FIG. 16 shows a block diagram 1600 of an apparatus 1605 for use in wireless communication, in accordance with aspects of the present disclosure. The apparatus 1605 may be an example of aspects of one or more of the base stations 105, 205, 206, 805, or 905 described with reference to FIG. 1, 2, 8, or 9, or apparatuses 1205 or 1305 described with reference to FIG. 12 or 13. Additionally or alternatively, the apparatus 1605 may be or include a processor. The apparatus 1605 may include a receiver module 1610, a wireless communication management module 1620, or a transmitter module 1630. Each of these modules may be in communication with each other.

The modules of the apparatus 1605 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1610 may include at least one RF receiver, such as at least one RF receiver operable to receive transmissions over a licensed radio frequency spectrum band (e.g., a radio frequency spectrum band for which transmitting apparatuses may not be required to contend for access because the radio frequency spectrum band is licensed to some users, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the unlicensed radio frequency spectrum band may be used for LTE/LTE-A communications, as described, for example, with reference to FIG. 1, 2, 3, 4, or 5. The receiver module 1610 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 1630 may include at least one RF transmitter, such as at least one RF transmitter operable to transmit over the licensed radio frequency spectrum band or the unlicensed radio frequency spectrum band. The transmitter module 1630 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management module 1620 may be used to manage one or more aspects of wireless communication for the apparatus 1605. In some examples, the wireless communication management module 1620 may include an interlace allocation management module 1635 or a transmission reception management module 1640.

In some examples, the interlace allocation management module 1635 may be used to transmit an indication of an interlace of an unlicensed radio frequency spectrum band to a UE for a PUCCH transmission. The interlace of the unlicensed radio frequency spectrum band may in some examples be configured as described with reference to FIG. 4.

In some examples, the transmission reception management module 1640 may be used to receiving a scheduling request and a buffer status report for the UE over the interlace. The scheduling request may be received by a scheduling request reception management module 1645, and the buffer status report may be received by a buffer status report reception management module 1650.

In some examples, the apparatus 1605 may be configured or used similarly to the base station 805 or 905 described with reference to FIG. 8 or 9.

Figure 17:
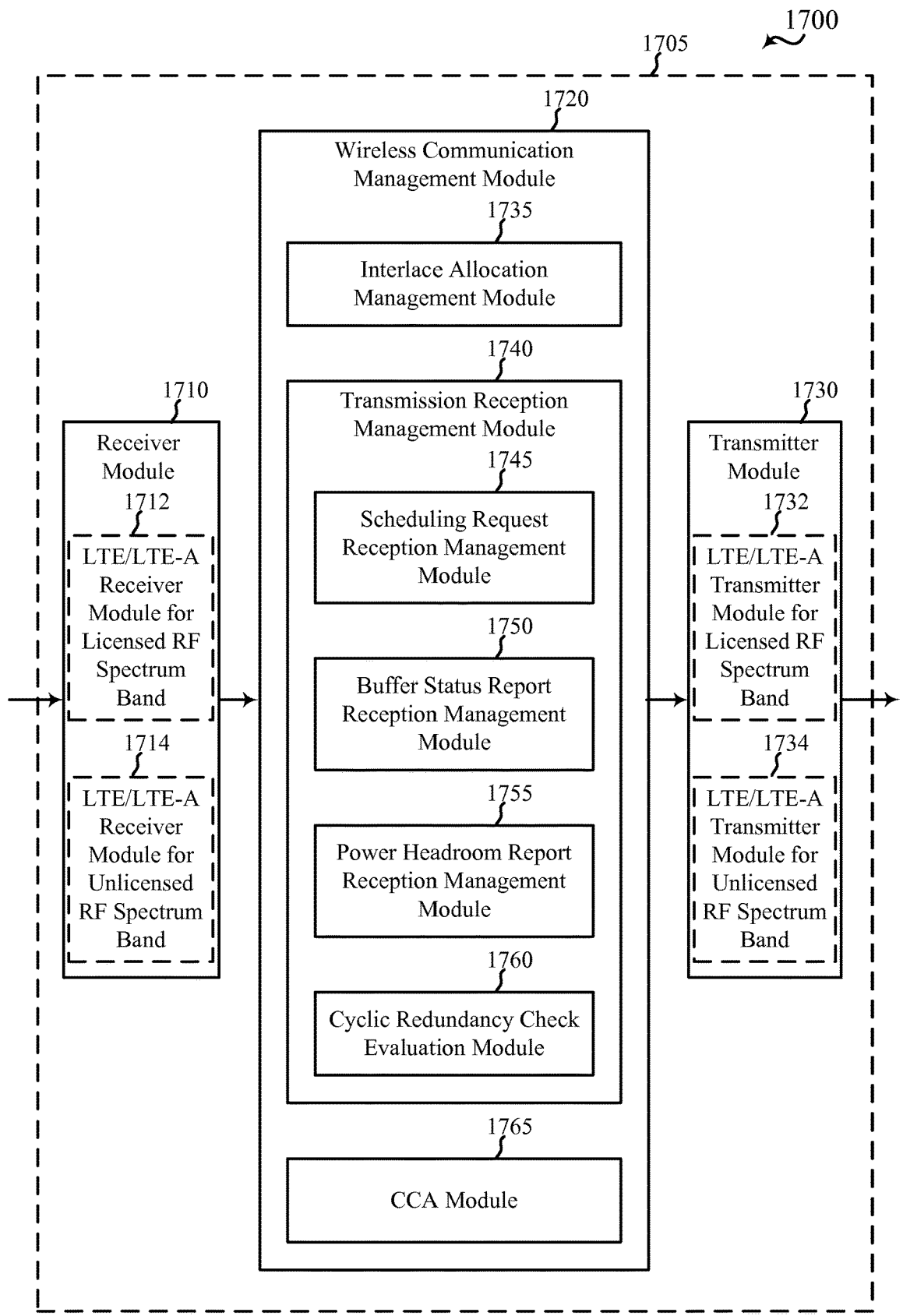
FIG. 17 shows a block diagram of an apparatus for use in wireless communication, in accordance with aspects of the present disclosure.

FIG. 17 shows a block diagram 1700 of an apparatus 1705 for use in wireless communication, in accordance with aspects of the present disclosure. The apparatus 1705 may be an example of aspects of one or more of the base stations 105, 205, 206, 805, or 905 described with reference to FIG. 1, 2, 8, or 9, or apparatuses 1205, 1305, or 1605 described with reference to FIG. 12, 13, or 16. Additionally or alternatively, the apparatus 1705 may be or include a processor. The apparatus 1705 may include a receiver module 1710, a wireless communication management module 1720, or a transmitter module 1730. Each of these modules may be in communication with each other.

The modules of the apparatus 1705 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1710 may include at least one RF receiver, such as at least one RF receiver operable to receive transmissions over a licensed radio frequency spectrum band (e.g., a radio frequency spectrum band for which transmitting apparatuses may not be required to contend for access because the radio frequency spectrum band is licensed to some users, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the unlicensed radio frequency spectrum band may be used for LTE/LTE-A communications, as described, for example, with reference to FIG. 1, 2, 3, 4, or 5. The receiver module 1710 may in some cases include separate receivers for the licensed radio frequency spectrum band and the unlicensed radio frequency spectrum band. The separate receivers may, in some examples, take the form of an LTE/LTE-A receiver module for communicating over the licensed radio frequency spectrum band (e.g., LTE/LTE-A receiver module for licensed RF spectrum band 1712), and an LTE/LTE-A receiver module for communicating over the unlicensed radio frequency spectrum band (e.g., LTE/LTE-A receiver module for unlicensed RF spectrum band 1714). The receiver module 1710, including the LTE/LTE-A receiver module for licensed RF spectrum band 1712 or the LTE/LTE-A receiver module for unlicensed RF spectrum band 1714, may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 1730 may include at least one RF transmitter, such as at least one RF transmitter operable to transmit over the licensed radio frequency spectrum band or the unlicensed radio frequency spectrum band. The transmitter module 1730 may in some cases include separate transmitters for the licensed radio frequency spectrum band and the unlicensed radio frequency spectrum band. The separate transmitters may, in some examples, take the form of an LTE/LTE-A transmitter module for communicating over the licensed radio frequency spectrum band (e.g., LTE/LTE-A transmitter module for licensed RF spectrum band 1732), and an LTE/LTE-A transmitter module for communicating over the unlicensed radio frequency spectrum band (e.g., LTE/LTE-A transmitter module for unlicensed RF spectrum band 1734). The transmitter module 1730, including the LTE/LTE-A transmitter module for licensed RF spectrum band 1732 or the LTE/LTE-A transmitter module for unlicensed RF spectrum band 1734, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management module 1720 may be used to manage one or more aspects of wireless communication for the apparatus 1705.

In some examples, the wireless communication management module 1720 may include an interlace allocation management module 1735, a transmission reception management module 1740, or a CCA module 1765.

In some examples, the interlace allocation management module 1735 may be used to transmit an indication of an interlace of an unlicensed radio frequency spectrum band to a UE for a PUCCH transmission. The interlace of the unlicensed radio frequency spectrum band may in some examples be configured as described with reference to FIG. 4.

In some examples, the transmission reception management module 1740 may be used to receiving a scheduling request and a buffer status report for the UE over the interlace, and optionally, to receive a power headroom report, a logical group identifier, or a cyclic redundancy check with the scheduling request and the buffer status report over the indicated interlace. The scheduling report, buffer status report, or power headroom report may be received using one of a plurality of predefined PUCCH formats. In the case of a short buffer status report, the selected PUCCH format may in some examples be Format 1b. In some examples, the PUCCH format may be based at least in part on a size of a payload to be transmitted over the indicated interlace, or on a size of the buffer status report.

The scheduling request may be received by a scheduling request reception management module 1745. The scheduling request may in some examples be a single bit indicating whether a scheduling request is being made.

The buffer status report may be received by a buffer status report reception management module 1750. The buffer status report may in some examples take the form of a short buffer status report (e.g., a 6-bit report) or a long buffer status report (e.g., a 24-bit report).

The power headroom report may be received by a power headroom report reception management module 1755. The power headroom report may in some examples be a 6-bit report.

The cyclic redundancy check may be evaluated by the cyclic redundancy check evaluation module 1760. A size of the cyclic redundancy check may be based at least in part on a remaining number of bits in the indicated interlace (e.g., after accounting for the scheduling request, buffer status report, and optionally the power headroom report).

In some examples, the CCA module 1765 may be used to contend for access to the unlicensed radio frequency spectrum band. In some examples, the CCA module 1765 may contend for access to the unlicensed radio frequency spectrum band by performing a DCCA, as described, for example, with reference to FIG. 3. Upon winning a contention for access to the unlicensed radio frequency spectrum band, the CCA module 1765 may enable the wireless communication management module 1720 to transmit a CUBS over the unlicensed radio frequency spectrum band or enable the interlace allocation management module 1735 to transmit the indication of the interlace of the unlicensed radio frequency spectrum band to the UE.

In some examples, the apparatus 1705 may be configured or used similarly to the base station 805 or 905 described with reference to FIG. 8 or 9.

Figure 18:
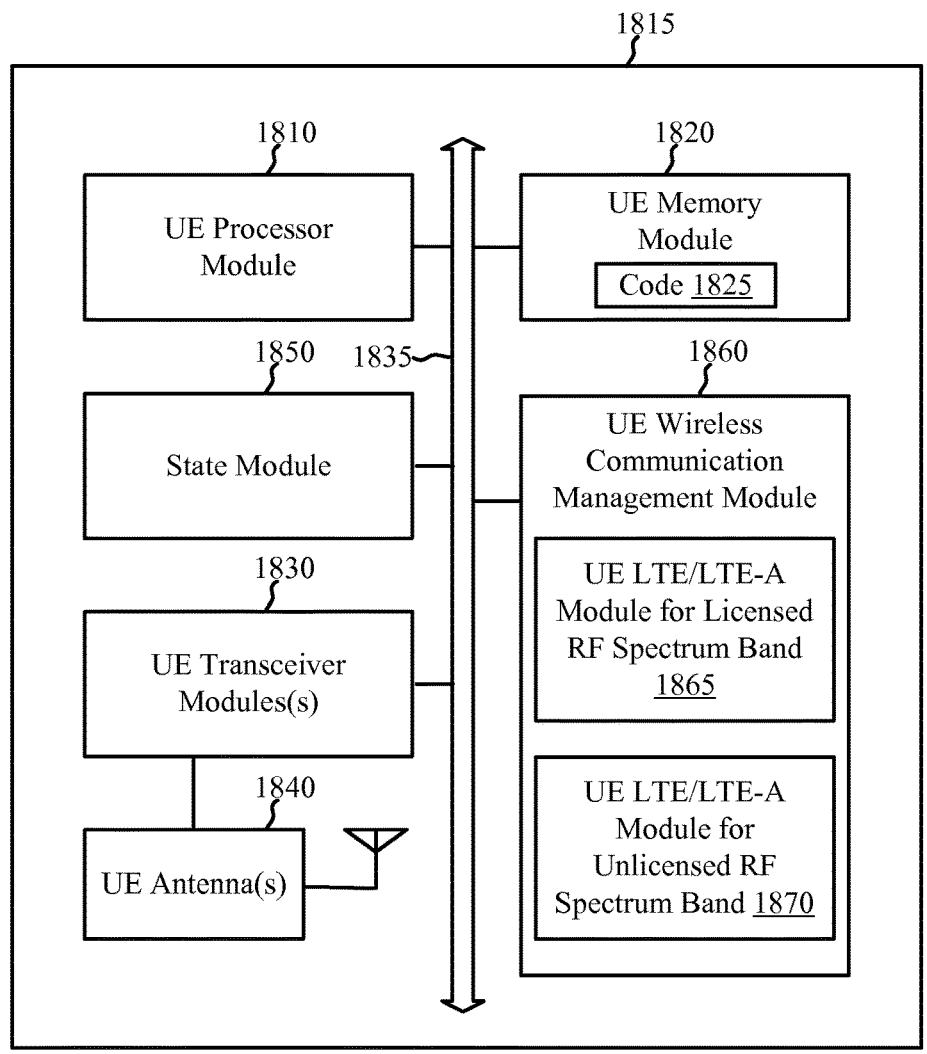
FIG. 18 shows a block diagram of a UE for use in wireless communication, in accordance with aspects of the present disclosure.

FIG. 18 shows a block diagram 1800 of a UE 1815 for use in wireless communication, in accordance with aspects of the present disclosure. The UE 1815 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 1815 may, in some examples, have an internal power supply (not shown), such as a small battery, to facilitate mobile operation. In some examples, the UE 1815 may be an example of aspects of one or more of the UE 115, 215, 216, 217, 218, 615, 715, 815, or 915 described with reference to FIG. 1, 2, 6, 7, 8, or 9, or aspects of one or more of the apparatuses 1015, 1115, 1415, or 1515 described with reference to FIG. 10, 11, 14, or 15. The UE 1815 may be configured to implement at least some of the UE or apparatus features and functions described with reference to FIG. 1, 2, 3, 4, 5, 6, 7, 8, 9, 10, 11, 14, or 15.

The UE 1815 may include a UE processor module 1810, a UE memory module 1820, at least one UE transceiver module (represented by UE transceiver module(s) 1830), at least one UE antenna (represented by UE antenna(s) 1840), or a UE wireless communication management module 1860. Each of these components may be in communication with each other, directly or indirectly, over one or more buses 1835.

The UE memory module 1820 may include random access memory (RAM) or read-only memory (ROM). The UE memory module 1820 may store computer-readable, computer-executable code 1825 containing instructions that are configured to, when executed, cause the UE processor module 1810 to perform various functions described herein related to wireless communication, including the configuration and transmission of a sounding reference signal, a scheduling request, a buffer status report, or a power headroom report over an unlicensed radio frequency spectrum band. Alternatively, the code 1825 may not be directly executable by the UE processor module 1810 but be configured to cause the UE 1815 (e.g., when compiled and executed) to perform various of the functions described herein.

The UE processor module 1810 may include an intelligent hardware device, e.g., a central processing unit (CPU), a microcontroller, an ASIC, etc. The UE processor module 1810 may process information received through the UE transceiver module(s) 1830 or information to be sent to the UE transceiver module(s) 1830 for transmission through the UE antenna(s) 1840. The UE processor module 1810 may handle, alone or in connection with the UE wireless communication management module 1860, various aspects of communicating over (or managing communications over) a licensed radio frequency spectrum band (e.g., a radio frequency spectrum band for which apparatuses do not contend for access because the radio frequency spectrum band is licensed to some users, such as a licensed radio frequency spectrum band usable for LTE/LTE-A communications) or an unlicensed radio frequency spectrum band (e.g., a radio frequency spectrum band for which apparatuses may need to contend for access because the radio frequency spectrum band is available for unlicensed use, such as Wi-Fi use).

The UE transceiver module(s) 1830 may include a modem configured to modulate packets and provide the modulated packets to the UE antenna(s) 1840 for transmission, and to demodulate packets received from the UE antenna(s) 1840. The UE transceiver module(s) 1830 may, in some examples, be implemented as one or more UE transmitter modules and one or more separate UE receiver modules. The UE transceiver module(s) 1830 may support communications in the licensed radio frequency spectrum band or the unlicensed radio frequency spectrum band. The UE transceiver module(s) 1830 may be configured to communicate bi-directionally, via the UE antenna(s) 1840, with one or more of the base stations 105, 205, 206, 605, 705, 805, or 905 described with reference to FIG. 1, 2, 6, 7, 8, or 9, or the apparatus 1205, 1305, 1605, or 1705 described with reference to FIG. 12, 13, 16, or 17. While the UE 1815 may include a single UE antenna, there may be examples in which the UE 1815 may include multiple UE antennas 1840.

The UE state module 1850 may be used, for example, to manage transitions of the UE 1815 between an RRC idle state and an RRC connected state, and may be in communication with other components of the UE 1815, directly or indirectly, over the one or more buses 1835. The UE state module 1850, or portions of it, may include a processor, or some or all of the functions of the UE state module 1850 may be performed by the UE processor module 1810 or in connection with the UE processor module 1810.

The UE wireless communication management module 1860 may be configured to perform or control some or all of the UE or apparatus features or functions described with reference to FIG. 1, 2, 3, 4, 5, 6, 7, 8, 9, 10, 11, 14, or 15 related to wireless communication over a licensed radio frequency spectrum band or an unlicensed radio frequency spectrum band. For example, the UE wireless communication management module 1860 may be configured to support a supplemental downlink mode, a carrier aggregation mode, or a standalone mode using the licensed radio frequency spectrum band or the unlicensed radio frequency spectrum band. The UE wireless communication management module 1860 may include a UE LTE/LTE-A module for licensed RF spectrum band 1865 configured to handle LTE/LTE-A communications in the licensed radio frequency spectrum band, and a UE LTE/LTE-A module for unlicensed RF spectrum band 1870 configured to handle LTE/LTE-A communications in the unlicensed radio frequency spectrum band. The UE wireless communication management module 1860, or portions of it, may include a processor, or some or all of the functions of the UE wireless communication management module 1860 may be performed by the UE processor module 1810 or in connection with the UE processor module 1810. In some examples, the UE wireless communication management module 1860 may be an example of any one or more of wireless communication management modules 1020, 1120, 1420, or 1520 described with reference to FIG. 10, 11, 14, or 15.

Figure 19:
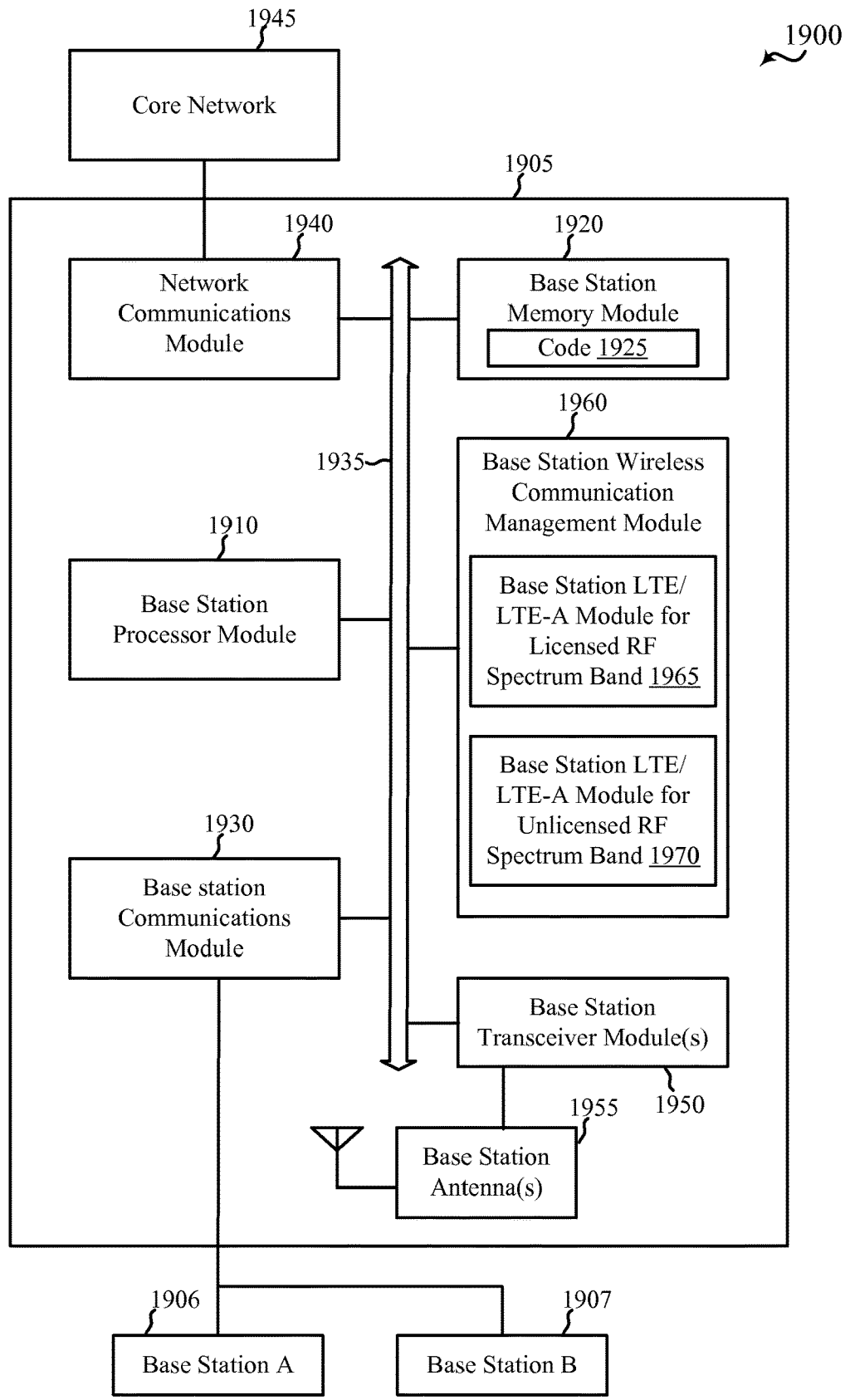
FIG. 19 shows a block diagram of a base station (e.g., a base station forming part or all of an eNB) for use in wireless communication, in accordance with various aspects of the present disclosure.

FIG. 19 shows a block diagram 1900 of a base station 1905 (e.g., a base station forming part or all of an eNB) for use in wireless communication, in accordance with aspects of the present disclosure. In some examples, the base station 1905 may be an example of one or more aspects of the base station 105, 205, 206, 605, 705, 805, or 905 described with reference to FIG. 1, 2, 6, 7, 8, or 9, or aspects of the apparatus 1205, 1305, 1605, or 1705 described with reference to FIG. 12, 13, 16, or 17. The base station 1905 may be configured to implement or facilitate at least some of the base station features and functions described with reference to FIG. 1, 2, 3, 4, 5, 6, 7, 8, 9, 12, 13, 16, or 17.

The base station 1905 may include a base station processor module 1910, a base station memory module 1920, at least one base station transceiver module (represented by base station transceiver module(s) 1950), at least one base station antenna (represented by base station antenna(s) 1955), or a base station wireless communication management module 1960. The base station 1905 may also include one or more of a base station communications module 1930 or a network communications module 1940. Each of these components may be in communication with each other, directly or indirectly, over one or more buses 1935.

The base station memory module 1920 may include RAM or ROM. The base station memory module 1920 may store computer-readable, computer-executable code 1925 containing instructions that are configured to, when executed, cause the base station processor module 1910 to perform various functions described herein related to wireless communication, including the configuration and reception of a sounding reference signal, a scheduling request, a buffer status report, or a power headroom report over an unlicensed radio frequency spectrum band. Alternatively, the code 1925 may not be directly executable by the base station processor module 1910 but be configured to cause the base station 1905 (e.g., when compiled and executed) to perform various of the functions described herein.

The base station processor module 1910 may include an intelligent hardware device, e.g., a CPU, a microcontroller, an ASIC, etc. The base station processor module 1910 may process information received through the base station transceiver module(s) 1950, the base station communications module 1930, or the network communications module 1940. The base station processor module 1910 may also process information to be sent to the transceiver module(s) 1950 for transmission through the antenna(s) 1955, to the base station communications module 1930, for transmission to one or more other base stations 1906 and 1907, or to the network communications module 1940 for transmission to a core network 1945, which may be an example of one or more aspects of the core network 130 described with reference to FIG. 1. The base station processor module 1910 may handle, alone or in connection with the base station wireless communication management module 1960, various aspects of communicating over (or managing communications over) a licensed radio frequency spectrum band (e.g., a radio frequency spectrum band for which apparatuses do not contend for access because the radio frequency spectrum band is licensed to some users, such as a licensed radio frequency spectrum band usable for LTE/LTE-A communications) or an unlicensed radio frequency spectrum band (e.g., a radio frequency spectrum band for which apparatuses may need to contend for access because the radio frequency spectrum band is available for unlicensed use, such as Wi-Fi use).

The base station transceiver module(s) 1950 may include a modem configured to modulate packets and provide the modulated packets to the base station antenna(s) 1955 for transmission, and to demodulate packets received from the base station antenna(s) 1955. The base station transceiver module(s) 1950 may, in some examples, be implemented as one or more base station transmitter modules and one or more separate base station receiver modules. The base station transceiver module(s) 1950 may support communications in the licensed radio frequency spectrum band or the unlicensed radio frequency spectrum band. The base station transceiver module(s) 1950 may be configured to communicate bi-directionally, via the antenna(s) 1955, with one or more UEs or apparatuses, such as one or more of the UEs 115, 215, 216, 217, 218, 615, 715, 815, 915, or 1815 described with reference to FIG. 1, 2, 6, 7, 8, 9, or 18, or one or more of the apparatuses 1015, 1115, 1415, or 1515 described with reference to FIG. 10, 11, 14, or 15. The base station 1905 may, for example, include multiple base station antennas 1955 (e.g., an antenna array). The base station 1905 may communicate with the core network 1945 through the network communications module 1940. The base station 1905 may also communicate with other base stations, such as the base stations 1906 and 1907, using the base station communications module 1930.

The base station wireless communication management module 1960 may be configured to perform or control some or all of the features or functions described with reference to FIG. 1, 2, 3, 4, 5, 6, 7, 8, 9, 12, 13, 16, or 17 related to wireless communication over a licensed radio frequency spectrum band or an unlicensed radio frequency spectrum band. For example, the base station wireless communication management module 1960 may be configured to support a supplemental downlink mode, a carrier aggregation mode, or a standalone mode using the licensed radio frequency spectrum band or the unlicensed radio frequency spectrum band. The base station wireless communication management module 1960 may include a base station LTE/LTE-A module for licensed RF spectrum band 1965 configured to handle LTE/LTE-A communications in the licensed radio frequency spectrum band, and a base station LTE/LTE-A module for unlicensed RF spectrum band 1970 configured to handle LTE/LTE-A communications in the unlicensed radio frequency spectrum band. The base station wireless communication management module 1960, or portions of it, may include a processor, or some or all of the functions of the base station wireless communication management module 1960 may be performed by the base station processor module 1910 or in connection with the base station processor module 1910. In some examples, the base station wireless communication management module 1960 may be an example of any one or more of wireless communication management modules 1220, 1320, 1620, or 1720 described with reference to FIG. 12, 13, 16, or 17.

Figure 20:
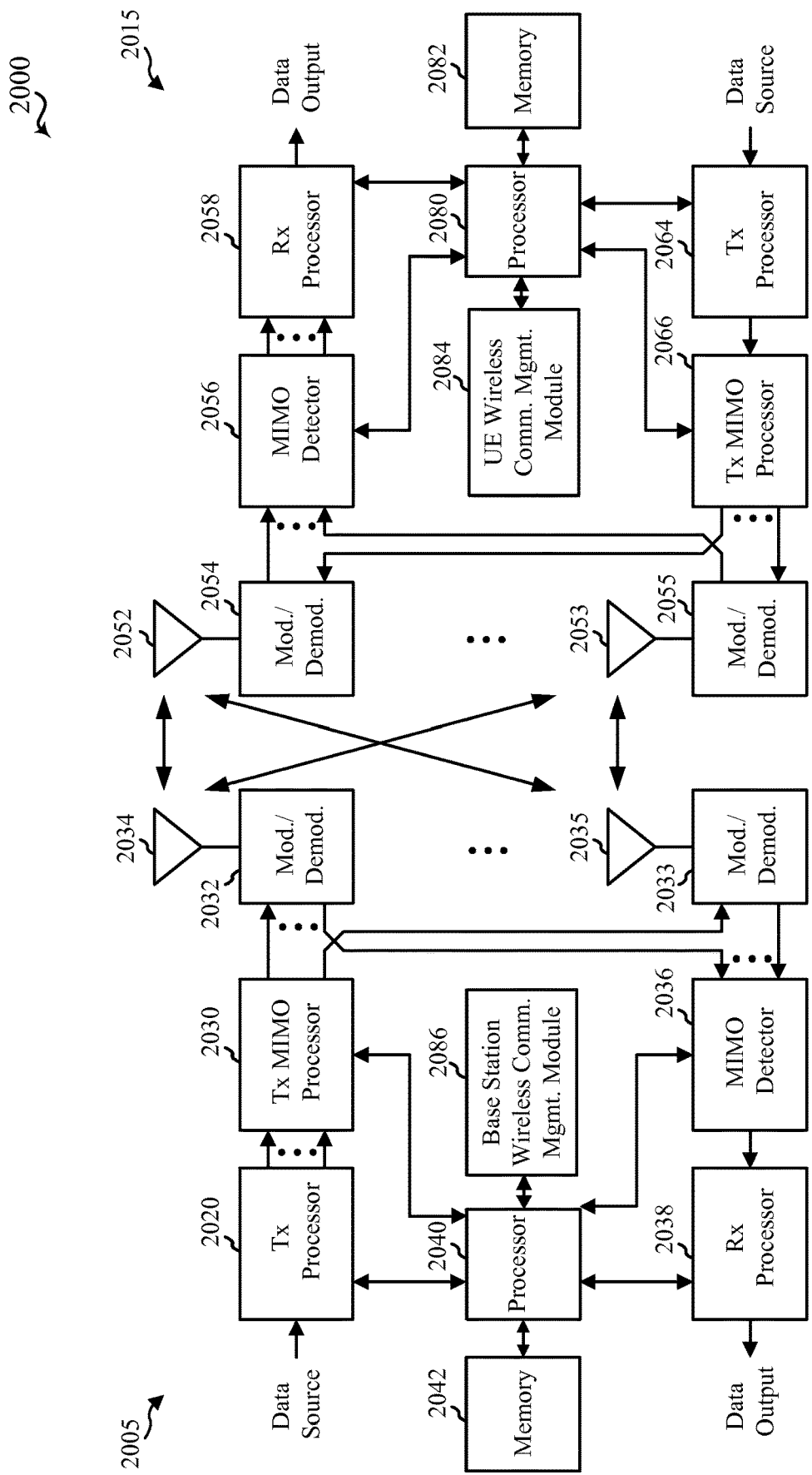
FIG. 20 is a block diagram of a multiple input/multiple output (MIMO) communication system including a base station and a UE, in accordance with aspects of the present disclosure.

FIG. 20 is a block diagram of a multiple input/multiple output (MIMO) communication system 2000 including a base station 2005 and a UE 2015, in accordance with aspects of the present disclosure. The MIMO communication system 2000 may illustrate aspects of the wireless communication system 100 or 200 described with reference to FIG. 1 or 2. The base station 2005 may be an example of aspects of the base station 105, 205, 206, 605, 705, 805, 905, or 1905 described with reference to FIG. 1, 2, 6, 7, 8, 9, or 19, or aspects of the apparatus 1205, 1305, 1605, or 1705 described with reference to FIG. 12, 13, 16, or 17. The base station 2005 may be equipped with antennas 2034 through 2035, and the UE 2015 may be equipped with antennas 2052 through 2053. In the MIMO communication system 2000, the base station 2005 may be able to send data over multiple communication links at the same time. Each communication link may be called a "layer" and the "rank" of the communication link may indicate the number of layers used for communication. For example, in a 2×2 MIMO communications system where base station 2005 transmits two "layers," the rank of the communication link between the base station 2005 and the UE 2015 is two.

At the base station 2005, a transmit (Tx) processor 2020 may receive data from a data source. The transmit processor 2020 may process the data. The transmit processor 2020 may also generate control symbols or reference symbols. A transmit (Tx) MIMO processor 2030 may perform spatial processing (e.g., precoding) on data symbols, control symbols, or reference symbols, if applicable, and may provide output symbol streams to the modulator/demodulator (Mod./Demod.) modules 2032 through 2033. Each modulator/demodulator module 2032 through 2033 may process a respective output symbol stream (e.g., for OFDM, etc.) to obtain an output sample stream. Each modulator/demodulator module 2032 through 2033 may further process (e.g., convert to analog, amplify, filter, and upconvert) the output sample stream to obtain a DL signal. In one example, DL signals from modulator/demodulator modules 2032 through 2033 may be transmitted via the antennas 2034 through 2035, respectively.

The UE 2015 may be an example of aspects of the UE 115, 215, 216, 217, 218, 615, 715, 815, 915, or 1815 described with reference to FIG. 1, 2, 6, 7, 8, 9, or 18, or aspects of the apparatus 1015, 1115, 1415, or 1515 described with reference to FIG. 10, 11, 14, or 15. At the UE 2015, the UE antennas 2052 through 2053 may receive the DL signals from the base station 2005 and may provide the received signals to the modulator/demodulator (Mod./Demod.) modules 2054 through 2055, respectively. Each modulator/demodulator module 2054 through 2055 may condition (e.g., filter, amplify, downconvert, and digitize) a respective received signal to obtain input samples. Each modulator/demodulator module 2054 through 2055 may further process the input samples (e.g., for OFDM, etc.) to obtain received symbols. A MIMO detector 2056 may obtain received symbols from all the modulator/demodulator modules 2054 through 2055, perform MIMO detection on the received symbols, if applicable, and provide detected symbols. A receive (Rx) processor 2058 may process (e.g., demodulate, deinterleave, and decode) the detected symbols, providing decoded data for the UE 2015 to a data output, and provide decoded control information to a processor 2080, or memory 2082.

The processor 2080 may in some cases execute stored instructions to instantiate a UE wireless communication management module 2084. The UE wireless communication management module 2084 may be an example of aspects of the wireless communication management module 1020, 1120, 1420, 1520, or 1860 described with reference to FIG. 10, 11, 14, 15, or 18.

On the uplink (UL), at the UE 2015, a transmit processor 2064 may receive and process data from a data source. The transmit processor 2064 may also generate reference symbols for a reference signal. The symbols from the transmit processor 2064 may be precoded by a transmit MIMO processor 2066 if applicable, further processed by the modulator/demodulator modules 2054 through 2055 (e.g., for SC-FDMA, etc.), and be transmitted to the base station 2005 in accordance with the transmission parameters received from the base station 2005. At the base station 2005, the UL signals from the UE 2015 may be received by the antennas 2034 through 2035, processed by the modulator/demodulator modules 2032 through 2033, detected by a MIMO detector 2036 if applicable, and further processed by a receive processor 2038. The receive processor 2038 may provide decoded data to a data output and to the processor 2040 or memory 2042.

The processor 2040 may in some cases execute stored instructions to instantiate a base station wireless communication management module 2086. The base station wireless communication management module 2086 may be an example of aspects of wireless communication management module 1220, 1320, 1620, 1720, or 1960 described with reference to FIG. 12, 13, 16, 17, or 19.

The components of the UE 2015 may, individually or collectively, be implemented with one or more ASICs adapted to perform some or all of the applicable functions in hardware. Each of the noted modules may be a means for performing one or more functions related to operation of the MIMO communication system 2000. Similarly, the components of the base station 2005 may, individually or collectively, be implemented with one or more ASICs adapted to perform some or all of the applicable functions in hardware. Each of the noted components may be a means for performing one or more functions related to operation of the MIMO communication system 2000.

Figure 21:
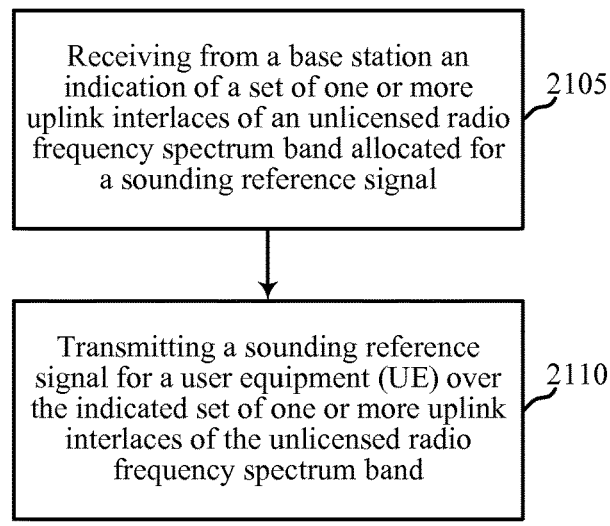
FIG. 21 is a flow chart illustrating an exemplary method for wireless communication, in accordance with aspects of the present disclosure.

FIG. 21 is a flow chart illustrating an exemplary method 2100 for wireless communication, in accordance with aspects of the present disclosure. For clarity, the exemplary method 2100 is described below with reference to aspects of one or more of the UEs 115, 215, 216, 217, 218, 615, 715, 815, 915, 1815, or 2015 described with reference to FIG. 1, 2, 6, 7, 8, 9, 18, or 20, or aspects of one or more of the apparatuses 1015, 1115, 1415, or 1515, described with reference to FIG. 10, 11, 14, or 15. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 2105, the exemplary method 2100 may include receiving from a base station an indication of a set of one or more uplink interlaces of an unlicensed radio frequency spectrum band allocated for a sounding reference signal. The unlicensed radio frequency spectrum band may include a radio frequency spectrum band for which transmitting apparatuses may need to contend for access because the radio frequency spectrum band is available for unlicensed use, such as Wi-Fi use. The interlaces of the unlicensed radio frequency spectrum band may in some examples be configured as described with reference to FIG. 4. The operation(s) at block 2105 may be performed using the wireless communication management module 1020, 1120, 1420, 1520, 1860, or 2084 described with reference to FIG. 10, 11, 14, 15, 18, or 20, or the SRS configuration module 1035 or 1135 described with reference to FIG. 10 or 11.

At block 2110, the exemplary method 2100 may include transmitting the sounding reference signal for a UE over the indicated set of one or more uplink interlaces of the unlicensed radio frequency spectrum band. The operation(s) at block 2110 may be performed using the wireless communication management module 1020, 1120, 1420, 1520, 1860, or 2084 described with reference to FIG. 10, 11, 14, 15, 18, or 20, or the SRS transmission management module 1040 or 1140 described with reference to FIG. 10 or 11.

Thus, the exemplary method 2100 may provide for wireless communication. It should be noted that the exemplary method 2100 is just one implementation and that the operations of the exemplary method 2100 may be rearranged or otherwise modified such that other implementations are possible.

Figure 22:
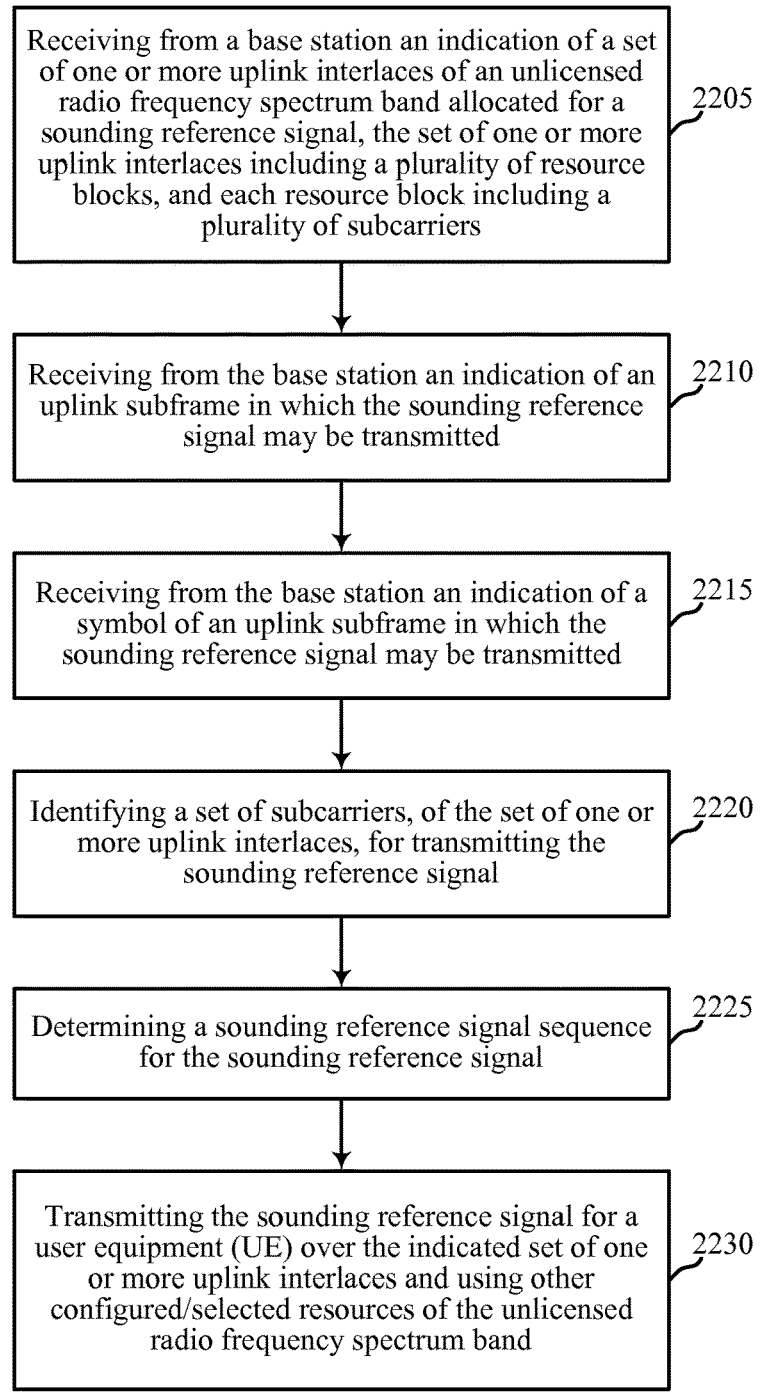
FIG. 22 is a flow chart illustrating an exemplary method for wireless communication, in accordance with aspects of the present disclosure.

FIG. 22 is a flow chart illustrating an exemplary method 2200 for wireless communication, in accordance with aspects of the present disclosure. For clarity, the exemplary method 2200 is described below with reference to aspects of one or more of the UEs 115, 215, 216, 217, 218, 615, 715, 1815, or 2015 described with reference to FIG. 1, 2, 6, 7, 18, or 20, or aspects of one or more of the apparatuses 1015, 1115, 1415, or 1515 described with reference to FIG. 10, 11, 14, or 15. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 2205, the exemplary method 2200 may include receiving from a base station an indication of a set of one or more uplink interlaces of an unlicensed radio frequency spectrum band allocated for a sounding reference signal. The unlicensed radio frequency spectrum band may include a radio frequency spectrum band for which transmitting apparatuses may need to contend for access because the radio frequency spectrum band is available for unlicensed use, such as Wi-Fi use. The interlaces of the unlicensed radio frequency spectrum band may in some examples be configured as described with reference to FIG. 4. Each interlace may include a plurality of resource blocks, and each resource block may include a plurality of subcarriers (or tones), as described with reference to FIG. 5.

In a first example, the set of one or more uplink interlaces allocated for the sounding reference signal may include all of the uplink interlaces in a component carrier bandwidth. In a second example, the set of one or more uplink interlaces allocated for the sounding reference signal may include a single uplink interlace (e.g., a single PUSCH interlace) in a component carrier bandwidth. In a third example, the set of one or more uplink interlaces allocated for the sounding reference signal may include a group of two or more uplink interlaces in a component carrier bandwidth. The first example may decrease frequency domain multiplexing options per symbol, and therefore increase a reliance on time domain multiplexing options. This may improve UE power consumption, but at the expense of fewer transmit opportunities in time. The second example may increase frequency domain multiplexing options per symbol, but may increase a UE's time interval between transmissions of a sounding reference signal on a particular uplink interlace. The third example provides a configurable balance between frequency domain multiplexing options per symbol and a UE's time interval between transmissions of a sounding reference signal on a particular uplink interlace. In some examples, the base station may dynamically or semi-statically select or change the set of one or more uplink interlaces allocated for the sounding reference signal.

In some examples, the number of uplink interlaces included in the set of one or more uplink interlaces allocated for the sounding reference signal may be based at least in part on a distance between the base station and a UE or apparatus performing the exemplary method 2200, or based at least in part on a transmit power of the UE or apparatus.

The operation(s) at block 2205 may be performed using the wireless communication management module 1020, 1120, 1420, 1520, 1860, or 2084 described with reference to FIG. 10, 11, 14, 15, 18, or 20, the SRS configuration module 1035 or 1135 described with reference to FIG. 10 or 11, or the location configuration module 1145 or frequency location configuration module 1150 described with reference to FIG. 11.

At block 2210, the exemplary method 2200 may include receiving from the base station an indication of an uplink subframe in which the sounding reference signal may be transmitted. In some examples, the uplink subframe may be a first uplink subframe or a last uplink subframe of an uplink transmission period (e.g., subframe SF7 or SF9 in FIG. 3). In some examples, the base station may dynamically or semi-statically select or change the uplink subframe in which the sounding reference signal is to be transmitted.

At block 2215, the exemplary method 2200 may include receiving from the base station an indication of a symbol of an uplink subframe in which the sounding reference signal is to be transmitted. In a first example, the symbol may include a first symbol of a first uplink subframe of an uplink transmission period. In a second example, the symbol may include a first symbol of a last uplink subframe of an uplink transmission period. In a third example, the symbol may include a last symbol of a last uplink subframe of an uplink transmission period. The first example may provide the sounding reference signal to the base station at an earlier time, but with a risk that the sounding reference signal may not be transmitted because the UE or apparatus performing the exemplary method 2200 has not yet won contention for access to the unlicensed radio frequency spectrum band, and with a risk that activities by other nodes contending for access to the unlicensed radio frequency spectrum band (e.g., nodes close to the base station) may interfere with the base station's receipt of the sounding reference signal. The second and third examples may mitigate the risks of the first example, but increase the likelihood of the sounding reference signal being interfered with by transmissions of other UEs or apparatuses of a same operator deployment. In some examples, the indication of the symbol may include an indication of one or more of a first symbol of the uplink subframe or a last symbol of the uplink subframe. In some examples, the base station may dynamically or semi-statically select or change the symbol in which the sounding reference signal is to be transmitted.

The operation(s) at block 2210 or 2215 may be performed using the wireless communication management module 1020, 1120, 1420, 1520, 1860, or 2084 described with reference to FIG. 10, 11, 14, 15, 18, or 20, the SRS configuration module 1035 or 1135 described with reference to FIG. 10 or 11, or the location configuration module 1145 or time location configuration module 1155 described with reference to FIG. 11.

At block 2220, the exemplary method 2200 may include identifying a set of subcarriers, of the set of one or more uplink interlaces, for transmitting the sounding reference signal. In a first example, the set of subcarriers may include each of the subcarriers associated with the set of one or more uplink interlaces. In a second example, the set of subcarriers may include a subset of the subcarriers (e.g., a frequency tone interlace or frequency comb), which subset of the subcarriers is associated with the UE or apparatus performing the exemplary method 2200. The first example may be more tolerant to a power ramp, since measuring the power in half of a symbol may be sufficient. However, depending on the choice of DFT length for a sounding reference signal sequence, a sounding reference signal sequence of a new length may be needed (e.g., a length 6 CGS). In some examples, an indication of the set of subcarriers may be received from the base station. In some examples, the base station may dynamically or semi-statically select or change the subcarriers for transmitting the sounding reference signal. The operation(s) at block 2210 or 2215 may be performed using the wireless communication management module 1020, 1120, 1420, 1520, 1860, or 2084 described with reference to FIG. 10, 11, 14, 15, 18, or 20, the SRS configuration module 1035 or 1135 described with reference to FIG. 10 or 11, or the location configuration module 1145 or frequency location configuration module 1150 described with reference to FIG. 11.

At block 2225, the exemplary method 2200 may include determining a sounding reference signal sequence for the sounding reference signal. In some examples, determining the sounding reference signal sequence may include determining a sounding reference signal sequence for a resource block of the set of one or more uplink interlaces, based at least in part on a location of the resource block within the set of one or more uplink interlaces. In some examples, the sounding reference signal sequence for a resource block may be based at least in part on an uplink interlace associated with the resource block. In some examples, the exemplary method 2200 may include determining at least one of a UE identifier or a cell identifier, and the sounding reference signal sequence for a resource block may be based at least in part on the UE identifier or the cell identifier. In some examples, the sounding reference signal sequence for the sounding reference signal may include the same sequence used for a single PUSCH interlace (e.g., a length 12 CGS per resource block, and a predetermined set of CGSs across the plurality of RBs included in an interlace). The operation(s) at block 2220 may be performed using the wireless communication management module 1020, 1120, 1420, 1520, 1860, or 2084 described with reference to FIG. 10, 11, 14, 15, 18, or 20, the SRS configuration module 1035 or 1135 described with reference to FIG. 10 or 11, or the sequence configuration module 1160 described with reference to FIG. 11.

At block 2230, the exemplary method 2200 may include transmitting the sounding reference signal for the UE or apparatus performing the exemplary method 2200. The sounding reference signal may be transmitted over the indicated set of one or more uplink interlaces and using other configured/selected resources of the unlicensed radio frequency spectrum band (e.g., the indicated uplink subframe and symbol(s), or the identified subcarriers). The sounding reference signal may be based at least in part on the determined sounding reference signal sequence. The operation(s) at block 2230 may be performed using the wireless communication management module 1020, 1120, 1420, 1520, 1860, or 2084 described with reference to FIG. 10, 11, 14, 15, 18, or 20, or the SRS transmission management module 1040 or 1140 described with reference to FIG. 10 or 11.

Because different LBT radio frames transmitted over an unlicensed radio frequency spectrum band can have different TDD configurations, the sounding reference signal transmitted at block 2230 may be one of a plurality of recurring and periodic sounding reference signal transmissions, or one of a plurality of recurring and non-periodic sounding reference signal transmissions. The sounding reference signal transmitted at block 2230 may also be an aperiodic sounding reference signal transmission.

In some instances, a UE may be allocated a PUSCH during a frame, but may not need to transmit a sounding reference signal on the PUSCH. To account for these instances, and to avoid discontinuities in transmissions over the unlicensed radio frequency spectrum band, one example of the exemplary method 2200 may include receiving an indication from the base station that the set of one or more uplink interlaces is designated for sounding reference signal transmissions by UEs that are not scheduled to transmit a sounding reference signal during a frame. In this example, the exemplary method 2200 may also include determining that the UE is not scheduled to transmit the sounding reference signal to the base station during the frame, and that the UE has an allocated PUSCH during the frame, and then transmitting the sounding reference signal over the set of one or more uplink interlaces in response to the determinations that the UE is not scheduled to transmit the sounding reference signal to the base station during the frame, and that the UE has an allocated PUSCH during the frame. When the set of one or more uplink interlaces is designated for sounding reference signal transmissions by UEs that are not scheduled to transmit a sounding reference signal during a frame, the set of one or more uplink interlaces may be used for sounding reference signal transmissions of all such UEs (i.e., all UEs allocated an ePUSCH during a frame but not needing to transmit a sounding reference signal during the frame). In some examples, the sounding reference signal transmissions over the designated set of one or more uplink interlaces may not be processed by the base station. In some examples, a UE's transmissions over the designated set of one or more uplink interlaces may frequency hop to follow other sounding reference signal transmissions.

In some instances, a UE may not transmit a periodic sounding reference signal over a particular uplink interlace, or may not transmit a periodic sounding reference signal over the particular uplink interlace within a threshold period of time (e.g., due to unavailability of a channel of the unlicensed radio frequency spectrum band). In these instances, an aperiodic sounding reference signal may be transmitted to fill a gap in channel sounding. In some examples, the base station may indicate to the UE a set of uplink interlaces that are to be sounded using an aperiodic sounding reference signal. In some examples, the set of uplink interlaces to be sounded using the aperiodic sounding reference signal may be indicated in a downlink grant or an uplink grant, or in a group common DCI.

In some examples of the exemplary method 2200, each of the indications received from the base station may be received as part of the same transmission or on the same channel. In other examples, the indications may be received as parts of different transmissions or on different channels.

Thus, the exemplary method 2200 may provide for wireless communication. It should be noted that the exemplary method 2200 is just one implementation and that the operations of the exemplary method 2200 may be rearranged or otherwise modified such that other implementations are possible.

Figure 23:
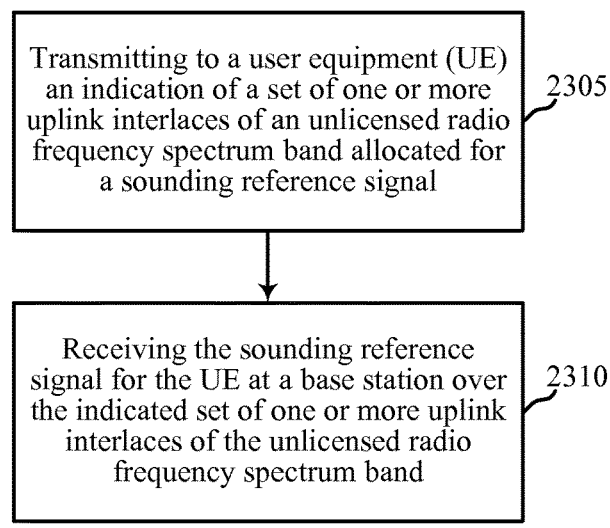
FIG. 23 is a flow chart illustrating an exemplary method for wireless communication, in accordance with aspects of the present disclosure.

FIG. 23 is a flow chart illustrating an exemplary method 2300 for wireless communication, in accordance with aspects of the present disclosure. For clarity, the exemplary method 2300 is described below with reference to aspects of one or more of the base stations 105, 205, 206, 605, 705, 805, 905, 1905, or 2005 described with reference to FIG. 1, 2, 6, 7, 8, 9, 19, or 20, or aspects of one or more of the apparatuses 1205, 1305, 1605, or 1705 described with reference to FIG. 12, 13, 16, or 17. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 2305, the exemplary method 2300 may include. The operation(s) at block 2305 may be performed using the wireless communication management module 1220, 1320, 1620, 1720, 1960, or 2084 described with reference to FIG. 12, 13, 16, 17, 19, or 20, or the SRS configuration module 1235 or 1335 described with reference to FIG. 12 or 13.

At block 2310, the exemplary method 2300 may include receiving the sounding reference signal for the UE at a base station over the indicated set of one or more uplink interlaces of the unlicensed radio frequency spectrum band. The operation(s) at block 2310 may be performed using the wireless communication management module 1220, 1320, 1620, 1720, 1960, or 2084 described with reference to FIG. 12, 13, 16, 17, 19, or 20, or the SRS reception management module 1240 or 1340 described with reference to FIG. 12 or 13.

Thus, the exemplary method 2300 may provide for wireless communication. It should be noted that the exemplary method 2300 is just one implementation and that the operations of the exemplary method 2300 may be rearranged or otherwise modified such that other implementations are possible.

Figure 24:
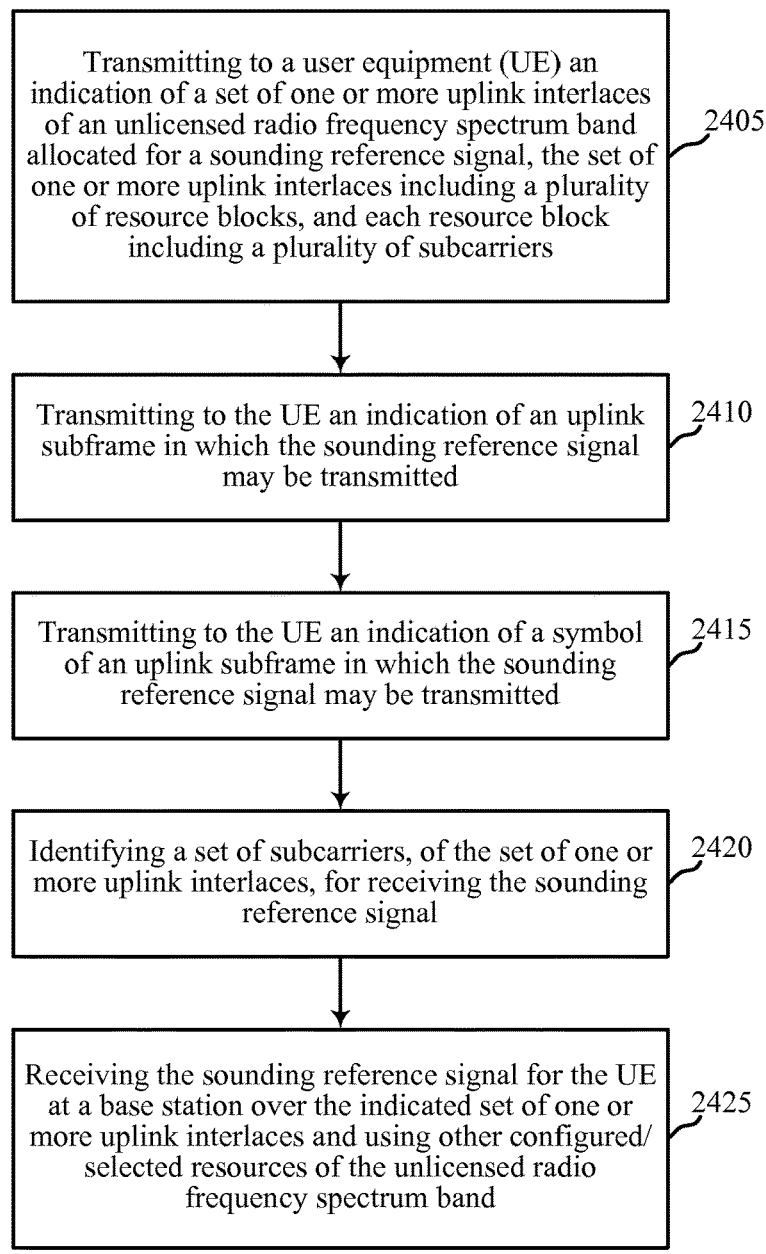
FIG. 24 is a flow chart illustrating an exemplary method for wireless communication, in accordance with aspects of the present disclosure.

FIG. 24 is a flow chart illustrating an exemplary method 2400 for wireless communication, in accordance with aspects of the present disclosure. For clarity, the exemplary method 2400 is described below with reference to aspects of one or more of the base stations 105, 205, 206, 605, 705, 805, 905, 1905, or 2005 described with reference to FIG. 1, 2, 6, 7, 8, 9, 19, or 20, or aspects of one or more of the apparatuses 1205, 1305, 1605, or 1705 described with reference to FIG. 12, 13, 16, or 17. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 2405, the exemplary method 2400 may include transmitting to a UE an indication of a set of one or more uplink interlaces of an unlicensed radio frequency spectrum band allocated for a sounding reference signal. The unlicensed radio frequency spectrum band may include a radio frequency spectrum band for which transmitting apparatuses may need to contend for access because the radio frequency spectrum band is available for unlicensed use, such as Wi-Fi use. The interlaces of the unlicensed radio frequency spectrum band may in some examples be configured as described with reference to FIG. 4. Each interlace may include a plurality of resource blocks, and each resource block may include a plurality of subcarriers (or tones), as described with reference to FIG. 5.

In a first example, the set of one or more uplink interlaces allocated for the sounding reference signal may include all of the uplink interlaces in a component carrier bandwidth. In a second example, the set of one or more uplink interlaces allocated for the sounding reference signal may include a single uplink interlace (e.g., a single PUSCH interlace) in a component carrier bandwidth. In a third example, the set of one or more uplink interlaces allocated for the sounding reference signal may include a group of two or more uplink interlaces in a component carrier bandwidth. The first example may decrease frequency domain multiplexing options per symbol, and therefore increase a reliance on time domain multiplexing options. This may improve UE power consumption, but at the expense of fewer transmit opportunities in time. The second example may increase frequency domain multiplexing options per symbol, but may increase a UE's time interval between transmissions of a sounding reference signal on a particular uplink interlace. The third example provides a configurable balance between frequency domain multiplexing options per symbol and a UE's time interval between transmissions of a sounding reference signal on a particular uplink interlace. In some examples, a base station may dynamically or semi-statically select or change the set of one or more uplink interlaces allocated for the sounding reference signal.

In some examples, the number of uplink interlaces included in the set of one or more uplink interlaces allocated for the sounding reference signal may be based at least in part on a distance between the base station and the UE, or based at least in part on a transmit power of the UE.

The operation(s) at block 2405 may be performed using the wireless communication management module 1220, 1320, 1620, 1720, 1960, or 2084 described with reference to FIG. 12, 13, 16, 17, 19, or 20, the SRS configuration module 1235 or 1335 described with reference to FIG. 12 or 13, or the location configuration module 1345 or frequency location configuration module 1350 described with reference to FIG. 13.

At block 2410, the exemplary method 2400 may include transmitting to the UE an indication of an uplink subframe in which the sounding reference signal is to be received. In some examples, the uplink subframe may be a first uplink subframe or a last uplink subframe of an uplink transmission period (e.g., subframe SF7 or SF9 in FIG. 3). In some examples, the base station may dynamically or semi-statically select or change the uplink subframe in which the sounding reference signal is to be received.

At block 2415, the exemplary method 2400 may include transmitting to the UE an indication of a symbol of an uplink subframe in which the sounding reference signal is to be received. In a first example, the symbol may include a first symbol of a first uplink subframe of an uplink transmission period. In a second example, the symbol may include a first symbol of a last uplink subframe of an uplink transmission period. In a third example, the symbol may include a last symbol of a last uplink subframe of an uplink transmission period. The first example may provide the sounding reference signal to the base station at an earlier time, but with a risk that the sounding reference signal may not be transmitted because the UE has not yet won contention for access to the unlicensed radio frequency spectrum band, and with a risk that activities by other nodes contending for access to the unlicensed radio frequency spectrum band (e.g., nodes close to the base station) may interfere with the base station's receipt of the sounding reference signal. The second and third examples may mitigate the risks of the first example, but increase the likelihood of the sounding reference signal being interfered with by transmissions of other UEs of a same operator deployment. In some examples, the indication of the symbol may include an indication of one or more of a first symbol of the uplink subframe or a last symbol of the uplink subframe. In some examples, the base station may dynamically or semi-statically select or change the symbol in which the sounding reference signal is to be received.

The operation(s) at block 2410 or 2415 may be performed using the wireless communication management module 1220, 1320, 1620, 1720, 1960, or 2084 described with reference to FIG. 12, 13, 16, 17, 19, or 20, the SRS configuration module 1235 or 1335 described with reference to FIG. 12 or 13, or the location configuration module 1345 or time location configuration module 1355 described with reference to FIG. 13.

At block 2420, the exemplary method 2400 may include identifying a set of subcarriers, of the set of one or more uplink interlaces, for receiving the sounding reference signal. In a first example, the set of subcarriers may include each of the subcarriers associated with the set of one or more uplink interlaces. In a second example, the set of subcarriers may include a subset of the subcarriers (e.g., a frequency tone interlace or frequency comb), which subset of the subcarriers is associated with the UE. The first example may be more tolerant to a power ramp, since measuring the power in half of a symbol may be sufficient. However, depending on the choice of DFT length for a sounding reference signal sequence, a sounding reference signal sequence of a new length may be needed (e.g., a length 6 CGS). In some examples, the base station may transmit to the UE an indication of the set of subcarriers. In some examples, the base station may dynamically or semi-statically select or change the subcarriers for receiving the sounding reference signal. The operation(s) at block 2420 may be performed using the wireless communication management module 1220, 1320, 1620, 1720, 1960, or 2084 described with reference to FIG. 12, 13, 16, 17, 19, or 20, or the SRS reception management module 1240 or 1340 described with reference to FIG. 12 or 13, or the location configuration module 1345 or frequency location configuration module 1350 described with reference to FIG. 13.

At block 2425, the exemplary method 2400 may include receiving the sounding reference signal for the UE. The sounding reference signal may be received over the indicated set of one or more uplink interlaces and using other configured/selected resources of the unlicensed radio frequency spectrum band (e.g., the indicated uplink subframe and symbol(s), or the identified subcarriers). The sounding reference signal may be based at least in part on a sounding reference signal sequence. The operation(s) at block 2425 may be using the wireless communication management module 1220, 1320, 1620, 1720, 1960, or 2084 described with reference to FIG. 12, 13, 16, 17, 19, or 20, or the SRS reception management module 1240 or 1340 described with reference to FIG. 12 or 13.

In some examples of the exemplary method 2400, the sounding reference signal sequence for a resource block of the set of one or more uplink interlaces may be based at least in part on a location of the resource block within the set of one or more uplink interlaces. In some examples, the sounding reference signal sequence for a resource block may be based at least in part on an uplink interlace associated with the resource block. In some examples, the sounding reference signal sequence for a resource block may be based at least in part on a UE identifier or a cell identifier.

Because different LBT radio frames received over an unlicensed radio frequency spectrum band can have different TDD configurations, the sounding reference signal received at block 2425 may be one of a plurality of recurring and periodic sounding reference signal transmissions, or one of a plurality of recurring and non-periodic sounding reference signal transmissions. The sounding reference signal received at block 2425 may also be an aperiodic sounding reference signal transmission.

In some instances, a UE may be allocated a PUSCH during a frame, but may not need to transmit a sounding reference signal on the PUSCH. To account for these instances, and to avoid discontinuities in transmissions over the unlicensed radio frequency spectrum band, one example of the exemplary method 2400 may include transmitting to the UE an indication that the set of one or more uplink interlaces is designated for sounding reference signal transmissions by UEs that are not scheduled to transmit a sounding reference signal during a frame.

In some instances, a UE may not transmit a periodic sounding reference signal over a particular uplink interlace, or may not transmit a periodic sounding reference signal over the particular uplink interlace within a threshold period of time (e.g., due to unavailability of a channel of the unlicensed radio frequency spectrum band). In these instances, the UE may transmit an aperiodic sounding reference signal to fill a gap in channel sounding. In some examples, the base station may indicate to the UE a set of uplink interlaces that are to be sounded using an aperiodic sounding reference signal. In some examples, the set of uplink interlaces to be sounded using the aperiodic sounding reference signal may be indicated in a downlink grant or an uplink grant, or in a group common DCI.

In some examples of the exemplary method 2400, each of the indications transmitted to the UE may be transmitted as part of the same transmission or on the same channel. In other examples, the indications may be transmitted as parts of different transmissions or on different channels.

Thus, the exemplary method 2400 may provide for wireless communication. It should be noted that the exemplary method 2400 is just one implementation and that the operations of the exemplary method 2400 may be rearranged or otherwise modified such that other implementations are possible.

Figure 25:
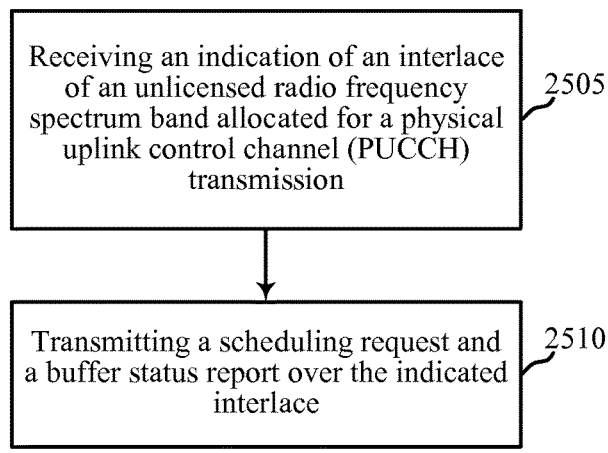
FIG. 25 is a flow chart illustrating an exemplary method for wireless communication, in accordance with aspects of the present disclosure.

FIG. 25 is a flow chart illustrating an exemplary method 2500 for wireless communication, in accordance with aspects of the present disclosure. For clarity, the exemplary method 2500 is described below with reference to aspects of one or more of the UEs 115, 215, 216, 217, 218, 615, 715, 815, 915, 1815, or 2015 described with reference to FIG. 1, 2, 6, 7, 8, 9, 18, or 20, or aspects of one or more of the apparatuses 1015, 1115, 1415 or 1515 described with reference to FIG. 10, 11, 14, or 15. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 2505, the exemplary method 2500 may include receiving an indication of an interlace of an unlicensed radio frequency spectrum band allocated for a PUCCH transmission. The unlicensed radio frequency spectrum band may include a radio frequency spectrum band for which transmitting apparatuses may need to contend for access because the radio frequency spectrum band is available for unlicensed use, such as Wi-Fi use. The interlace of the unlicensed radio frequency spectrum band may in some examples be configured as described with reference to FIG. 4. The operation(s) at block 2505 may be performed using the wireless communication management module 1020, 1120, 1420, 1520, 1860, or 2084 described with reference to FIG. 10, 11, 14, 15, 18, or 20, or the interlace allocation management module 1435 or 1535 described with reference to FIG. 14 or 15.

At block 2510, the exemplary method 2500 may include transmitting a scheduling request and a buffer status report over the indicated interlace. The operation(s) at block 2510 may be performed using the wireless communication management module 1020, 1120, 1420, 1520, 1860, or 2084 described with reference to FIG. 10, 11, 14, 15, 18, or 20, or the scheduling request preparation module 1440 or 1540, buffer status report preparation module 1445 or 1545, or transmission management module 1450 or 1550 described with reference to FIG. 14 or 15.

Thus, the exemplary method 2500 may provide for wireless communication. It should be noted that the exemplary method 2500 is just one implementation and that the operations of the exemplary method 2500 may be rearranged or otherwise modified such that other implementations are possible.

Figure 26:
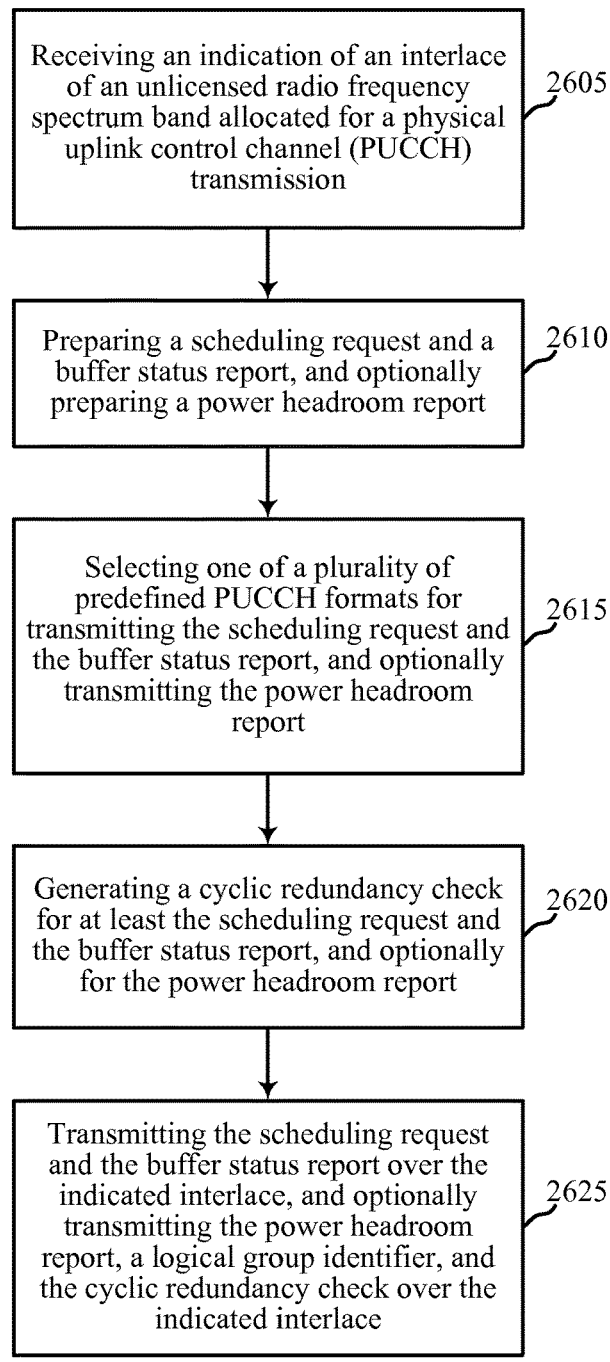
FIG. 26 is a flow chart illustrating an exemplary method for wireless communication, in accordance with aspects of the present disclosure.

FIG. 26 is a flow chart illustrating an exemplary method 2600 for wireless communication, in accordance with aspects of the present disclosure. For clarity, the exemplary method 2600 is described below with reference to aspects of one or more of the UEs 115, 215, 216, 217, 218, 615, 715, 815, 915, 1815, or 2015 described with reference to FIG. 1, 2, 6, 7, 8, 9, 18, or 20, or aspects of one or more of the apparatuses 1015, 1115, 1415, or 1515 described with reference to FIG. 14 or 15. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 2605, the exemplary method 2600 may include receiving an indication of an interlace of an unlicensed radio frequency spectrum band allocated for a PUCCH transmission. The unlicensed radio frequency spectrum band may include a radio frequency spectrum band for which transmitting apparatuses may need to contend for access because the radio frequency spectrum band is available for unlicensed use, such as Wi-Fi use. The interlace of the unlicensed radio frequency spectrum band may in some examples be configured as described with reference to FIG. 4. The operation(s) at block 2605 may be performed using the wireless communication management module 1020, 1120, 1420, 1520, 1860, or 2084 described with reference to FIG. 10, 11, 14, 15, 18, or 20, or the interlace allocation management module 1435 or 1535 described with reference to FIG. 14 or 15.

At block 2610, the exemplary method 2600 may include preparing a scheduling request and a buffer status report, and optionally preparing a power headroom report. The scheduling request may in some examples be a single bit indicating whether a scheduling request is being made. The buffer status report may in some examples take the form of a short buffer status report (e.g., a 6-bit report) or a long buffer status report (e.g., a 24-bit report). The power headroom report may in some examples be a 6-bit report. The operation(s) at block 2610 may be performed using the wireless communication management module 1020, 1120, 1420, 1520, 1860, or 2084 described with reference to FIG. 10, 11, 14, 15, 18, or 20, the scheduling request preparation module 1440 or 1540 or buffer status report preparation module 1445 or 1545 described with reference to FIG. 14 or 15, or the power headroom report preparation module 1555 described with reference to FIG. 15.

At block 2615, the exemplary method 2600 may include selecting one of a plurality of predefined PUCCH formats for transmitting the scheduling request and the buffer status report, and optionally the power headroom report. In the case of a short buffer status report, the selected PUCCH format may in some examples be Format 1b. In some examples, the PUCCH format may be selected based at least in part on a size of a payload to be transmitted over the indicated interlace, or on a size of the buffer status report. The operation(s) at block 2615 may be performed using the wireless communication management module 1020, 1120, 1420, 1520, 1860, or 2084 described with reference to FIG. 10, 11, 14, 15, 18, or 20, the transmission management module 1450 or 1550 described with reference to FIG. 14 or 15, or the PUCCH format selection module 1560 described with reference to FIG. 15.

At block 2620, the exemplary method 2600 may include generating a cyclic redundancy check for at least the scheduling request and the buffer status report, and optionally for the power headroom report. In some examples, the exemplary method 2600 may include adjusting a size of the cyclic redundancy check based at least in part on a remaining number of bits in the indicated interlace (e.g., after accounting for the scheduling request, buffer status report, and optionally the power headroom report). The operation(s) at block 2620 may be performed using the wireless communication management module 1020, 1120, 1420, 1520, 1860, or 2084 described with reference to FIG. 10, 11, 14, 15, 18, or 20, the transmission management module 1450 or 1550 described with reference to FIG. 14 or 15, or the cyclic redundancy check generation module 1565 described with reference to FIG. 15.

At block 2625, the exemplary method 2600 may include transmitting the scheduling request and the buffer status report over the indicated interlace, and optionally transmitting the power headroom report, a logical group identifier, or the cyclic redundancy check with the scheduling request and the buffer status report over the indicated interlace. The scheduling report, buffer status report, or power headroom report may be transmitted using the selected one of the plurality of predefined PUCCH formats. The operation(s) at block 2625 may be performed using the wireless communication management module 1020, 1120, 1420, 1520, 1860, or 2084 described with reference to FIG. 10, 11, 14, 15, 18, or 20, the transmission management module 1450 or 1550 described with reference to FIG. 14 or 15, or the logical group identifier management module 1570 described with reference to FIG. 15.

In some examples, the exemplary method 2600 may include multiplexing transmission of the scheduling request and the buffer status request (and optionally the power headroom report, the logical group identifier, or the cyclic redundancy check) over the indicated interlace with a transmission of uplink control information (UCI). In some examples, the UCI may include at least one of: an acknowledgement (ACK), a non-acknowledgement (NAK), or a number of channel quality indicator (CQI) reports.

Thus, the exemplary method 2600 may provide for wireless communication. It should be noted that the exemplary method 2600 is just one implementation and that the operations of the exemplary method 2600 may be rearranged or otherwise modified such that other implementations are possible.

Figure 27:
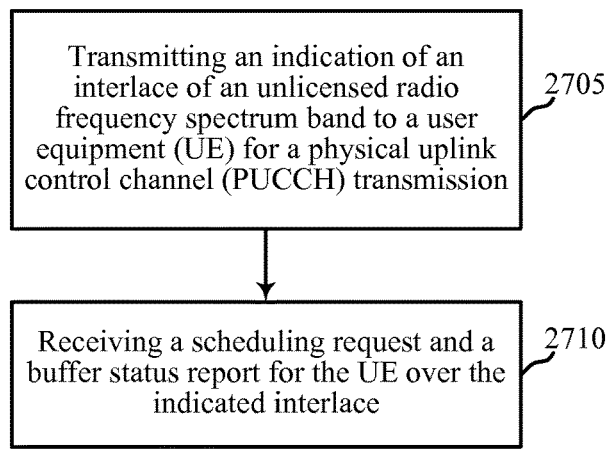
FIG. 27 is a flow chart illustrating an exemplary method for wireless communication, in accordance with aspects of the present disclosure.

FIG. 27 is a flow chart illustrating an exemplary method 2700 for wireless communication, in accordance with aspects of the present disclosure. For clarity, the exemplary method 2700 is described below with reference to aspects of one or more of the base stations 105, 205, 206, 605, 705, 805, 905, 1905, or 2005 described with reference to FIG. 1, 2, 6, 7, 8, 9, 19, or 20, or aspects of one or more of the apparatuses 1205, 1305, 1605, or 1705 described with reference to FIG. 12, 13, 16, or 17. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 2705, the exemplary method 2700 may include transmitting an indication of an interlace of an unlicensed radio frequency spectrum band to a UE for a PUCCH transmission. The unlicensed radio frequency spectrum band may include a radio frequency spectrum band for which transmitting apparatuses may need to contend for access because the radio frequency spectrum band is available for unlicensed use, such as Wi-Fi use. The interlace of the unlicensed radio frequency spectrum band may in some examples be configured as described with reference to FIG. 4. The operation(s) at block 2705 may be performed using the wireless communication management module 1220, 1320, 1620, 1720, 1960, or 2084 described with reference to FIG. 12, 13, 16, 17, 19, or 20, or the interlace allocation management module 1635 or 1735 described with reference to FIG. 16 or 17.

At block 2710, the exemplary method 2700 may include receiving a scheduling request and a buffer status report for the UE over the interlace. The operation(s) at block 2710 may be performed using the wireless communication management module 1220, 1320, 1620, 1720, 1960, or 2084 described with reference to FIG. 12, 13, 16, 17, 19, or 20, or the transmission reception management module 1640 or 1740, the scheduling request reception management module 1645 or 1745, or the buffer status report reception management module 1650 or 1750 described with reference to FIG. 16 or 17.

Thus, the exemplary method 2700 may provide for wireless communication. It should be noted that the exemplary method 2700 is just one implementation and that the operations of the exemplary method 2700 may be rearranged or otherwise modified such that other implementations are possible.

Figure 28:
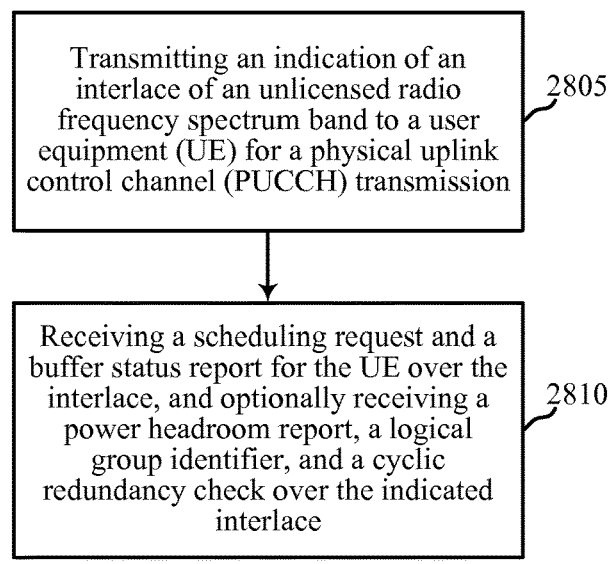
FIG. 28 is a flow chart illustrating an exemplary method for wireless communication, in accordance with aspects of the present disclosure.

FIG. 28 is a flow chart illustrating an exemplary method 2800 for wireless communication, in accordance with aspects of the present disclosure. For clarity, the exemplary method 2800 is described below with reference to aspects of one or more of the base stations 105, 205, 206, 605, 705, 805, 905, 1905, or 2005 described with reference to FIG. 1, 2, 6, 7, 8, 9, 19, or 20, or aspects of one or more of the apparatuses 1205, 1305, 1605, or 1705 described with reference to FIG. 12, 13, 16, or 17. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 2805, the exemplary method 2800 may include transmitting an indication of an interlace of an unlicensed radio frequency spectrum band to a UE for a PUCCH transmission. The unlicensed radio frequency spectrum band may include a radio frequency spectrum band for which transmitting apparatuses may need to contend for access because the radio frequency spectrum band is available for unlicensed use, such as Wi-Fi use. The interlace of the unlicensed radio frequency spectrum band may in some examples be configured as described with reference to FIG. 4. The operation(s) at block 2805 may be performed using the wireless communication management module 1220, 1320, 1620, 1720, 1960, or 2084 described with reference to FIG. 12, 13, 16, 17, 19, or 20, or the interlace allocation management module 1635 or 1735 described with reference to FIG. 16 or 17.

At block 2810, the exemplary method 2800 may include receiving a scheduling request and a buffer status report for the UE over the interlace, and optionally receiving a power headroom report, a logical group identifier, or a cyclic redundancy check with the scheduling request and the buffer status report over the indicated interlace. The scheduling request may in some examples be a single bit indicating whether a scheduling request is being made. The buffer status report may in some examples take the form of a short buffer status report (e.g., a 6-bit report) or a long buffer status report (e.g., a 24-bit report). The power headroom report may in some examples be a 6-bit report.

The scheduling report, buffer status report, or power headroom report may be received using one of a plurality of predefined PUCCH formats. In the case of a short buffer status report, the selected PUCCH format may in some examples be Format 1b. In some examples, the PUCCH format may be based at least in part on a size of a payload to be transmitted over the indicated interlace, or on a size of the buffer status report. A size of the cyclic redundancy check may be based at least in part on a remaining number of bits in the indicated interlace (e.g., after accounting for the scheduling request, buffer status report, and optionally the power headroom report). The operation(s) at block 2810 may be performed using the wireless communication management module 1220, 1320, 1620, 1720, 1960, or 2084 described with reference to FIG. 12, 13, 16, 17, 19, or 20, the transmission reception management module 1640 or 1740, the scheduling request reception management module 1645 or 1745, or the buffer status report reception management module 1650 or 1750 described with reference to FIG. 16 or 17, or the power headroom report reception management module 1755 or cyclic redundancy check evaluation module 1760 described with reference to FIG. 16.

In some examples, the exemplary method 2800 may include receiving the scheduling request and the buffer status request (and optionally the power headroom report, the logical group identifier, or the cyclic redundancy check), over the indicated interlace, multiplexed with a transmission of UCI. In some examples, the UCI may include at least one of: an ACK, a NAK, or a number of CQI reports.

Thus, the exemplary method 2800 may provide for wireless communication. It should be noted that the exemplary method 2800 is just one implementation and that the operations of the exemplary method 2800 may be rearranged or otherwise modified.

In some examples, aspects of two or more of the exemplary methods 2100, 2200, 2300, 2400, 2500, 2600, 2700, or 2800 described with reference to FIG. 21, 22, 23, 24, 25, 26, 27, or 28 may be combined such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
receiving from a base station an indication of a set of one or more uplink interlaces of an unlicensed radio frequency spectrum band allocated for a sounding reference signal, wherein each of the one or more uplink interlaces of the unlicensed radio frequency spectrum band comprises a plurality of concurrent resource blocks that are non-contiguous in a frequency domain; and
determining in response to receiving the indication that the UE has an allocated physical uplink shared channel (PUSCH) during a frame and that the sounding reference signal is not scheduled for transmission by a user equipment (UE) on the PUSCH during the frame; and
transmitting the sounding reference signal for the UE during the frame over the indicated set of one or more uplink interlaces of the unlicensed radio frequency spectrum band based at least in part on the determination.

2. The method of claim 1, further comprising:
receiving from the base station an indication of at least one of an uplink subframe or a symbol of an uplink subframe in which the sounding reference signal is to be transmitted.

3. The method of claim 1, further comprising:
determining a sounding reference signal sequence for a resource block of the set of one or more uplink interlaces based at least in part on a location of the resource block within the set of one or more uplink interlaces.

4. The method of claim 3, wherein the sounding reference signal sequence for the resource block is based at least in part on an uplink interlace associated with the resource block.

5. The method of claim 3, further comprising:
determining at least one of a UE identifier or a cell identifier;
wherein the sounding reference signal sequence for the resource block is based at least in part on the UE identifier or the cell identifier.

6. The method of claim 1, wherein each uplink interlace of the set of one or more uplink interlaces comprises a plurality of subcarriers, and wherein transmitting the sounding reference signal comprises:
transmitting the sounding reference signal for the UE over one or more subcarriers from the plurality of subcarriers.

7. The method of claim 1, wherein the set of one or more uplink interlaces allocated for the sounding reference signal is based at least in part on at least one of a distance between the base station and the UE or a transmit power of the UE.

8. The method of claim 1, wherein each of the one or more uplink interlaces of the unlicensed radio frequency spectrum band spans a majority of a component carrier bandwidth.

9. The method of claim 1, wherein the indication of the set of one or more uplink interlaces indicates to a plurality of UEs that each UE of the plurality of UEs has an allocated PUSCH during the frame and that a sounding reference signal is not scheduled for transmission for each UE of the plurality of UEs during the frame.

10. An apparatus for wireless communication, comprising:
a processor;
memory in electronic communication with the processor; and
instructions stored in the memory and operable, when executed by the processor, to cause the apparatus to:
receive from a base station an indication of a set of one or more uplink interlaces of an unlicensed radio frequency spectrum band allocated for a sounding reference signal, wherein each of the one or more uplink interlaces of the unlicensed radio frequency spectrum band comprises a plurality of concurrent resource blocks that are non-contiguous in a frequency domain;
determine in response to receiving the indication that the UE has an allocated physical uplink shared channel (PUSCH) during a frame and that the sounding reference signal is not scheduled for transmission by a user equipment (UE) on the PUSCH during the frame; and
transmit the sounding reference signal for the apparatus during the frame over the indicated set of one or more uplink interlaces of the unlicensed radio frequency spectrum band based at least in part on the determination.

11. The apparatus of claim 10, wherein the instructions are executable by the processor to:
receive from the base station an indication of at least one of an uplink subframe or a symbol of an uplink subframe in which the sounding reference signal is to be transmitted.

12. The apparatus of claim 10, wherein the instructions are executable by the processor to:
determine a sounding reference signal sequence for a resource block of the set of one or more uplink interlaces based at least in part on a location of the resource block within the set of one or more uplink interlaces.

13. The apparatus of claim 12, wherein the sounding reference signal sequence for the resource block is based at least in part on an uplink interlace associated with the resource block.

14. The apparatus of claim 12, wherein the instructions are executable by the processor to:
determine at least one of a UE identifier or a cell identifier;

wherein the sounding reference signal sequence for the resource block is based at least in part on the UE identifier or the cell identifier.

15. The apparatus of claim 10, wherein each uplink interlace of the set of one or more uplink interlaces comprises a plurality of subcarriers, and wherein the instructions are executable by the processor to:
transmit the sounding reference signal for the UE over one or more subcarriers from the plurality of subcarriers.

16. The apparatus of claim 9, wherein the set of one or more uplink interlaces allocated for the sounding reference signal is based at least in part on at least one of a distance between the base station and the UE or a transmit power of the UE.

17. The apparatus of claim 10, wherein each of the one or more uplink interlaces of the unlicensed radio frequency spectrum band spans a majority of a component carrier bandwidth.

18. The apparatus of claim 10, wherein the indication of the set of one or more uplink interlaces indicates to a plurality of UEs that each UE of the plurality of UEs has an allocated PUSCH during the frame and that a sounding reference signal is not scheduled for transmission for each UE of the plurality of UEs during the frame.

19. An apparatus for wireless communication, the apparatus comprising:
means for receiving from a base station an indication of a set of one or more uplink interlaces of an unlicensed radio frequency spectrum band allocated for a sounding reference signal, wherein each of the one or more uplink interlaces of the unlicensed radio frequency spectrum band comprises a plurality of concurrent resource blocks that are non-contiguous in a frequency domain; and
means for determining in response to receiving the indication that the UE has an allocated physical uplink shared channel (PUSCH) during a frame and that the sounding reference signal is not scheduled for transmission by a user equipment (UE) on the PUSCH during the frame; and
means for transmitting the sounding reference signal for the UE during the frame over the indicated set of one or more uplink interlaces of the unlicensed radio frequency spectrum band based at least in part on the determination.

20. The apparatus of claim 19, further comprising:
means for receiving from the base station an indication of at least one of an uplink subframe or a symbol of an uplink subframe in which the sounding reference signal is to be transmitted.

21. The apparatus of claim 19, further comprising:
means for determining a sounding reference signal sequence for a resource block of the set of one or more uplink interlaces based at least in part on a location of the resource block within the set of one or more uplink interlaces.

22. The apparatus of claim 21, wherein the sounding reference signal sequence for the resource block is based at least in part on an uplink interlace associated with the resource block, or a UE identifier, or a cell identifier.

23. The apparatus of claim 19, wherein each uplink interlace of the set of one or more uplink interlaces comprises a plurality of subcarriers, and wherein the means for transmitting the sounding reference signal comprises:
means for transmitting the sounding reference signal for the UE over one or more subcarriers from the plurality of subcarriers.

24. The apparatus of claim 19, wherein the indication of the set of one or more uplink interlaces indicates to a plurality of UEs that each UE of the plurality of UEs has an allocated PUSCH during the frame and that a sounding reference signal is not scheduled for transmission for each UE of the plurality of UEs during the frame.

25. A non-transitory computer-readable medium storing code for wireless communication, the code comprising instructions executable by a processor to:
receive from a base station an indication of a set of one or more uplink interlaces of an unlicensed radio frequency spectrum band allocated for a sounding reference signal, wherein each of the one or more uplink interlaces of the unlicensed radio frequency spectrum band comprises a plurality of concurrent resource blocks that are non-contiguous in a frequency domain;
determine in response to receiving the indication that the UE has an allocated physical uplink shared channel (PUSCH) during a frame and that the sounding reference signal is not scheduled for transmission by a user equipment (UE) on the PUSCH during the frame; and
transmit the sounding reference signal for the apparatus during the frame over the indicated set of one or more uplink interlaces of the unlicensed radio frequency spectrum band based at least in part on the determination.

26. The non-transitory computer-readable medium of claim 25, wherein the instructions are executable by the processor to:
receive from the base station an indication of at least one of an uplink subframe or a symbol of an uplink subframe in which the sounding reference signal is to be transmitted.

27. The non-transitory computer-readable medium of claim 25, wherein the instructions are executable by the processor to:
determine a sounding reference signal sequence for a resource block of the set of one or more uplink interlaces based at least in part on a location of the resource block within the set of one or more uplink interlaces.

28. The non-transitory computer-readable medium of claim 27, wherein the sounding reference signal sequence for the resource block is based at least in part on an uplink interlace associated with the resource block, or a UE identifier, or a cell identifier.

29. The non-transitory computer-readable medium of claim 25, wherein each uplink interlace of the set of one or more uplink interlaces comprises a plurality of subcarriers, and wherein the instructions are executable by the processor to:
transmit the sounding reference signal for the UE over one or more subcarriers from the plurality of subcarriers.

30. The non-transitory computer-readable medium of claim 25, wherein the indication of the set of one or more uplink interlaces indicates to a plurality of UEs that each UE of the plurality of UEs has an allocated PUSCH during the frame and that a sounding reference signal is not scheduled for transmission for each UE of the plurality of UEs during the frame.

* * * * *